United States Patent [19]
Yamamoto et al.

[11] Patent Number: 6,166,778
[45] Date of Patent: *Dec. 26, 2000

[54] BROADCAST RECEIVING APPARATUS

[75] Inventors: Sozo Yamamoto, Osaka; Ayako Monma, Kyoto; Chie Hirose; Yoshikazu Hirai, both of Ibaraki; Emiko Maekawa, Joyo; Eiichiro Naito, Amagasaki; Yoshinori Harada, Osaka, all of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/827,173

[22] Filed: Mar. 27, 1997

[30] Foreign Application Priority Data

| Mar. 29, 1996 | [JP] | Japan | 8-076237 |
|---|---|---|---|
| Mar. 29, 1996 | [JP] | Japan | 8-076238 |
| Mar. 29, 1996 | [JP] | Japan | 8-076239 |
| Mar. 29, 1996 | [JP] | Japan | 8-076240 |
| Mar. 29, 1996 | [JP] | Japan | 8-076241 |

[51] Int. Cl.[7] ............................................. H04N 5/50
[52] U.S. Cl. ............................. 348/569; 348/906; 348/12
[58] Field of Search ..................................... 348/7, 12, 13, 348/563, 564, 569, 906, 578, 734, 327, 328

[56] References Cited

U.S. PATENT DOCUMENTS

| 3,943,451 | 3/1976 | Stoddard . |
| 5,434,626 | 7/1995 | Hayashi et al. . |
| 5,812,123 | 9/1998 | Rowe et al. ............................. 345/327 |

FOREIGN PATENT DOCUMENTS

| 352446 | 1/1990 | European Pat. Off. . |
| 557006 | 8/1993 | European Pat. Off. . |
| 682452 | 11/1995 | European Pat. Off. . |
| 58-207779 | 12/1983 | Japan . |
| 59-041972 | 3/1984 | Japan . |
| 63238776 | 10/1988 | Japan . |
| 6-504165 | 5/1994 | Japan . |
| 07-274087 | 10/1995 | Japan . |
| 9-116390 | 5/1997 | Japan . |
| 92/04801 | 3/1992 | WIPO . |
| 9204801 | 3/1992 | WIPO . |
| 9607270 | 3/1996 | WIPO . |

OTHER PUBLICATIONS

European Search Report dated January 14, 2000, application number 97301800.

*Primary Examiner*—Victor R. Kostak
*Attorney, Agent, or Firm*—Ratner & Prestia

[57] ABSTRACT

The present invention relates to, in a broadcast receiving apparatus for receiving broadcast in multiple channels, controllability of setting of desired programs out of multiple programs being broadcast, and various manipulations and selections about such programs, inspection of the charge amount situation, and prevention of wrong use about connection to a telephone circuit, and these manipulations are effected in an interactive manner with the screen display shown in appropriate display format, layout, shape and color, considering psychological effects, according to the natural flow of thought of general users who manipulate. More specifically, the menu panel showing manipulation items in layers is displayed characters and expression of proper size suited to the broadcast receiving apparatus, and the layer index is attached to the menu panel, so that the layer of the present manipulation may be known at a glance, and moreover in the program list display, an official program name display column is displayed in a predetermined specific position, outside of the program list display column, and the display state of this official program name display column is maintained if the picture is changed to the broadcast content briefing picture or reserve condition customize picture. In addition, the access to the modem or IC card is indicated by the indicator, and the charge amount detail can be known from the IC card.

15 Claims, 41 Drawing Sheets

| Preset No. | Channel No. |
|---|---|
| 1 | 225 |
| 2 | 328 |
| 3 | 439 |
| 4 | 512 |
| 5 | 633 |
| 6 | 785 |
| 7 | 208 |
| 8 | 391 |
| 9 | 911 |
| 10 | 666 |
| 11 | 212 |
| 12 | 365 |
| ⋮ | ⋮ |
| 16 | 115 |
| 17 | 914 |
| 18 | 438 |
| 19 | |
| 20 | |

| Program list | Program of Tues., Feb. 22 | Tues., Feb. 22, 4:17 PM | |
|---|---|---|---|
| Evening | 111 ABC | 124 DEF | 128 GHI |
| 4:00 | 00 Local news | 00 Children's Favorite | 00 Classical Concert |
| 5:00 | 00 Practical English<br>30 Mom and ... | | 00 Cooking Paradise |
| 6:00 | 00 Quiz: Ask Me Anything! | 00 Hotline | 00 Flash News |
| 7:00 | 00 Today's News | 00 Music Station $ | 00 Animal Land<br>30 Star of Tuesday |
| 8:00 | 00 Tuesday's Suspense Murder in Spa $ | 00 Lassie | 00 Chien Andalou |
| PM 8:00–9:00  111 | Tuesday's Suspense: Murder in Spa<br>Charge: 3 dollars | | |

FIG. 26

| Program list | | Tues., Feb. 22, 4:17 PM | |
|---|---|---|---|
| | Program of Tues., Feb. 22 | | |
| Evening | 111 ABC | 124 DEF | 128 GHI |
| 4:00 | 00 Local news | 00 Children's Favorite | 00 Classical Concert |
| 5:00 | 00 Practical English | 25 / 49 / 20 Spanish in a Nut.. | 00 Cooking Paradise |
| | 30 Mom and .... | | |
| 6:00 | 00 Quiz: Ask Me Anything! | | 00 Flash News |
| 7:00 | 00 Today's News | 00 Music Station $ | 00 Animal Land ... |
| | | | 30 Star of Tuesday |
| 8:00 | 00 Tuesday's Suspense Murder in Spa... $ | 00 Lassie | 00 Chien Andalou |

PM 5:20–5:30    Spanish in a Nutshell

111    Free of charge

FIG. 31

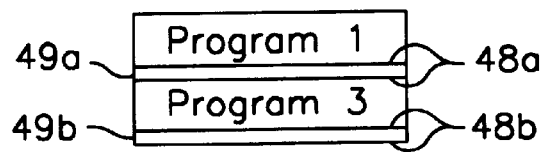
FIG. 32(a)
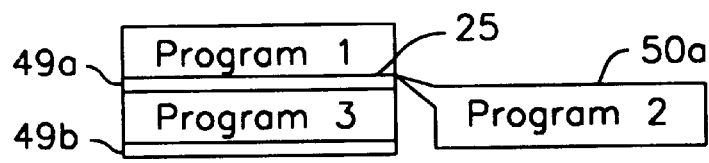
FIG. 32(b)
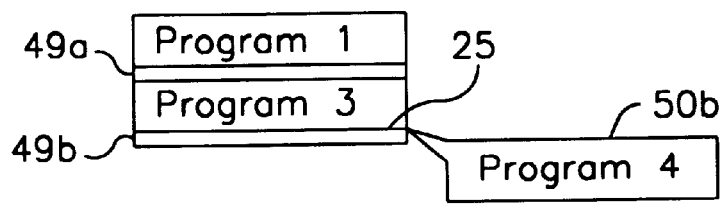
FIG. 32(c)
| Time control table | | |
|---|---|---|
| 5~11 | Morning | White |
| 12~4 | Afternoon | Yellow |
| 5~11 | Evening | Gray |
| 12~4 | Night | Black |
FIG. 33

| Menu | Purchase Record | Jan. 20, 5:15 PM |
|---|---|---|
| 123 | 1/2 10:00–11:00 Music Stadium | approx. 4 dollars |
| 234 | 1/5 14:00–15:30 The Third Man | approx. 3 dollars |
| 135 | 1/5 14:30–15:00 NBA Special | approx. 3 dollars |
| 145 | 1/5 13:00–16:00 Godfather Complete | approx. 10 dollars |
| 222 | 1/6 7:00–8:00 The Line, the Cross & the Curve | approx. 4 dollars |
| 334 | 1/9 8:00–20:00 New Year Concert 1 | approx. 5 dollars |
| 567 | 1/10 18:30–20:00 New Year Concert 2 | approx. 3 dollars |
| 567 | 1/11 18:30–20:00 New Year Concert 3 | approx. 3 dollars |
| 567 | 1/12 18:30–20:00 New Year Concert 4 | approx. 3 dollars |
| Cumulative amount since October 23: | | approx. 42 dollars |
| | Reset  Return | |

FIG. 43

| Program list | Program of Tues., Feb 22 | | |
|---|---|---|---|
| | 111 ABC | 124 DEF | 128 GHI |
| 4:00 | 00 Local news | 00 Children's Favorite | 00 Classical Concert |
| 5:00 | 00 Practical English | | |
| | 30 Mom and ... | | 00 Cooking Paradise |
| 6:00 | 00 Quiz: Ask Me Anything! | 00 Hotline | |
| | | | 00 Flash News |
| 7:00 | 00 Today's News | 00 Music Station | 00 Animal Land ... |
| | | | 30 Star of Tuesday |
| 8:00 | 00 Tuesday's Suspense Murder in Spa | 30 Lassie | 00 Chien Andalou |
| 9:00 | | 00 Hotline | |

FIG. 48
PRIOR ART

BROADCAST RECEIVING APPARATUS

BACKGROUND OF THE INVENTION

The present invention relates to a method for easy receiving manipulation of broadcast receiving apparatus by interactive operation for reception, selection and display, in a broadcast receiving apparatus for receiving broadcast (mainly digital broadcast) through satellites, cables, or normal terrestrial broadcast having multiple channels.

In general conventional television receivers, by pressing a channel key of a remote controller, the channel corresponding to the key number is selected. The number of channels is few, and the channel numbers can be expressed in two digits, and channel selection operation is easy. In digital broadcast, there are extremely many channels, and channel numbers are usually expressed in three digits. An example of display of the channel number being received on the display screen is shown in FIG. 46. In FIG. 46, channel number 145 is overlaid on the picture in the upper right corner of the screen of aspect ratio of 4:3. This partial on-screen display (partial OSD) for displaying the channel number by occupying part of the picture is generated by a partial OSD processing device. Aside from the channel number, moreover, icon or message may be shown in partial OSD in part of the picture.

Wide broadcast for broadcasting a wide screen of aspect ratio of 16:9 is also available. FIG. 45 (*a*) shows a screen of reception of wide broadcast by a television receiver with a display screen of aspect ratio of 4:3. In FIG. 45 (*a*), a letter box format wide picture 141 indicated by rectangle is accompanied by blank areas 143 (indicated by hatching) in upper and lower portions, having no video signal.

The wide television broadcast receiver having a display screen corresponding to the wide broadcast of aspect ratio 16:9 detects the blank areas 143, and changes the picture shape, which is called auto-wide processing, so that the wide broadcast picture of aspect ratio of 16:9 is displayed in the whole display screen of aspect ratio of 16:9. See FIG. 45 (*b*).

The television receiver has a function for presetting only specific channels for the ease of selection of desired channels, which is called the preset channel function. Accordingly, calculating the frequency of viewing and frequency of reserving, it has been already proposed to arrange the channel setting corresponding to preset key numbers automatically in the sequence of frequency of viewing or frequency of reserving (see Japanese Patent Application No. 7-272668).

As a method of confirming other broadcast program while viewing (off-screen program), in many conventional television receivers, since the number of channels is relatively small, the screen is divided into 3×3 nine sub-screens or 4×4 sixteen sub-screens, and moving pictures are displayed.

Digital broadcasting can be multiple in functions. The user can set various functions and select various items of multiple functions interactively through the screen.

One of the representative tools for interactive operation is the personal computer. In the personal computer, since the number of items to be set is great, the display of hierarchical structure is employed as a method of displaying multiple setting items.

In the display method of hierarchical structure, the main menu panel is at the top, and menu panels of plural layers of tree structure are prepared beneath it. When one item is selected and instructed out of plural items in the main menu panel, the display is changed over to the menu panel of the second layer corresponding to this item. The menu panel of the second layer also has plural items, and when one item is selected and instructed among them, the display is also changed over to the menu panel of the third layer corresponding to that item. Thereafter, the same operation is repeated to go into deeper layers gradually, and the desired function and item are selected.

It may be considered to apply such method into broadcast receiving apparatus, in particular, the digital broadcast receiving apparatus. But it has the following problems.

In one of the practical examples of interactive operation through screen for setting of various functions and selection of various items in broadcast receiving apparatus, the program information is displayed on the screen in a format of program lists, and various functions are set and various items are selected by using it (see FIG. 48). This program list is partitioned into small rectangular frames (called cells), and the vertical direction denotes the time axis and the lateral direction represents the channel axis. This program list is fixed in the display width per hour.

The user contracts with a broadcast provider about viewing channels, and receives. The user, making use of the displayed program list, selects the program, reserves recording, or reserves viewing.

When reserving to record a program or reserving to view, the user changes over to the customize screen. On this customize screen, the user can order program recording reservation or viewing reservation, select or set a request. Specific broadcast programs are paid programs, and when viewing a paid program, the charge is accounted.

An IC card containing the subscribed channel information is set in the broadcast receiving apparatus, and the program purchases procedure, reception control, and charge control are done in this IC card. The broadcast provider accesses the IC card through a telephone circuit to acquire the charge record information relating to the purchased programs in the broadcast receiving apparatus of each user. The modem built in the broadcast receiving apparatus is connected parallel to the public telephone circuit together with telephone, facsimile apparatus or personal computer.

The IC card charges the amount for every purchased program, stores the history of charge record information, calls by the telephone circuit through the modem when the quantity of information reaches a specific value, and transmits the charge record information to the broadcast provider through the telephone circuit.

As mentioned above, digital broadcasting has extremely many channels, and the channel display is given in three digits. Because of three digits, the user is often confused when selecting channels. It hence requires a help for the user to select the channels correctly.

In the case of partial on-screen display processing in a broadcast receiving apparatus having a display screen of aspect ratio 4:3, when the received broadcast is an ordinary broadcast of aspect ratio 4:3, the channel number is displayed as shown in FIG. 46. If, however, the received television broadcast is the wide broadcast mentioned above, part or whole of the channel number to be displayed is out of the wide screen 144 as shown in FIG. 47 (*b*), and gets into the blank region as shown by reference numeral 145*a*. That is, part or whole of the channel number 145*a* is not displayed.

Besides, concerning the preset channel function, since there are many channels, it is more complicated than before to select channels to be preset, and select preset channels.

To cope with the multiple functions, when the hierarchical display used in the personal computer is applied in the broadcast receiving apparatus, the following problems are known.

When the hierarchical display used in the personal computer is directly applied, there are too many problems. Most users of broadcast receiving apparatus are general household members, and are not accustomed to such hierarchical display, and are often complete laymen about its manipulation. On the other hand, as mentioned above, the broadcast receiving apparatus of digital broadcast is multiple in functions, and the user can make various settings interactively through the screen. Accordingly, to employ hierarchical display in broadcast receiving apparatus of digital broadcast, it is necessary to facilitate understanding and manipulation of hierarchical display. It is therefore necessary to employ a new hierarchical display not used in ordinary computers.

Regarding the program list, it is desired to present as many programs as possible. However, since the display screen area is fixed, so many programs cannot be displayed at the same time. Besides, the display screen of the broadcast receiving apparatus is viewed from a relatively distant position unlike the personal computer, and the display characters cannot be too small, which is another factor of limiting the number of display characters.

For program display, it is desired to display many channels for many hours. But the space assigned for unit time is narrow, and the number of programs to be displayed is limited. As a result, the display region per program is narrow, the quantity of information is small, or the whole name of the program cannot be displayed in the cell, and a long name is cut off halfway and specific content cannot be displayed. It hence brings about problems in ease of manipulation and sense of manipulation.

To confirm the off-screen programs in the broadcast receiving apparatus of digital broadcast, since there are too many channels, it is difficult to confirm the off-screen programs in the conventional system of television receiver to divide into sub-screens and display moving pictures because each screen becomes too small. It is hence necessary to facilitate confirmation of off-screen programs and manipulation of channel selection by some way or other.

The user selects a program, reserves to record and reserves to view by utilizing the displayed program list and customize screen, but what must be noted is that one must keep memory of the channel number to be processed or other off-screen program during manipulation.

Reservation to record or reservation to view involves other problems. Suppose the remote controller is manipulated during reservation, and when the manipulation is accepted, the reservation to view may be canceled unexpectedly. Instead, if the system is locked during reservation, other program cannot be viewed. If unlocked, execution of reservation is uncertain as in the case above. Moreover, if the power source of the display unit (the CRT device and display means for sending video signal to the display device such as CRT device) is turned off, the tuner is working, and when viewing is reserved, its charge may be accounted although the reserved program is not actually seen.

The IC card charges the amount for every purchased program, stores the history of charge record information, calls by the telephone circuit through the modem when the quantity of information reaches a specific value, and transmits the charge record information to the broadcast provider through the telephone circuit. The user does not know at all when such call is made. The user does not known when the IC card processes such charging.

If attempted to ring, send facsimile message or make PC communications at the timing of access to the modem, the telephone circuit is already occupied by the modem, and the user cannot use such terminal devices. This disabled state is quite unexpected for the user and it is very inconvenient. It is therefore desired that the occupation of telephone circuit by access of the broadcast receiving apparatus to the modem should be known.

The IC card is usually detachable, but it must be always set in the broadcast receiving apparatus. But it is possible that the IC card is removed by the user by accident, or by a child out of mischief. If the removal timing is during access to the IC card, the processing action may be unexpectedly interrupted, or the internal information may be broken. Moreover, if the IC card is removed, the program of subscribed channel cannot be viewed. It is hence desired for the user to known whether the IC card is being accessed or not.

In the existing broadcast receiving apparatus, the user cannot know directly the charge record information from a certain time up to the present time. It is one of the anxieties for the user. For example, possibly, the child may purchase programs one after another to result in a tremendous charge amount, or can secretly purchase a paid program with age limit. It is therefore desired that the user can know the charge record information.

SUMMARY OF THE INVENTION

To solve the many problems mentioned above, the invention presents a broadcast receiving apparatus comprising receiving means for receiving broadcast, display means for interactive display of selection of program, off-screen program, channel selection, preset selection, subscription, reservation, charge, charge based on actual viewing, and other charge information, and for display with psychological effects such as display character style, display screen format, and color rendition display, image generating means for generating images to be displayed, image synthesizing means for synthesizing the images with received images, control means for controlling the image generating means and the receiving means, and storing means for storing received signals and data generated by the control means while cooperating with the control means.

By this apparatus, the controllability of the broadcast receiving apparatus is outstandingly enhanced as described below.

In a first aspect, the input manipulation of channel number to be received is easy to understand. When selecting a channel while confirming the numerals on partial on-screen display overlaying on the screen of channel number, in the midst of input manipulation of numerals (entering one digit or two digits), the display state of numerals is changed in color or shape from the ordinary state, or flickered, and characteristic display making use of psychological effect is made, so that the user may be clearly conscious that it is now in the process of input manipulation. Then three digits are entered by input manipulation, the numerals are displayed normally, so that the user knows that the manipulation is complete.

In a second aspect, when the received television broadcast is a wide screen of letter box format and it is in the partial on-screen display mode, in order to treat the wide broadcast as ordinary broadcast, a false image is added in the blank region, and the auto wide function in the broadcast receiving apparatus is stopped, or the partial on-screen display is preliminarily moved into the video region of the wide broadcast so as not get out of the wide screen in the case of auto wide processing, and therefore the partial on-screen display can be shows in specified correct position of the wide screen.

In a third aspect, depending on the duration of the time for manipulating the preset channel or manipulating the key, it is constituted to change over the display or setting function of preset channel.

In a fourth aspect, in hierarchical display of menu panel, by overlap display by adding a layer index to the menu panel of each layer, the present layer being manipulated may be known at a glance.

In a fifth aspect, in program list display, an official program name display column is displayed in a predetermined specific position, aside from the program list display column, and when a specific program is selected to change over to a program content briefing screen in order to obtain briefing of a program of interest in the display state of program list display, the content briefing screen displaying the detailed content of the selected program is displayed nearly in the entire area of program list display column in a state of over-write, while the display state of the official program name display column is maintained. Therefore, the name of the program being briefed is always known, so that the controllability and sense of manipulation may be comfortable.

In a sixth aspect, it is constituted to maintain the display state of the official program name display column if changed over from the broadcast content briefing screen to the reserve condition customize screen, the name of the program can be checked by the display of the official program name display column in the state of customize setting, and the customize can be set confidently without hesitation, so that the controllability and sense of manipulation may be comfortable.

In a seventh aspect, it is constituted to maintain the display state of the official program name display column if changed over from the reserve condition customize screen to the reserve confirm screen, the name of the program can be checked by the display of the official program name display column in the state of confirming the reservation, and the reservation can be confirmed confidently without hesitation, so that the controllability and sense of manipulation may be comfortable.

In an eighth aspect, together with the official program name display column, the broadcast date display column is displayed in a predetermined specific position, and therefore it is known on which day the program is broadcast, during manipulation sequence, immediately on any screen, so that the controllability and sense of manipulation may be further enhanced.

In a ninth aspect, together with the program list display column, the official program name display column is provided in a predetermined specific position, and the official name of the program corresponding to the cell indicated by the cursor in the program list display column is displayed in the official program name display column, and therefore as many cells or programs as possible are displayed in the display screen of a limited area, while the program of which cell is specified by the cursor is displayed in the full name in the official program name display column provided specifically, keeping the display of other programs.

In a tenth aspect, the display formats of the cell specified by the cursor and the official program name display column are same or similar so as to be closely related to each other, and the visual correspondence of the two is intensified, and the controllability and sense of manipulation may be enhanced.

If the program is provided with attribute such as charge and age limit, the attribute is indicated by icon in the cell of the program list display column, and when the cell is specified by the cursor, the explanation corresponding to the icon is displayed in the official program name display column, and therefore if the individual cells are narrow, the attribute of the program in the cell (charge, age limit, etc.) can be specifically displayed in the official program name display column.

In an eleventh aspect, in display of off-screen program, information of plural off-screen programs is displayed in characters by superposing on the program being viewed, and the display of off-screen programs is scrolled to present correct information about multiple off-screen programs, and the program can be selected while displaying the off-screen programs.

The user can easily manipulate various operations, especially setting and checking operations, interactively through the screen.

In a twelfth aspect, where multiple programs are prepared per hour, program names are displayed by one line each, for a specific number of pieces, for example, two, from the one of the longest broadcasting time, while the remaining programs are displayed only in a narrow gap enclosed by upper and lower separation lines, and when the cursor is adjusted to the narrow gap, the corresponding program name is shown by pop-up display, and therefore two program names of longer broadcasting time are always displayed, and the programs concealed in the gap and not displayed in program names can be specifically shown in pop-up display to indicate the program names, so that many programs can be substantially displayed in a narrow region. The detailed information of the program by pop-up display is shown in the official program name display column, so that the controllability and sense of manipulation may be further enhanced. Still more, in the time display column of the program list display column, the time is divided and displayed in plural stages by changing colors in time zones, and hence if the time zone displayed in the program list display is short, the divisions of AM and PM, or morning, afternoon, evening and night can be intuitively distinguished.

In a thirteenth aspect, in record reserve mode, by locking the operation and OSD of the broadcast receiving apparatus, the record reserve action is executed if the power source of the display means is in OFF state. In view reserve mode, without locking the operation and OSD of the broadcast receiving apparatus, the view reserve action is executed in the ON state of the power source of the display means, but in the OFF state of the power source of the display means, it is constituted not to execute the view reserve action. Accordingly, the program desired to be viewed can be viewed timely, by reserving to view the program, when the power source of the display means is ON when reaching the reserve start time. On the other hand, when the power source of the display means is OFF, it cannot be viewed, and the view reserve action is not executed. Therefore, it is not charged in this case. This eliminates the inconvenience of charging while not viewing. In the case of a necessary program, by reserving to record by locking the operation and OSD of the broadcast receiving apparatus, avoiding unexpected channel changeover, the reserved program can be securely recorded, and can be played back later so that the program can be viewed securely.

In a fourteenth aspect, the broadcast receiving apparatus is provided with an indicator for operating in collaboration with the access of the modem accessible with the telephone circuit, and the indicator warns the user that the telephone or other terminal device cannot be used, so that confusion in use of telephone circuit can be avoided.

In a fifteenth aspect, the broadcast receiving apparatus is provided with an indicator for operating in collaboration with the access of the IC card which is detachably set for making procedure for purchase of program, controlling reception, accounting and controlling the charge, and the indicator warns the user not to pull out the IC card, so that the protection of the IC card can be enhanced.

In a sixteenth aspect, whether an approximate amount or official amount, the charge amount cumulative total is displayed, and it is helpful for judging if the charge amount cumulative total is in a proper range or excessive, and it is possible to check if the programs are purchased by the child without permission to result in a tremendous charge amount cumulative total.

In a seventeenth aspect, the purchases program information is listed and displayed including program name and charge amount in each purchased program, and the trend of program purchase and inclination of purchased program can be known at a glance, and it is possible to check if an age restricted program is viewed by the child or not.

BRIEF DESCRIPTION OF THE DRAWINGS

FIG. 26 is a display state diagram of program list display screen in embodiment 7.

FIG. 31 is a display state diagram of pop-up display in program list display picture in a broadcast receiving apparatus in embodiment 9.

FIGS. 32(a)–32(c) are display state diagrams of pop-up display in other format in embodiment 9.

FIG. 33 is a diagram showing a time control table in a broadcast receiving apparatus in embodiment 10.

FIG. 43 is a display state diagram of purchase record in embodiment 13.

FIG. 48 is a display state diagram of program list display screen in prior art.

EXEMPLARY EMBODIMENTS

1st EMBODIMENT

Figure 1:
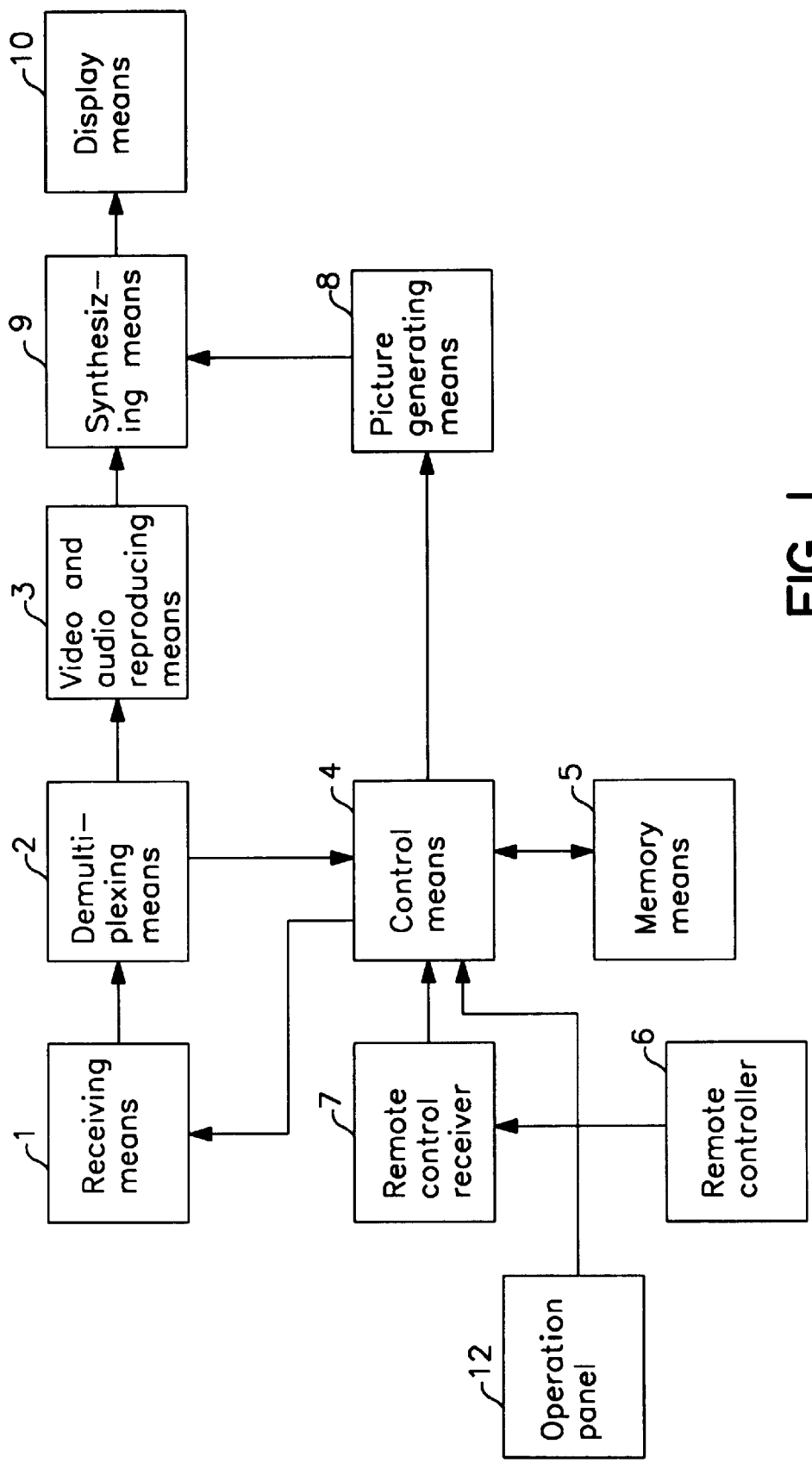
FIG. 1 is a block diagram showing a schematic constitution of broadcast receiving apparatus according to embodiment 1 to embodiment 10.

FIG. 1 is a block diagram showing a schematic constitution of a broadcast receiving apparatus of digital system according to embodiment 1. In FIG. 1, reference numeral 1 is receiving means including a tuner for receiving broadcast and tuning and demodulating means, 2 is demultiplexing means for extracting video signal, audio signal and program information from received broadcast signals, 3 is video and audio reproducing means for decoding video signal and audio signal, 4 is control means for controlling parts of the apparatus and processing information and having functions for assisting the user to select a program or a channel number, 5 is memory means for temporarily storing information, 6 is a remote controller for sending out an operation control signal for manipulating the broadcast receiving apparatus, 7 is a remote control receiver for receiving the operation control signal from the remote controller and decoding and delivering to the control means 4, 8 is image generating means for generating an on-screen display signal (OSD), 9 is synthesizing means for superimposing the on-screen display signal on the video signal, 10 is display means for delivering the video signal to a display device such as display and TV receiver, and 12 is an operation panel provided in the main body of the broadcast receiving apparatus.

In the explanation to follow, the broadcast receiving apparatus does not include display device such as display and TV receiver, but the operation is the same if the display means includes display device such as display and TV receiver. It must be hence noted that the invention also includes a case in which the display means includes a display device.

The control signal for manipulating broadcast receiving apparatus is fed from the remote controller, but if the operation control signal is entered from the operation panel 12 of the broadcast receiving apparatus, the broadcast receiving apparatus operates similarly.

Only the display of picture is explained herein, but the sound accompanying the picture behaves similarly. To avoid complication, description about sound is omitted herein. It must be, however, noted that the invention is also applied to the sound accompanying the picture.

The program information is the data including the content about the program to be broadcast and attached information such as broadcasting time. This program information is multiplexed on the broadcast signal, and is sent out from the transmitter. The broadcast receiving apparatus receives these transmitted signals (receiving means 1), demultiplexes (demultiplexing means 2), and stores in the memory means 5 through the control means 4. Incidentally, the program information may be also transmitted by other broadcast or other media, but even in such case the broadcast receiving apparatus can handle such information similarly.

When the broadcasting receiving apparatus receives a numerical input such as channel number, the received numeral is usually displayed in either corner of the screen. The broadcast receiving apparatus of the invention is characterized by comprising means for displaying the received input numeral in a special display format different from the numerical display format in ordinary mode, means for continuing the numerical display state in the special display format until the number of digits of the received input numeral reaches a specified number of digits, and urging numerical input operation by continuing the numerical display in the special display format, and means for returning to the numerical display format of ordinary mode only after the number of digits of the received input numeral has reached the specified number of digits.

The special display format is a display format different from the display format of ordinary mode, by changing the color, changing the shape, changing the frame, or flickering. That is, it is the display using a conspicuous display format so that the user may notice easily. The user, seeing the display screen shown in special display format, becomes naturally away of the present process of numerical input, and strongly recognizes that the input manipulation is in process and must be continued, and is urged to continue input, and when the input operation is complete, the display returns to normal state, and the user knows that the input operation is complete. Thus, in addition to the interactive input operation, the display method making use of psychological effect on the man about the numerical display, error in input operation is prevented, and it is easier to use.

The numerical input is not limited to the channel number alone. In the case of input operation of numerals and characters in plural digits such as password input, and in other operation accompanied by screen display, the display in the midst of operation, and display upon completion or operation, that is, the normal display can be similarly shown as described above.

Figure 3:
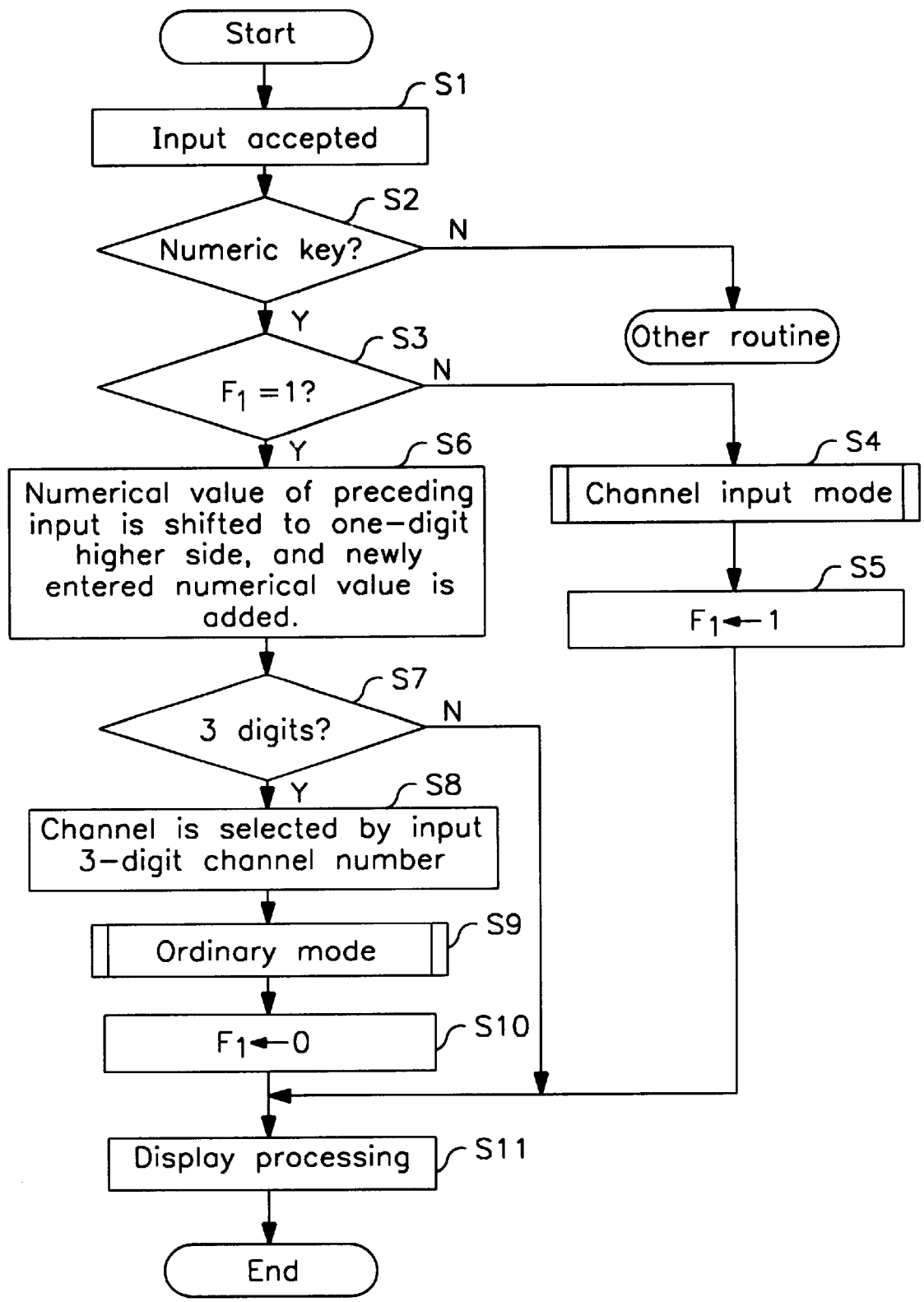
FIG. 3 is a flowchart showing action of channel input for selecting station in embodiment 1.
Figure 4A:
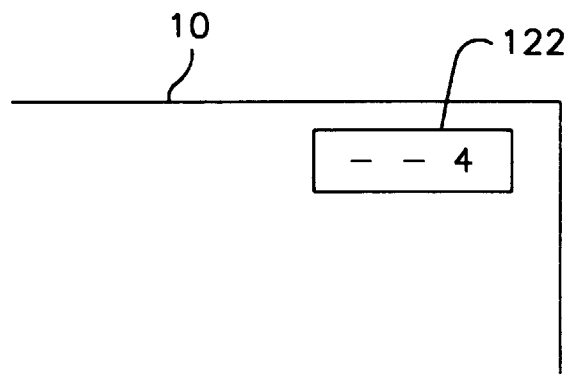
FIGS. 4(a)–4(c) are display state diagrams of input channel number in embodiment 1.
Figure 4B:
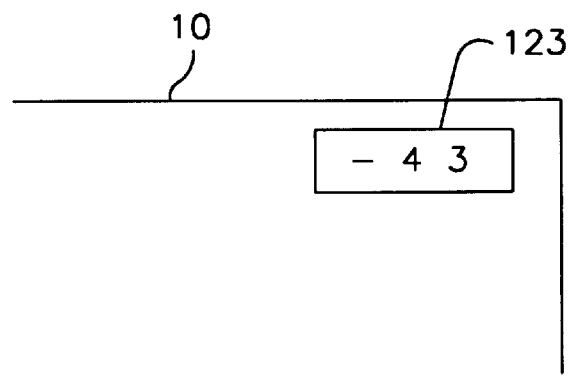
Figure 4C:
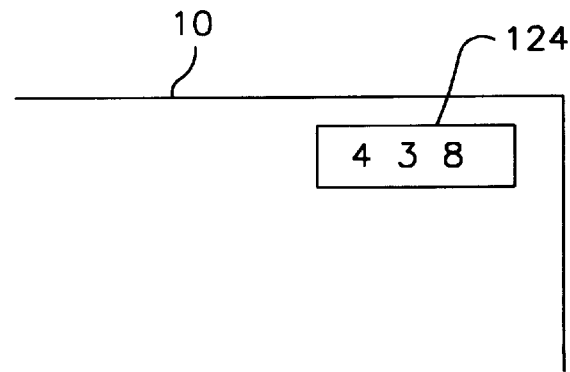

The operation for channel number input for channel selection is described below while referring to the flowchart in FIG. 3 and display state diagrams in FIGS. 4(a)–4(c).

Figure 2:
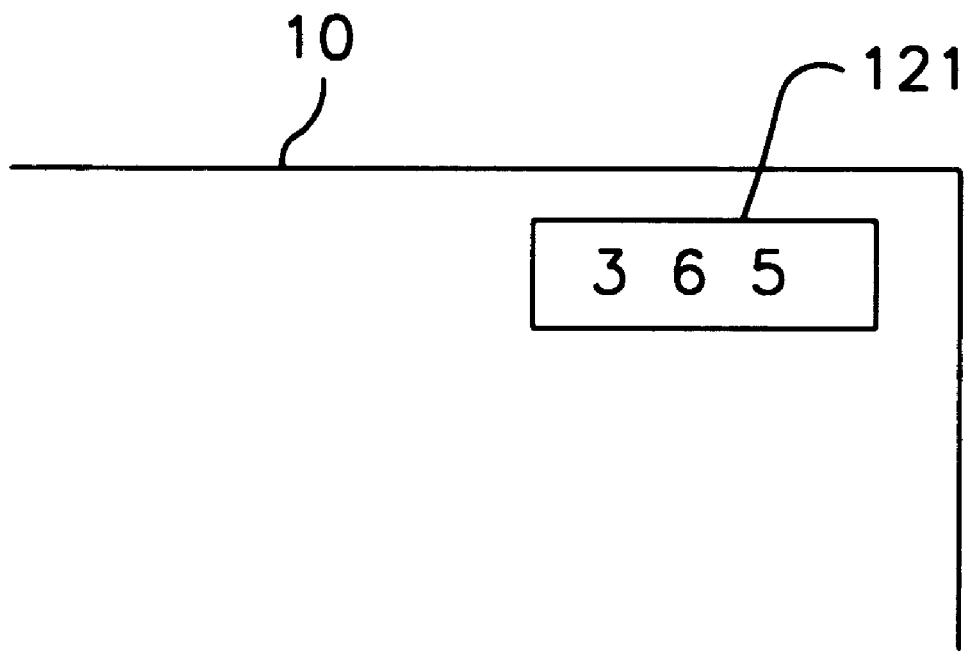
FIG. 2 is a channel number display state diagram in ordinary mode in embodiment 1.

The channel number is supposed to be determined by a three-digit number from 100 to 999. In the ordinary mode of display of received program on the CRT screen by input of output of the display means 10, when a channel call key in the remote controller 6 is manipulated, a channel number 121 consisting of three digits of the channel number being presently received is displayed in a corner of a CRT screen for receiving and displaying the output of the display means 10 as shown in FIG. 2, through the remote control receiver 7, control means 4, image generating means 8, and synthesizing means 9. The channel number display in the ordinary mode is displayed, for example, in blue color.

The control means 4 is in input accepting state (step S1). The user enters a three-digit numeral of a desired channel number sequentially by using numeric keys of the remote controller 6. Herein, suppose the user selects channel 438. The operation control signal of the broadcast receiving apparatus from the remote controller 6 is received in the remote control receiver 7, and is decoded and delivered to the control means 4. The control means 4 judges if the input manipulated key is a numeric key or not (step S2). This judgement is made on each key. First, herein, a numeric key of numeral 4 is entered, and numeral 4 is stored in the memory means 5. It is then judged if flag F1 showing channel number input mode is set at "1" or not (step S3). If flag F1 is "0", it means that the channel number key is manipulated for the first time for selecting channel in ordinary mode (input of numeral 4). Accordingly, the control means 4 changes over the mode to the channel number input mode (step S4), sets flag F1 in "1" to store the channel number input mode (step S5), and generates the numeral ("4") corresponding to the numeric key manipulated as shown in FIG. 4 (a) by the image generating means 8, and displays the third digit numeral 4 (indicated by reference numeral 122) of the channel number in the first digit display position in a corner of the CRT screen for displaying by receiving the output of the display means 10 (step S11).

When changing over to the channel number input mode, the image generating means 8 changes to a different display state from the ordinary mode. For example, the blue display in the ordinary mode is changed to a red display. Besides, the design of the numeral may be changed, or the background color, frame color or shape may be changed, or flickering display may be used. A hyphen may be also displayed in the display position of the second digit and third digit. In short, it is intended to give a strong impression of the channel number input mode, not ordinary mode, to the user. Herein, red flickering display is supposed. The user knows it is now in the process of selecting channel, and comes to have a stronger consciousness of the situation by seeing the red flickering state on the display screen. In this manner, the user is strongly urged to enter next numeral.

In succession, the user manipulates the numeric key of 3 for the second digit of channel 438 to be selected from the remote controller 6. The control means 4 advances from step S2 to step S3, but since flag F1 has been already set to "1", further advancing to step S6, the preceding input numeral is shifted to higher side by one digit, and the newly entered numeral is added. In the control means 5, "43" is stored. It is then judged if the input numeral has reached three digits or not (step S7). Herein, it is still two digits, skipping to step S11, the numeral 43 corresponding to the input manipulated numeric keys is generated in the image generating means 8 as shown in FIG. 4 (*b*), and the third digit and second digit numerals 43 (reference numeral 123) of the channel number are displayed in the first digit and second digit display positions by red flickering state in the corner of the screen of the CRT for displaying by receiving the output of the display means 10 (step S11). Successively, the user manipulates numeric key 8 of the first digit of the channel 438 to be selected from the remote controller 6. The control means 4 advances from step S2, S3 to step S6, and shifts the previous input numeral to the higher side by one digit, and adds the newly entered numeral. In the memory means 5, "438" is stored. It is then judged if the input numeral has reached three digits or not (step S7). Herein, it is three digits, and the tuner of the receiving means 1 is controlled, and channel 438 is selected (step S8), and the display state is returned to ordinary mode (step S9), the flag F1 is reset to "0" (step S10), and the numeral 438 corresponding to the input manipulated numeric keys is generated by the image generating means 8 as shown in FIG. 4 (*c*), and third digit, second digit, and first digit numerals 438 (reference numeral 124) of the channel number are displayed in red color of ordinary mode at first digit to third digit display positions in the corner of the screen of the CRT for displaying by receiving the output of the display means 10 (step S11).

Thus, in the channel number input mode, the input numeral is indicated in a different format than in ordinary mode, and this special display format causes the user to have consciousness of the present process of channel number input mode, and strongly urges to enter next numeral, and when the input operation is over, the display is changed to the ordinary mode display state, so that the user can manipulate smoothly to enter the channel number.

Figures 5, 6:
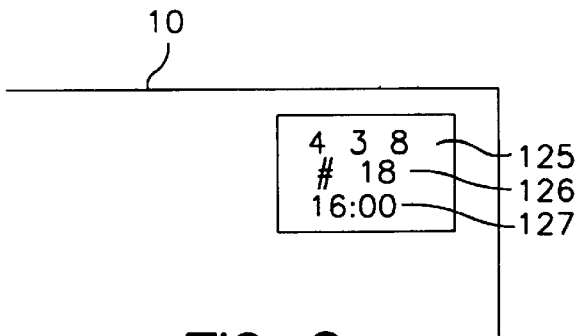
FIG. 5 is a diagram showing a correspondence table of preset numbers and channel numbers in embodiment 1.
FIG. 6 is other display state diagram of channel number in embodiment 1.

Incidentally, the channel of high frequency of viewing is registered at the remote controller 6 side by corresponding to a preset channel (described in 4th EMBODIMENT) key. For example, as shown in FIG. 5, preset numbers and channel numbers correspond to each other. This relation is stored as a table in the memory means 5. In this case, in display of channel number, as shown in FIG. 6, the channel number 125, preset number 126, and time 127 may be displayed in the screen of the CRT for displaying by receiving the output of the display means 10. Or, as mentioned above, as the display of input numeral in a display state obviously different from the ordinary mode same as in the channel number input mode, for example, it may be applied in the case of input of password for adult program.

Thus, in the numerical input for channel or password, since the input numeral is shown in special display format such as change of color, shape or frame or flickering, as compared with ordinary display format, the user has a strong impression that it is now in the process of numerical input operation, and input operation is urged, and the ordinary display format is restored when input operation is over, telling the completion of input operation, and thus the input operation is interactive, and the controllability of the input may be enhanced.

2nd EMBODIMENT

The broadcast receiving apparatus of the invention is characterized by stopping the auto wide function in the display device by comprising means for generating and adding pseudo-image to the blank region when the received television broadcast is wide screen of letter box format accompanied by blank area, being in partial on-screen display mode. The wide broadcast after addition of pseudo-image is regarded same as ordinary broadcast, and it is directly displayed in the wide screen without auto wide processing, and if a partial on-screen display is generated same as in the case of ordinary broadcast with aspect ratio 4:3, the partial on-screen display is shown in the specified correct position of the wide screen without effects of malfunction of auto wide function.

It is also a feature that the invention comprises means for stopping generation of pseudo-image when the partial on-screen display mode is canceled. When it is not necessary to display the partial on-screen display, the pseudo-image is erased, and the wide broadcast hitherto regarded as ordinary broadcast is recognized as its original wide broadcast, and the wide broadcast is displayed exactly on the wide screen by the auto wide processing.

A block diagram showing a schematic constitution of the broadcast receiving apparatus of digital system according to embodiment 2 is also shown in FIG. 1 same as in embodiment 1, and the further explanation is given below by referring to FIG. 1.

When a channel display key is manipulated in the remote controller 6, the operation signal is received in the remote control receiver 7, and is decoded and applied to the control means 4. The control means 4 controls the image generating means 8 for processing on-screen display, generates image data of channel number of the channel being received at the present, superimposes it on the video signal through the synthesizing means 9, and displays the channel number in the upper right corner of the screen of the CRT for displaying by receiving the output of the display means 10. Of course, besides the channel number, the icon, message display or other various partial on-screen display can be displayed by other proper manipulations.

Figure 20A:
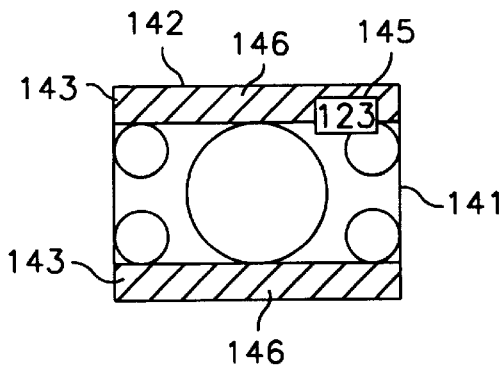
FIGS. 20(a)–20(c) are explanatory diagrams of display processing of partial on-screen display (channel numbers) in wide broadcast in embodiment 5.
Figure 20B:
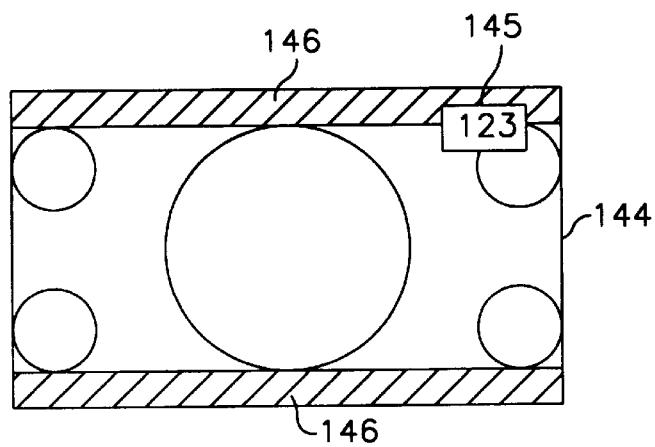
Figure 20C:
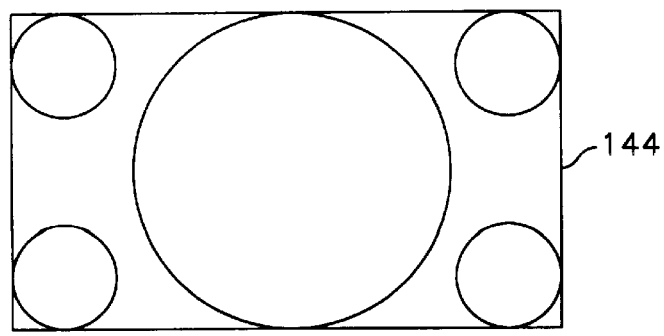

The control means 4 also has the following corrective function for misoperation of auto wide function. As shown in FIG. 20 (*a*), when the received television broadcast is a wide broadcast in the screen composition 141 of letter box format accompanied by upper and lower blank portions 143, and it is in the display mode of partial on-screen display 145 such as channel number, the control means 4 controls the image generating means 8 having the on-screen display function, and generates and adds, for example, gray false images 146 to the regions of the upper and lower blank portions 143. Then the control means 4 judges the received television broadcast as an ordinary broadcast with the screen composition 142 of aspect ratio 4:3, and, as a result, the control means 4 stops the auto wide function, and displays the screen composition 142 of aspect ratio 4:3 on the wide screen 144 as shown in FIG. 20 (*b*). Accordingly, the partial on-screen display 145 of channel number or the like is displayed in specified correct position in the upper right corner of the screen of the wide screen 144 without effects of misoperation of the auto wide function.

Whether the wide screen of letter box format accompanied by blank portions or not can be judged by the program information of the wide broadcast. In the upper and lower regions of the wide screen 144, pseudo-images 146 are displayed.

Figure 21:
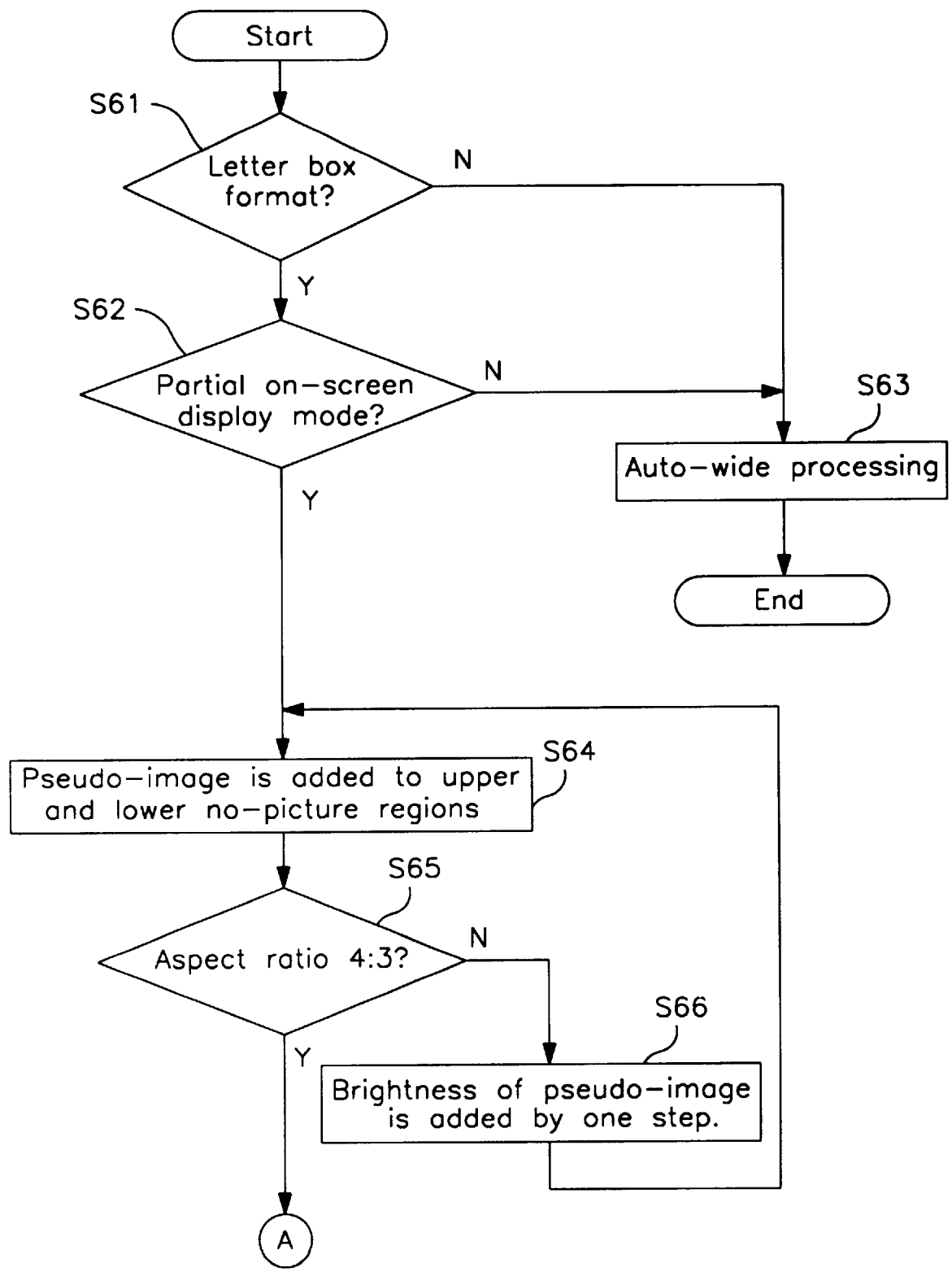
FIG. 21 is a flowchart for explaining the operation of embodiment 5.
Figure 22:
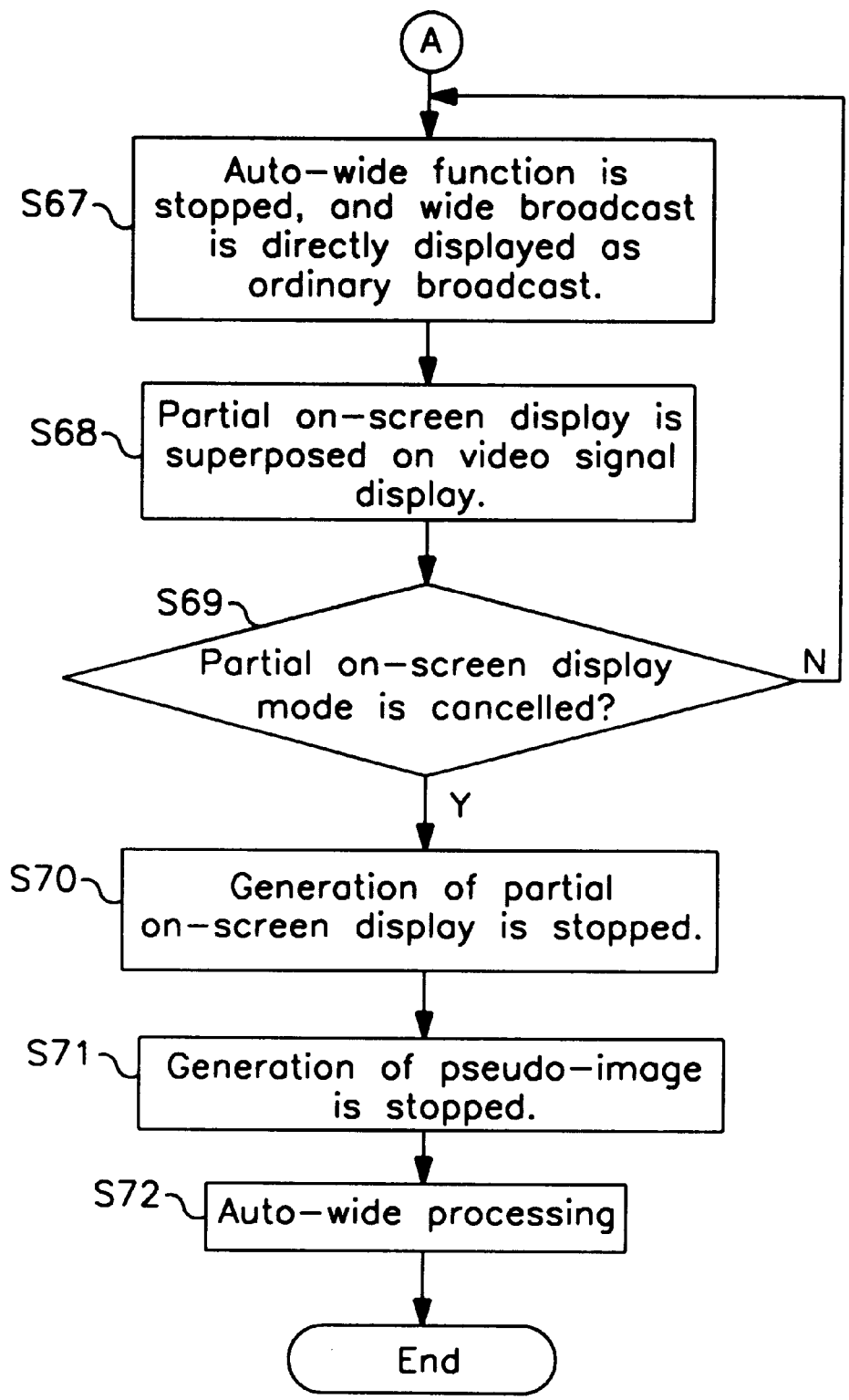
FIG. 22 is a flowchart (continued from FIG. 21) for explaining the operation of embodiment 5.

This operation is explained according to the flowchart in FIG. 21 and FIG. 22. Judging if the received television broadcast is a wide screen of letter box format or not (step S61), and if it is the wide screen of letter box format accompanied by blank portions 143, it is then judged if it is in the mode for displaying the partial on-screen display 145 (step S62), and if it is not in that mode, auto wide process is executed (step S63). Also in the case of ordinary broadcast without blank portions 143, auto wide process is executed.

In the case of the mode for displaying the partial on-screen display 145, for example, gray pseudo-images 146 are generated and added to the regions of the upper and lower blank portions 143 by the image generating means 8 having the on-screen display function (step S64). In succession, using part of the auto wide process, it is judged if the aspect ratio is 4:3 or not (step S65), and if the aspect ratio is judged to be 16:9, the luminance of the pseudo-image 146 is insufficient, and the luminance of the pseudo-image 146 is increased by one step in the image generating means 8 (step S66), and the process returns to step S64. When the aspect ratio is judged to be 4:3, the auto wide function is stopped, and the wide broadcast is directly displayed as ordinary broadcast (step S67). The partial on-screen display 145 is generated, and is superimposed on the received video signal (step S68). Thus, the partial on-screen display 145 such as channel number is displayed in specified correct position in the upper right corner of the screen of the wide screen 144 without effect of misoperation of the auto wide function as shown in FIG. 20 (*b*).

Meanwhile, the process from step S65 to step S66 may be omitted, and a fixed pseudo-signal of a predetermined sufficient luminance may be added at step S64.

Consequently, it is judged if the display mode of the partial on-screen display 145 is canceled or not (step S69), and when the mode is maintained, the process returns to step S67, but when the partial on-screen display mode is canceled, generation of partial on-screen display 145 by the image generating means 8 is stopped (step S70), and further generation of pseudo-image 146 by the image generating means 8 is stopped (step S71), and the operation is transferred to execution of auto wide process (step S72).

As a result, as shown in FIG. 20 (*c*), the wide screen is modified to settle exactly within the wide screen 144. From the wide screen 144, the partial on-screen display 145 and upper and lower pseudo-images 146 are eliminated.

In this embodiment, when the received television broadcast is a wide screen of letter box format, and the on-screen display is the partial on-screen display mode, pseudo-images are added to the blank regions in order to treat the wide broadcast as ordinary broadcast, and when the partial on-screen display mode is canceled, the pseudo-images are removed, so that the partial on-screen display can be shown in the specified correct position of the wide screen.

3rd EMBODIMENT

The broadcast receiving apparatus of the invention is characterized by comprising means for moving the generating position of the partial on-screen display into the region of video signal of wide broadcast when the received television broadcast is a wide screen of letter box format accompanied by blank portions and it is in the partial on-screen display mode. Since the partial on-screen display moves into the image region of wide broadcast, when the auto wide process is executed directly, the partial on-screen display is shown in the specified correct position of the wide screen. In the case of ordinary broadcast, this move is not executed, and the partial on-screen display is shown in the corner of the screen of aspect ratio 4:3, so that the screen will not be disturbed.

Figure 23A:
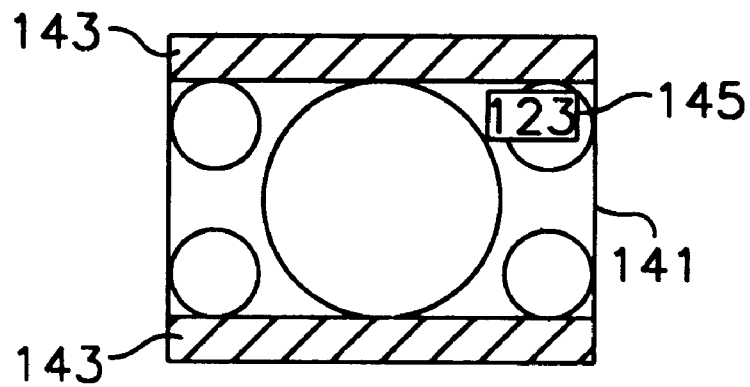
FIGS. 23(a) and 23(b) are explanatory diagrams of partial on-screen display processing on wide screen in embodiment 6.
Figure 23B:
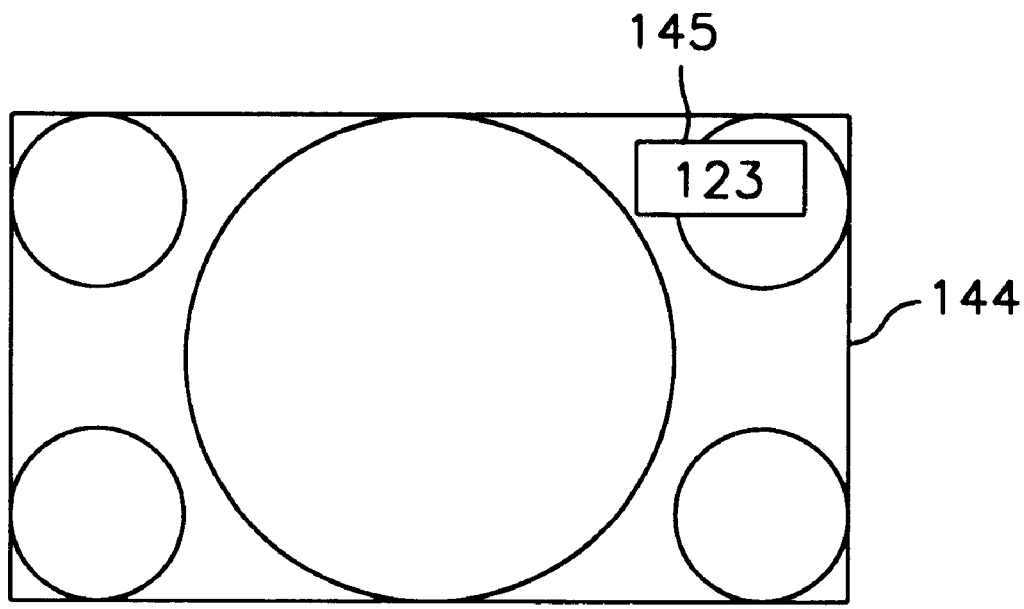

The control means 4 in the broadcast receiving apparatus of digital broadcast in embodiment 3 has the following corrective function for misoperation of the auto wide function. Same as in the case of embodiment 2, when the received television broadcast is a wide broadcast in the screen composition 141 accompanied by upper and lower blank portions 143 as shown in FIG. 20 (*a*) and it is in the display mode of partial on-screen display 145, the control means 4 controls the image generating means 8 having the on-screen display function, and moves the generating position of the partial on-screen display screen 145 from the region of blank portion 143 into the region of the video signal of wide broadcast, as shown in FIG. 23 (*a*), that is, into the upper right corner of the screen composition 141. When the auto wide process is executed in this state, as shown in FIG. 23 (*b*), the wide broadcast is displayed in the state exactly setting within the wide screen 144 of aspect ratio 16:9, and the partial on-screen display 145 of channel number or the like is displayed in the specified correct position in the upper right corner of the screen of the wide screen 144 without having effects of misoperation of auto wide function.

Figure 24:
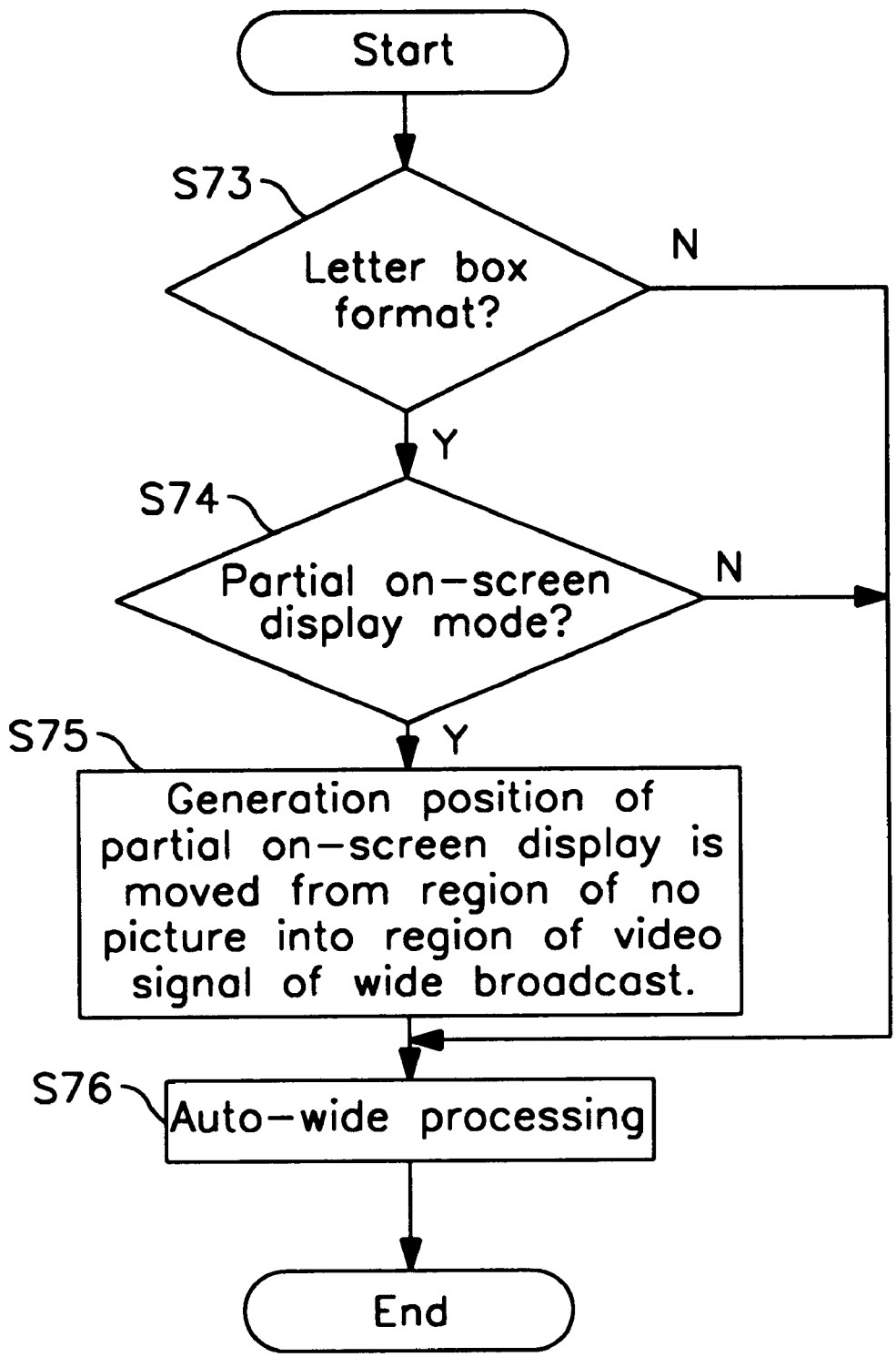
FIG. 24 is a flowchart for explaining the operation of embodiment 6.

This operation is described according to the flowchart in FIG. 24. Judging if the received television broadcast is a wide screen of letter box format accompanied by blank portions 143 (step S73), if it is the wide screen of letter box format, it is then judged if the mode is for displaying the partial on-screen display 145 or not (step S74), and if it is not that mode, the auto wide process is executed (step S76). Also in the case of ordinary broadcast without blank portion 143, the auto wide process is executed.

In the case of the mode for displaying the partial on-screen display 145, in the image generating means 8 having the on-screen display function, the generating position of the partial on-screen display 145 is moved into the region of the video signal of the wide broadcast from the region of the blank portion 143 (step S75). Then, as usual, the auto wide process is executed (step S76). In this case of embodiment 3, the auto wide function is not stopped. Incidentally, when the display mode of partial on-screen display is canceled, merely the partial on-screen display 145 disappears.

In the foregoing embodiments, the channel number is used as the example of partial on-screen display, but the invention may be similarly applied to other displays such as icon and message display.

In this embodiment, when the received television broadcast is a wide screen of letter box format and the on-screen display is the partial on-screen display mode, the partial on-screen display is preliminarily moved into the image region of wide broadcast so as not get out of the wide screen, so that the partial on-screen can be shown in the specified correct position of the wide screen.

4th EMBODIMENT

It is a feature of the invention that it comprises operation means about preset channel, and also means for displaying a list of preset channels when this operation means is manipulated for a short time, and displaying a setting screen of preset channel when this operation means is manipulated for a long time.

Embodiment 4 relates to display and setting of preset channel number. The preset channel is a method of selecting a channel by using a key number, not a channel number, when selecting a channel, by preliminarily registering corresponding key numbers (preset channel numbers) for channel number of the channels of high frequency of viewing or high frequency of reserving. For example, supposing channel 225 is most often viewed, it is registered in a key number, that is, preset key ①. When viewing channel 225, usually, numerals 2, 2 and 5 are sequentially entered by using numeric keys through the remote controller 6, but instead, only by pressing the registered key number, or preset number ① in this case, channel 225 is selected.

Figure 7:
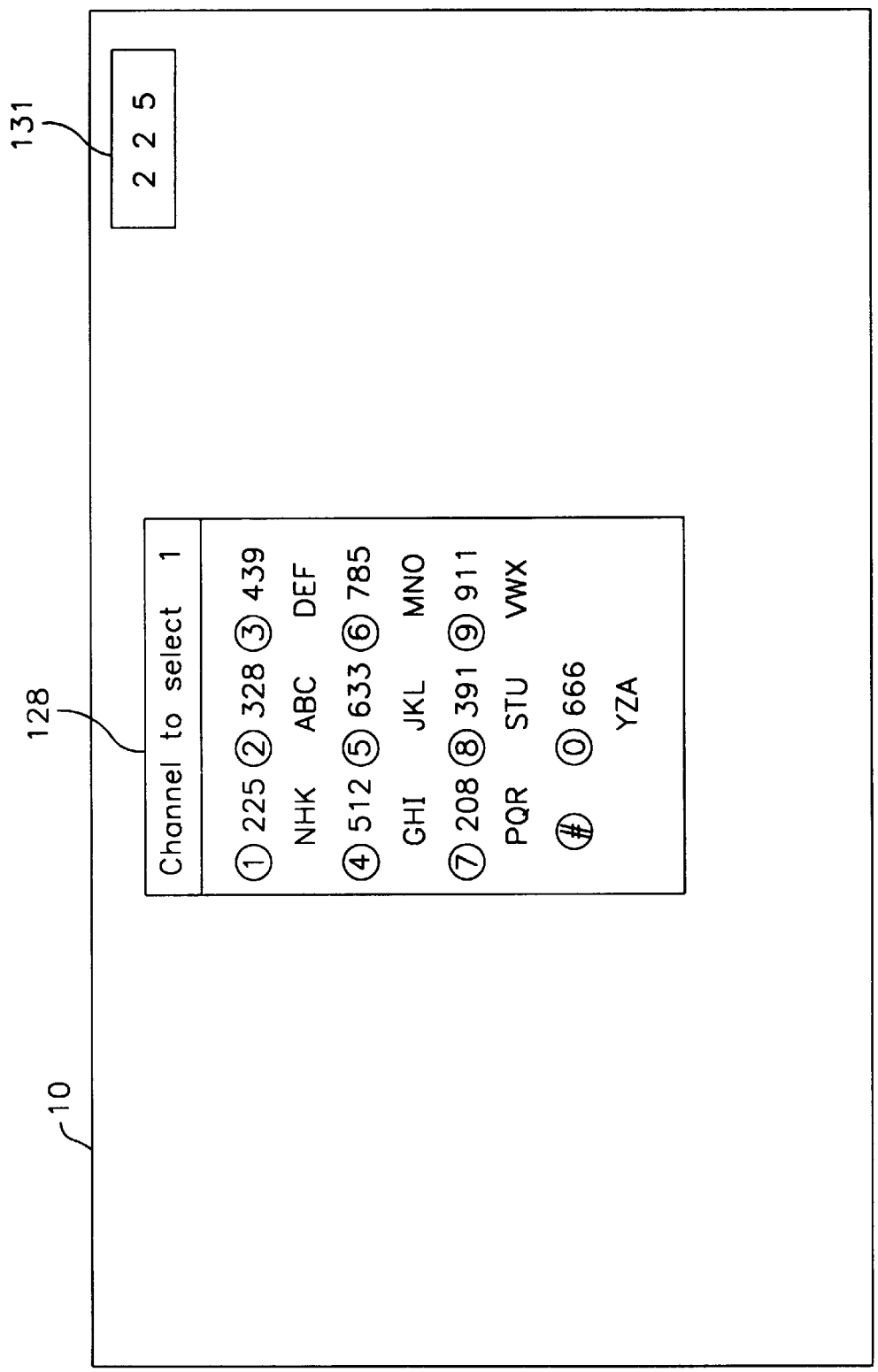
FIG. 7 is a list display state (first page) of preset channel in a broadcast receiving apparatus in embodiment 2.

In the remote controller 6, the key # is the key for presetting a channel, that is, the preset key, and by manipulating this key, a list of preset channels is displayed as shown in FIG. 7. Herein, numerals ①, ② and so forth are preset numbers, which correspond to channel numbers 225, 328, and so forth shown at the side. The sequence of preset numbers shown in FIG. 7 is same as the sequence of preset key numbers (numeric keys) in the remote controller 6. Therefore, the user can visually recognize the correspondence of the preset channels and corresponding preset numbers, and the numbers of the remote controller and the preset numbers, so that errors in recognition may be reduced.

FIG. 7 shows the first page of preset channel list. Further, by manipulating the preset key # on the remote controller 6, the second page of preset channel list is displayed (not shown).

On the first page, the preset key number 1 stands for 1, 2 for 2, and 0 for 10, and similarly on the second page, the preset key number 1 stands for 11, 2 for 12, and 0 for 20.

Figure 8:
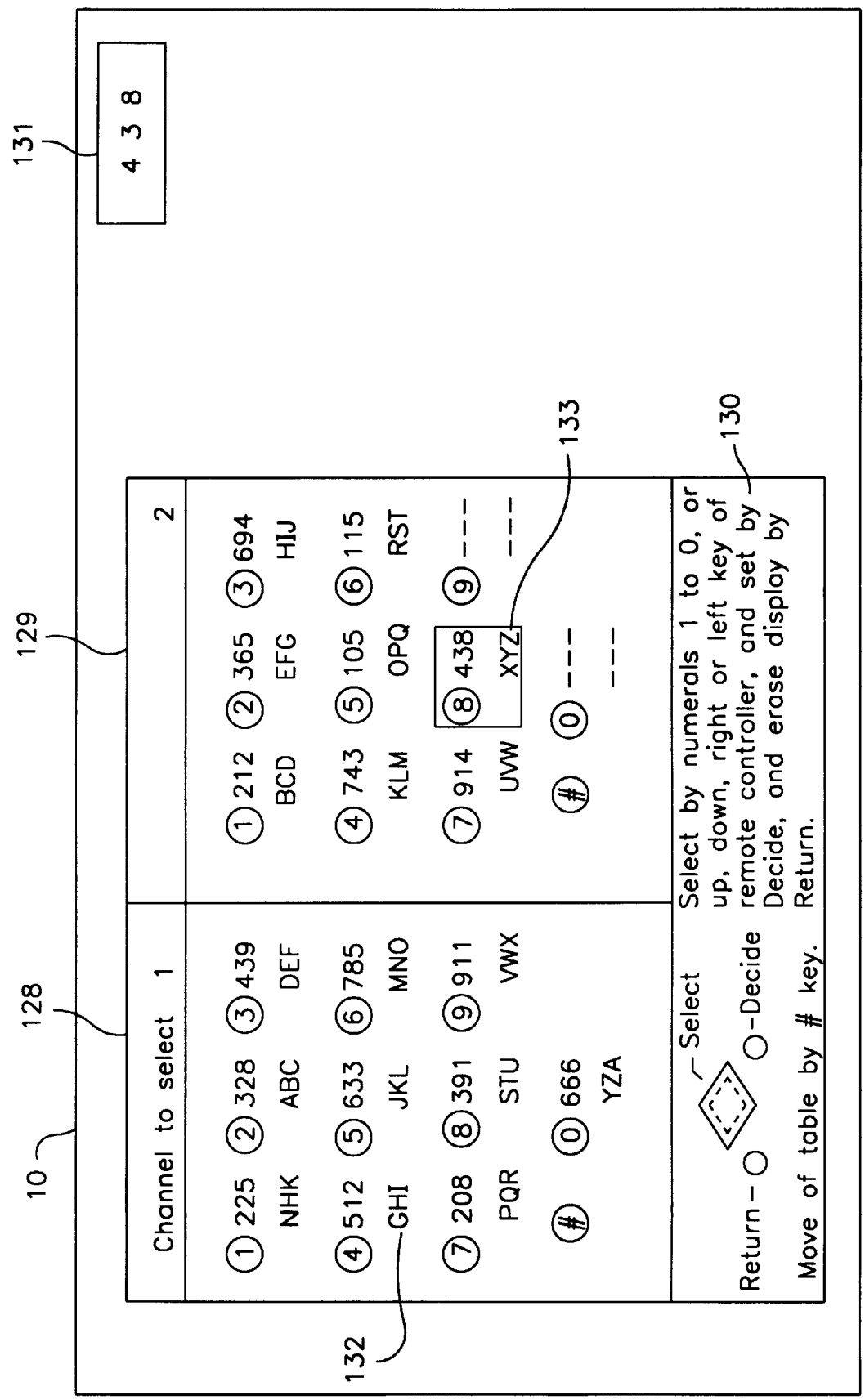
FIG. 8 is a list display state (second page) of preset channel in embodiment 2.

In the screen display state in FIG. 7, when the preset key # is pressed continuously for a specific time (for example, more than 3 seconds) on the remote controller 6, the CRT screen for display by receiving the output of the display means 10 is changed to the preset channel setting screen as shown in FIG. 8. In this screen, the first page 128, second page 129, and guide display column 130 of the preset channel list are displayed.

Reference numeral 131 denotes the presently selected channel number, and it is controlled by the control means 4. In the guide display column 130, in the remote controller 6, it is shown that a Decide key is provided at the lower right position, and a Return key at the lower left position, of the up, down, right and left cursor move keys. The manner of manipulation is also explained. Beneath each channel display, logo marks 132 corresponding to channels are displayed. The logo marks indicate the broadcasting station names of the channels.

The channel being presently viewed is channel 438, and to register this channel in 129 "⑧" (that is, "18") on the second page, the manipulation is as follows. In this case, manipulating the cursor move key in the remote controller 6, the cursor 133 is set to 129 "⑧" on the second page, and the Decide key on the remote controller 6 is pressed. As a result, the presently viewed channel 438 is set and registered in preset key number 18 in the memory means 5, and is displayed in the corresponding position of the preset channel setting screen. The logo mark is simultaneously set, registered, and displayed.

Thus, in ordinary manipulation of preset key, a list of preset channels is displayed, and the preset screen is called by prolonged manipulation of the same key, therefore the manipulation for preset channel is easy and convenient without increasing the key operations of the remote controller.

Thus, since the list of preset channels is displayed by ordinary operation of the preset key and the preset screen is called by prolonged manipulation of the same key, the manipulation about preset channel is easy and is highly convenient.

5th EMBODIMENT

In the broadcast receiving apparatus of the invention, a plurality of menu panels having plural item displays for various settings are composed in a hierarchical tree structure. Each menu panel comprises means for displaying layer index showing layers of menu panel, or means for displaying by overlapping at least the contour of the higher layer index of a specific layer concerning the layer index of the layer when displaying the menu panel of the lower layer, or both means thereof. Since the present layer is indicated by the display of layer index of the presently displayed layer or the overlap display of the layer index of higher layer, it is easily known which layer out of plural layers is being presently manipulated, so that the controllability may be enhanced.

Figure 9:
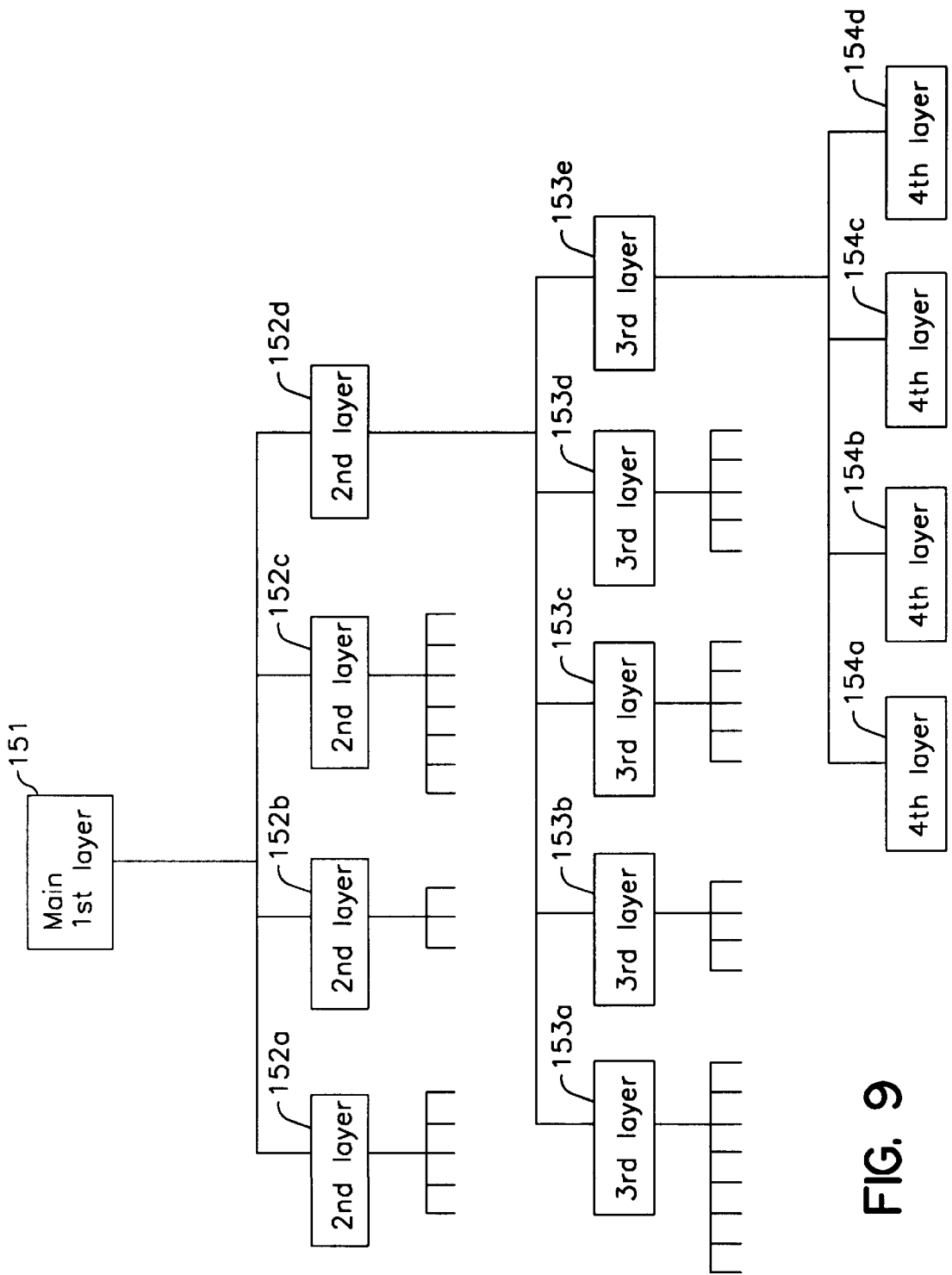
FIG. 9 is a tree diagram showing hierarchical structure of menu in a broadcast receiving apparatus in embodiment 3.

FIG. 9 is a tree diagram showing the hierarchical structure of menu. In FIG. 9, reference numeral 151 shows the main menu panel, and supposing this main menu panel 151 to be the first layer, plural second layer menu panels 152a to 152d are linked one stage lower than the main menu panel 151. One stage lower than the second layer menu panel 152d, plural third layer menu panels 153a to 153e are linked. Although not shown, plural third layer menu panels are similarly linked to the other second layer menu panels 152a to 152d. One stage lower than the third layer menu panel 153e, plural fourth layer menu panels 154a to 154d are linked. Although not shown, plural fourth layer menu panels are similarly linked to the other third layer menu panels 153a to 153d. This is an example of hierarchical structure composed of four layers, and the number of layers varies depending on the menu.

FIG. 10 to FIG. 13 refer to examples of specific menu hierarchical structure for displaying in the CRT screen for displaying by receiving the output of the display means 10 by the control means 4 through the memory means 5 and image generating means 8.

Figure 10:
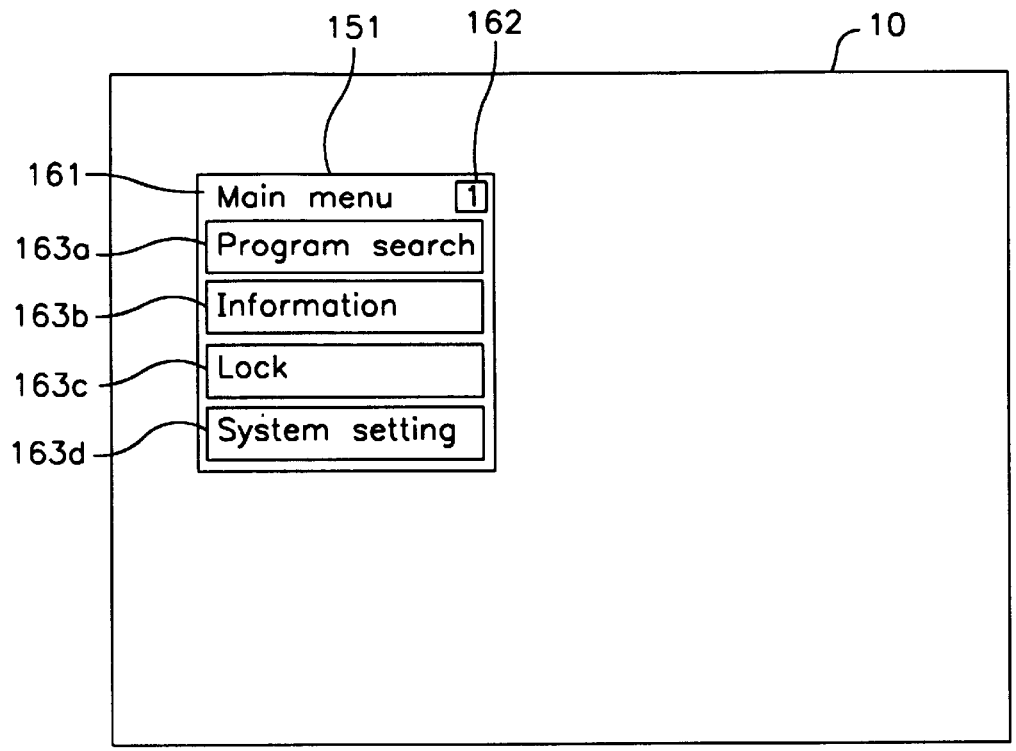
FIG. 10 is a display state diagram of main menu panel in embodiment 3.

FIG. 10 shows the state of display of program view screen (default picture, not shown), specifically relating to a main menu panel 151 displayed on screen by manipulation of the menu key on the remote controller 6. This main menu panel 151 shows the title display 161 of "Main menu," the layer index 162 of "1" showing the first layer at the right end thereof, and four item display 163a to 163d of "Program search," "Information," "Lock," and "System setting." Of the cursor move keys of the remote controller 6, using the Up or Down key, a desired item display out of item displays 163a to 163d is selected by the cursor, and when the Decide key of the remote controller 6 is manipulated, the display is changed to the display state of the second layer menu panel of one layer lower.

Figure 11:
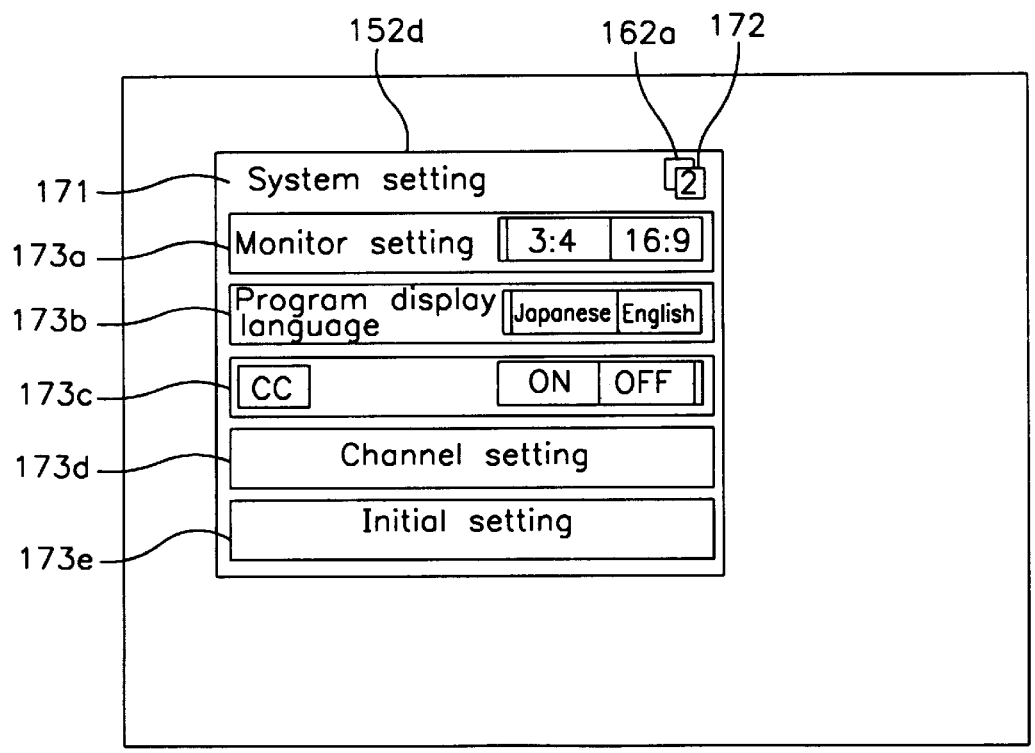
FIG. 11 is a display state diagram of second layer menu panel in embodiment 3.

Supposing the item display 163d of "System setting" is selected, the second layer menu panel 152d shown in FIG. 11 is displayed. This second layer menu panel 152d shows the title display 171 of "System setting," the layer index 172 of "2" showing the second layer at the right end thereof, and five item displays 173a to 173e of "Monitor setting," "Program list display language," "CC" (closed caption), "Channel setting," and "Initial setting." Beneath the layer index 172 of "2" is displayed the contour 162a of the layer index 162 showing "1" one step before, so that the layer of the present display in FIG. 11 may be visually recognized (overlap display).

By manipulating the Up or Down key of the cursor move keys of the remote controller 6, the desired item display out of item displays 173a to 173e is selected by the cursor. In the item displays 173a to 173c, using the Right or Left key of the cursor move keys, a sub-item display is selected, and is set by manipulation of Decide key. To go further one layer down, one of the item displays 173d and 173e is selected by the cursor, and the Decide key is manipulated.

Figure 12:
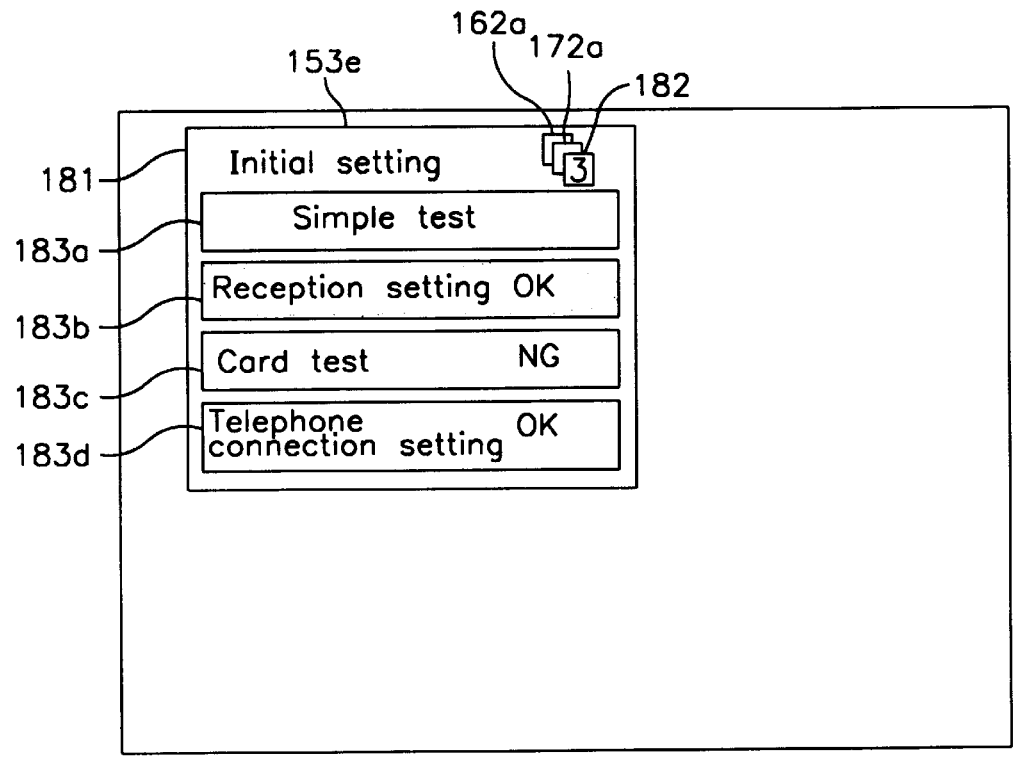
FIG. 12 is a display state diagram of third layer menu panel in embodiment 3.

Supposing to select the item display 173e of "Initial setting," the third layer menu panel 153e is displayed as shown in FIG. 12. This third layer menu panel 153e displays the title display 181 of "Initial setting," the layer index 182 of "3" showing the third layer at the right end thereof, and four item displays 183a to 183d of "Simple test," "Reception setting," "Card test," and "Telephone connection setting." Beneath the layer index 182 of "3" is displayed the contour 172a of the layer index 172 showing "2" one step before, and beneath it is displayed the contour 162a of the layer index 162 showing "1" two steps before, so that the layer of the present display in FIG. 12 may be visually recognized (overlap display).

Using the Up or Down key of the cursor move keys of the remote controller 6, a desired item display of the item displays 183a to 183d is selected by the cursor, and the Decide key is manipulated.

Figure 13:
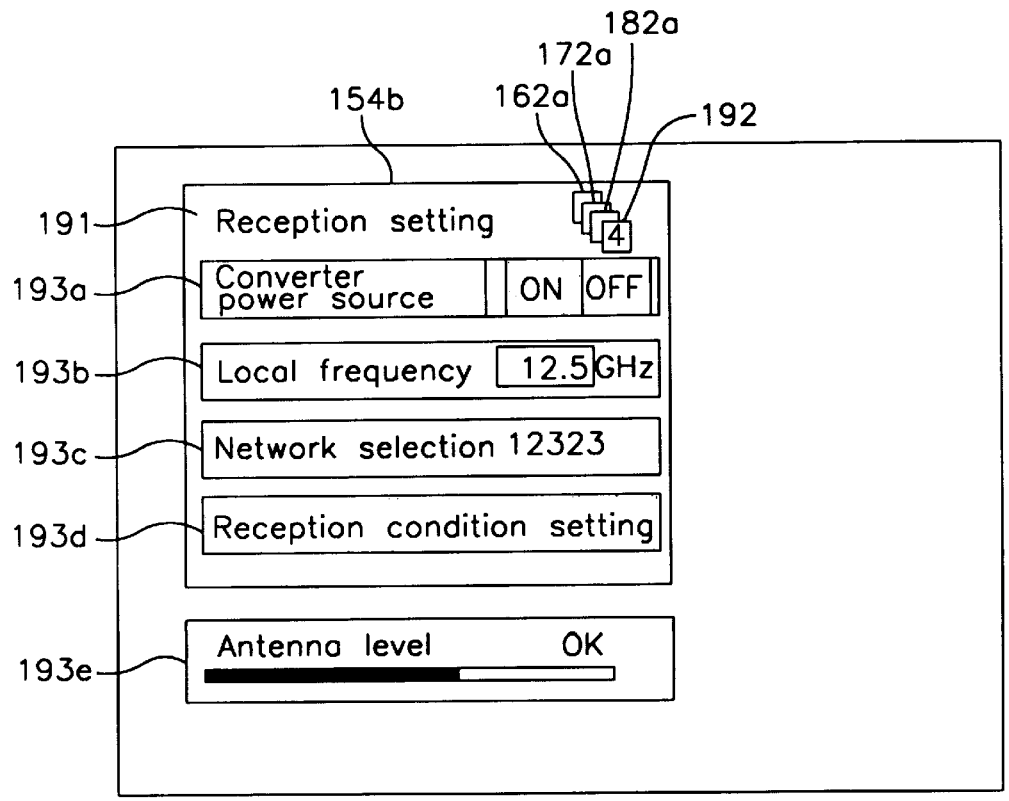
FIG. 13 is a display state diagram of fourth layer menu panel in embodiment 3.

Herein, supposing to select the item display 183b of "Reception setting," the fourth layer menu panel 154b shown in FIG. 13 is displayed. This fourth layer menu panel 154b displays the title display 191 of "Reception setting," the layer index 192 of "4" showing the fourth layer at the right end thereof, and five item displays 193a to 193e of "Converter power source," "Local frequency," "Network selection," "Reception condition setting," and "Antenna level." Beneath the layer index 192 of "4" is displayed the contour 182a of the layer index 182 showing "3" one step before, beneath it is displayed the contour 172a of the layer index 172 showing "2" two steps before, and beneath it is displayed the contour 162a of the layer index 162 showing "1" three steps before, so that the layer of the present display in FIG. 13 may be visually recognized (overlap display).

Manipulating the Up or Down key of the cursor move keys of the remote controller 6, a desired item display out of the item displays 193a to 193e is selected by the cursor. In the item displays 193a, 193b, by manipulating the Right or Left key of the cursor move keys, a sub-item display is selected, and is set by manipulation of the Decide key. To go further one layer down, the same manipulation as above is repeated.

In the screen display state in FIG. 13 showing the fourth layer menu panel 154b, when the Return key of the remote controller 6 is manipulated, the display returns to the screen display state in FIG. 12 showing the third layer menu panel 153e one layer higher. Herein, the layer index 182 is indicated as "3" and it is clearly and visually known to which layer the user has returned at the present. Similarly, when the Return key of the remote controller 6 is manipulated in the screen display state in FIG. 12, the display returns to the screen display state in FIG. 11 showing the second layer menu panel 152d one layer higher. Herein, the layer index 172 is indicated as "2" and it is clearly and visually known to which layer the user has returned at the present. Likewise, when the Return key is manipulated in the screen display state in FIG. 11, the display returns to the screen display state in FIG. 10 showing the first layer menu panel 151 over layer higher. Herein, the layer index 162 is indicated as "1" and it is clearly and visually known to which layer the user has returned at the present. When the Return key is further manipulated, the screen returns to the display state of the screen of the present channel selection.

Figure 14C:
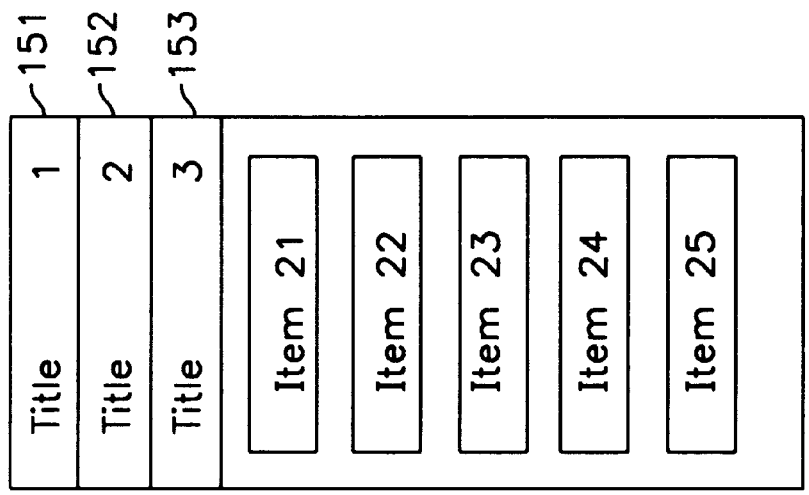
FIGS. 14(a)–14(c) are overwrite display state diagrams of other plural layers in embodiment 3.
Figure 14B:
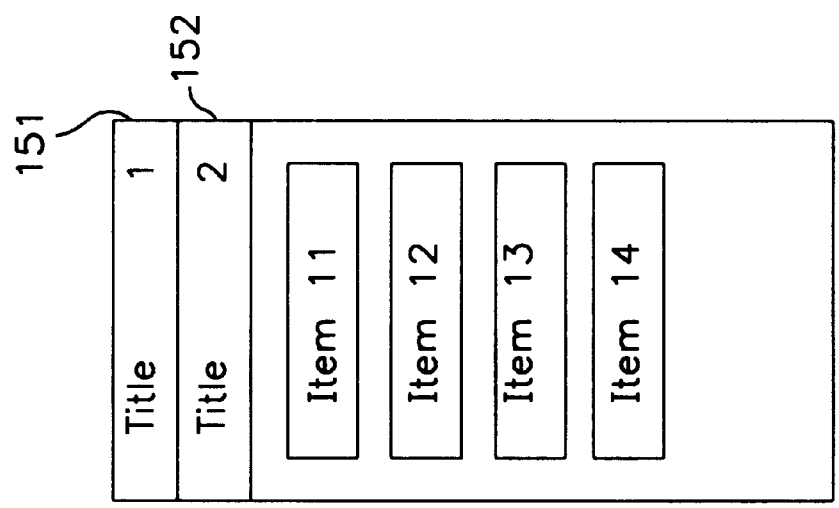
Figure 14A:
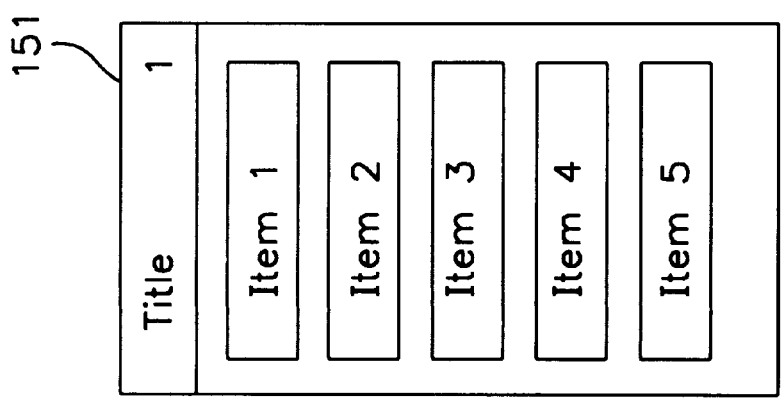
Figure 15C:
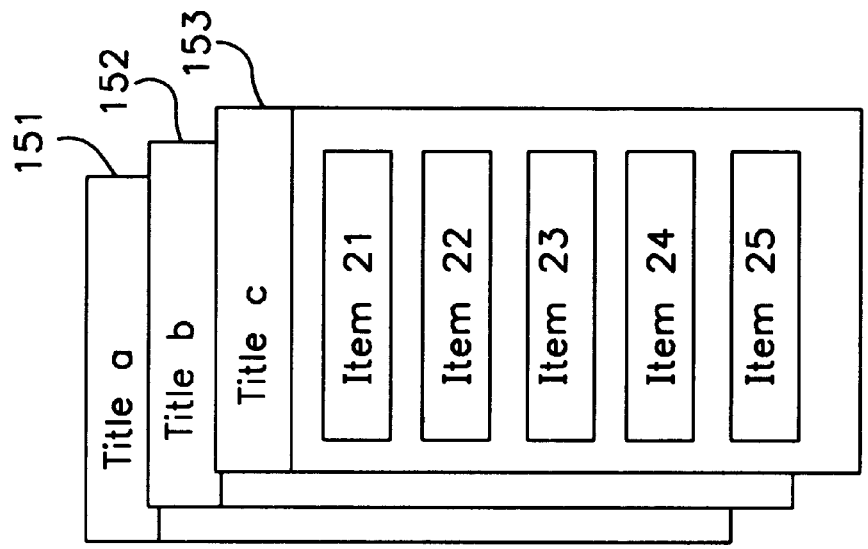
FIGS. 15(a)–15(c) are overwrite display state diagrams of different plural layers in embodiment 3.
Figure 15B:
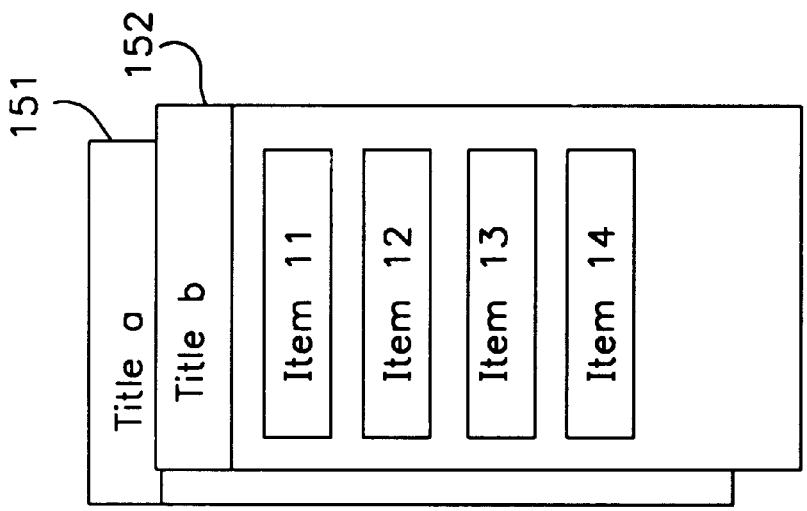
Figure 15A:
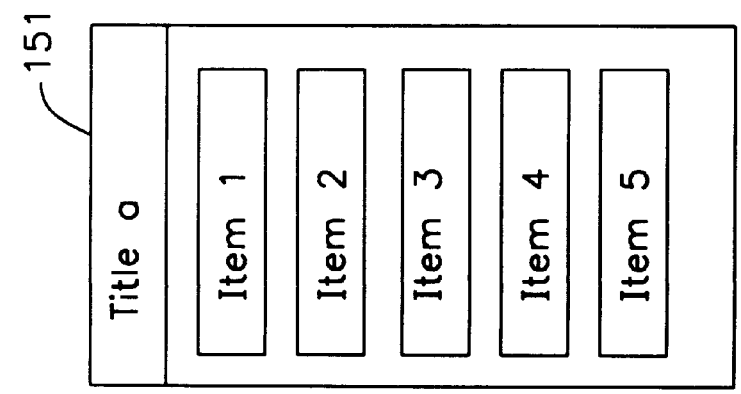

In this embodiment, the layer index is shifted slightly to display in overlap, but as shown in FIGS. 14(a)–14(c), it may be also possible to display by overlap by shifting the menu panels 151, 152, 153 slightly downward in the state so that the title display and layer index may be visible, or as shown in FIGS. 15(a)–15(c) without displaying the layer index, the menu panels 151, 152, 153 may be slightly deviated obliquely downward to overlap.

Figure 16:
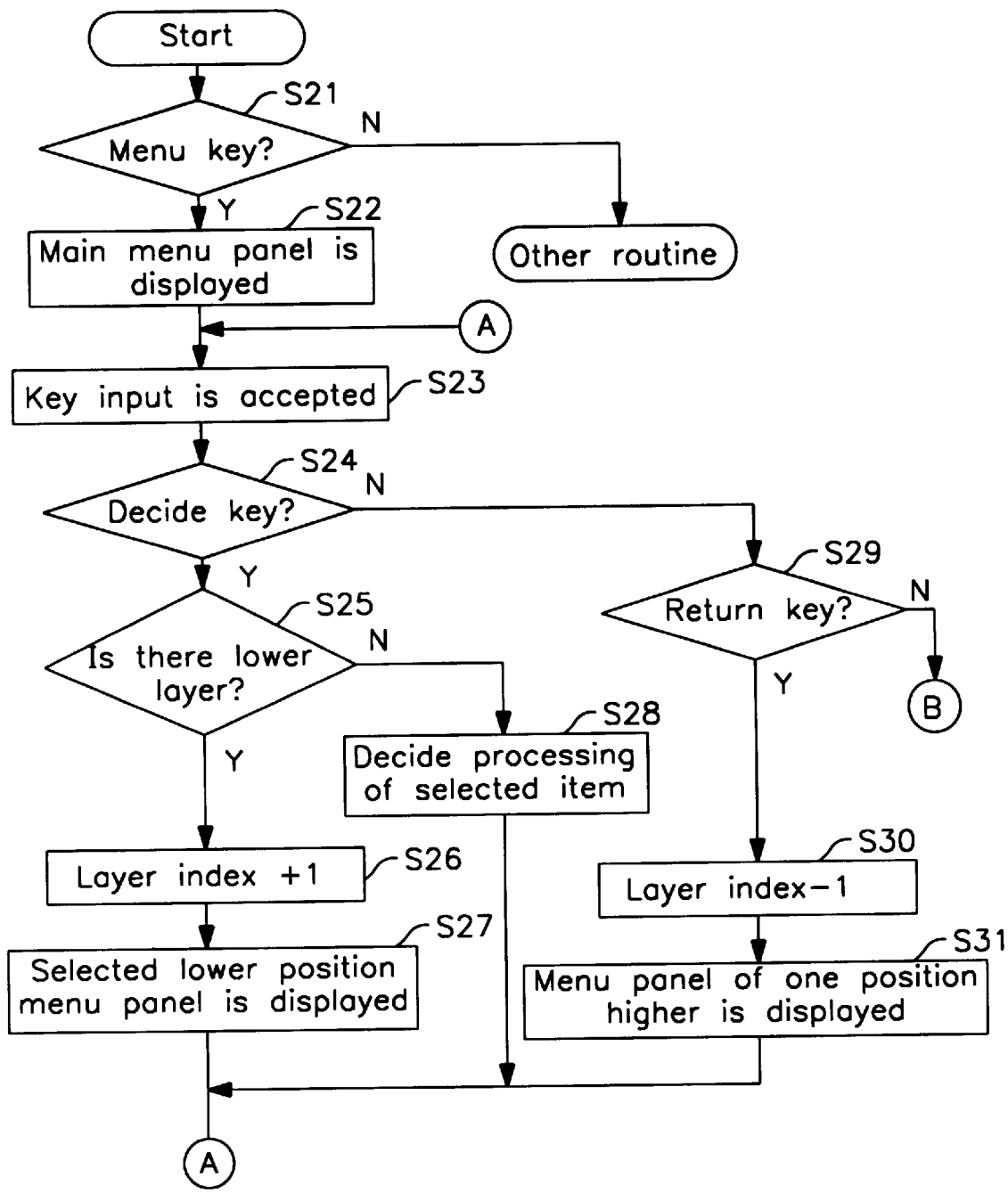
FIG. 16 is a flowchart for explaining the operation of embodiment 3.
Figure 17:
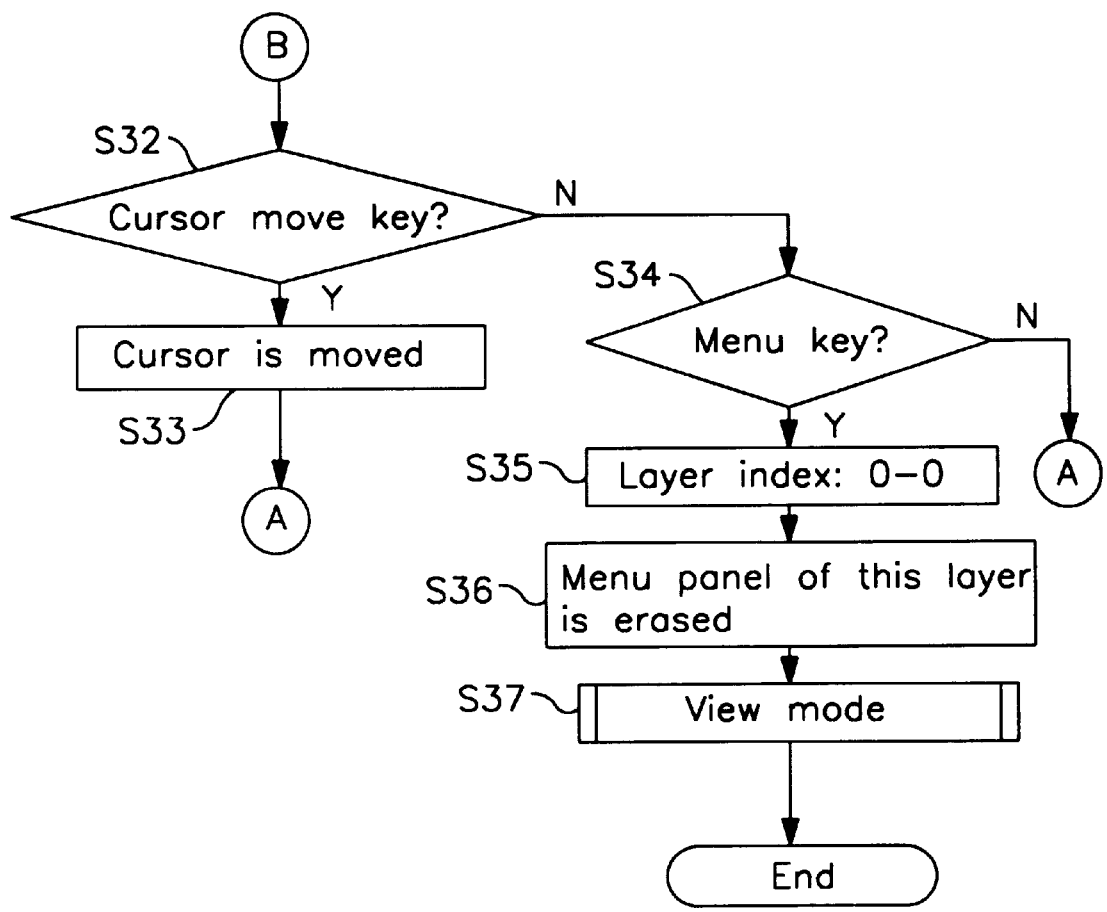
FIG. 17 is a flowchart (continued from FIG. 16) for explaining the operation of embodiment 3.

The operation is described below according to the flowchart in FIG. 16 and FIG. 17. The following operation is executed through the remote controller 6, remote control receiver 7, control means 4, memory means 5, and image generating means 8. When the menu key of the remote controller 6 is manipulated (step S21), the main menu panel 151 is displayed as the first layer menu panel (step S22). Consequently, the key input is accepted (step S23), and it is judged whether the manipulated key is the Decide key or not (step S24), Return key or not (S29), cursor move key or not (step S32), or menu key again or not (step S34). When the user selects several item displays, or selects a sub-item of item display, the cursor move key is manipulated, but the its result is the move of the cursor to the selected item display (step S33), and the operation returns to step S23.

When the Decide key is pressed, in the item selected by the cursor, it is judged if there is a lower layer or not (step S25), and if none, the selected item is decided (step S28), and if there is a lower layer, one is added to the layer index (step S26) to change to the state for displaying the selected menu panel one layer lower (step S27), and the process returns to step S23. When the Decide key is pressed again, in the item selected by the cursor, it is judged if there is a lower layer or not (step S25), and if there is, one is added to the layer index (step S26) to change to the state for displaying the selected menu panel one layer lower (step S27), and the process returns to step S23. Thereafter, if there is a further lower layer, by every manipulation of the Decide key, the display is sequentially changed over to the menu panel of the lower layer, and the layer index is added by one each.

In any layer, when the Return key is manipulated, the layer index is decreased by one each (step S30) to change over to the state for displaying the menu panel one layer higher (step S31), thereby returning to step S23. Thereafter, by every manipulation of the Return key, the display state is changed over to the menu panel one layer higher, while the layer index is decreased by one each. Besides, in any layer, when the menu key is manipulated again, the layer index is cleared to "0" (step S35), and the menu panel of the layer is erased (step S36) to move to the view mode for showing the broadcast program (step S37).

Thus, in the broadcast receiving apparatus of digital broadcast gradually advanced in multiple functions and heightened in the necessity for interactive operation of various setting through the screen, each layer is displayed in the form of display of layer index, so that understanding of layer expressing and manipulation are easier for general household members.

Instead of the display of layer index, meanwhile, it is also possible to employ a method of changing colors, for example, from warm colors to cold colors, as the layers become deeper (gradation method).

Herein, the plurality of menu panels having plural item displays for various settings compose the layers of tree structure, and the present layer is indicated by the display of the layer index of the presently displayed layer or the overlap display of layer indices of higher layers, and therefore it is easily known which layer is being manipulated at the present among plural layers, and the controllability for checking the layer or setting various items can be enhanced.

6th EMBODIMENT

A broadcast receiving apparatus of the invention comprises means for displaying a list of off-screen programs while viewing a certain program by superimposing, means for displaying the information plural off-screen programs in characters in the off-screen program list display, means for scrolling the display of off-screens, and means for erasing the off-screen list display when any one of the plural displayed off-screen programs is specified, and selecting the channel of the specified off-screen display for displaying on the screen.

If the number of registered reception channels is scores or hundreds, such multiple off-screen programs can be checked by the scroll display of off-screen programs in the off-screen list display while viewing other program, and a desired off-screen program can be selected in the display state of the off-screen program list, and therefore it is very convenient and excellent in controllability.

Embodiment 6 explains a case of guide display of other program, that is, off-screen program, while viewing a certain program.

Figure 18:
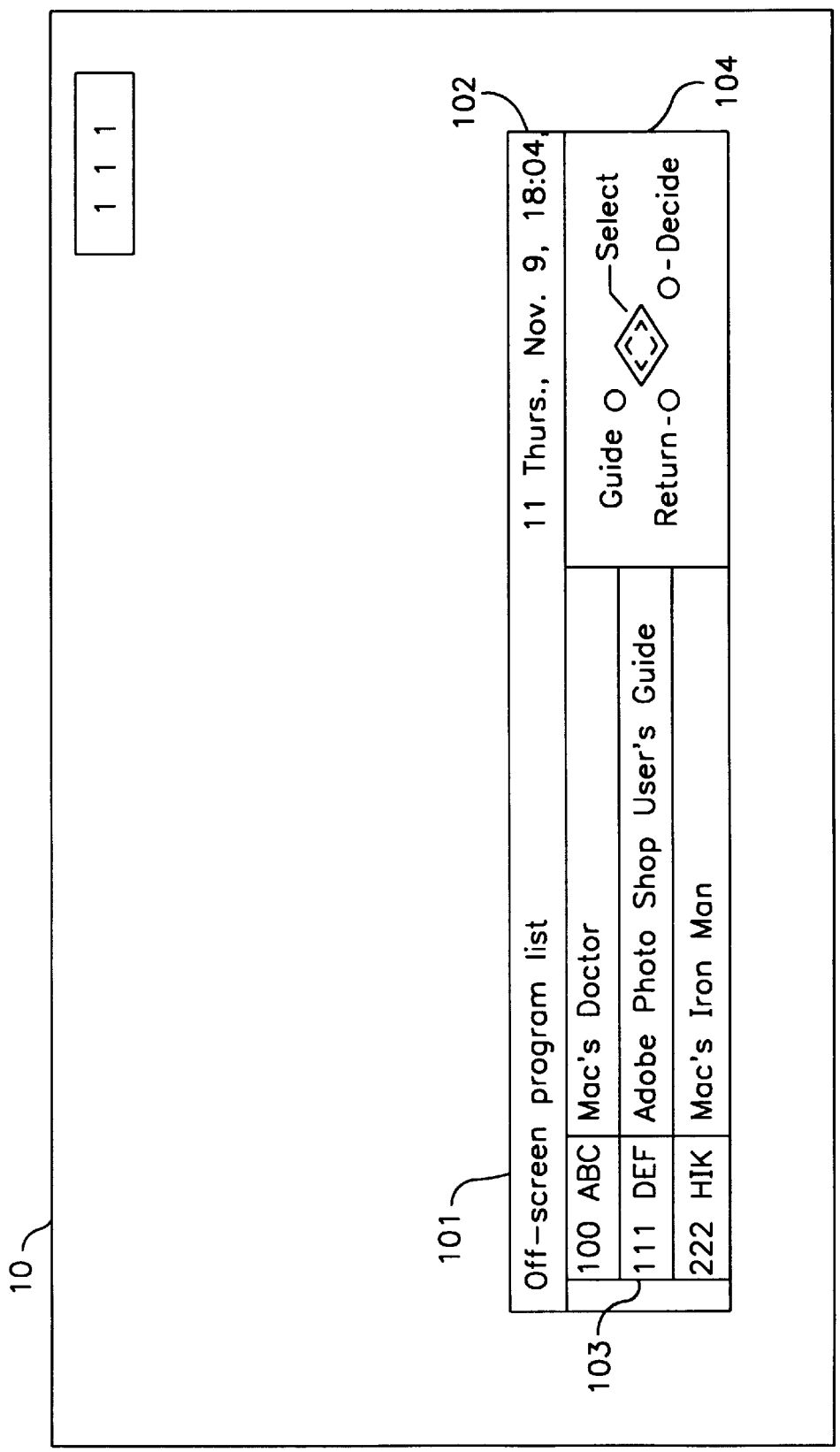
FIG. 18 is a display state diagram of off-screen program list display in a broadcast receiving apparatus in embodiment 4.

The operation of the off-screen program guide display is executed through the remote controller 6, remote control receiver 7, control means 4, memory means 5, and image generating means 8. While viewing a program of a certain channel, when the off-screen program key is manipulated in the remote controller 6, as shown in FIG. 18, an off-screen program list display 101 is shown in part of the display screen. This off-screen list display 101 is composed of title display column 102, off-screen program display column 103, and guide display column 104. The title display column 102 shows the title of "Off-screen program list," this day, month, day of the week, and present time. The off-screen program display column 103 shows contents of off-screen programs in two adjacent channels, in characters, among channels received and registered above and below the channel being presently viewed. The channel being viewed at the present is channel 111. Each channel column presents the channel number of the channel, its logo mark, the program name being presently broadcast in that channel, and other information by characters. In the guide display column 104, the key layout on the remote controller 6 is guided and displayed.

By manipulating the Up or Down key of the cursor move keys of the remote controller 6, the contents of the off-screen programs displayed in the off-screen display column 103 are sequentially scrolled one by one. By manipulating the Page key of the remote controller 6, a page of three off-screen programs is scrolled at once. The user reads the information of off-screen programs displayed in the off-screen display column 103, and, when finding an interesting program, manipulates the Up or Down key to adjust the cursor to the program, and press the Decide key of the remote controller 6. As a result, the off-screen program list display 101 is erased from the screen, and the channel of the newly selected off-screen program is selected and is displayed on the screen.

If scores or hundreds of programs are registered, multiple off-screen programs can be checked while viewing other program by the vertical scroll display of off-screen programs in the off-screen program display column 103.

Figure 19:
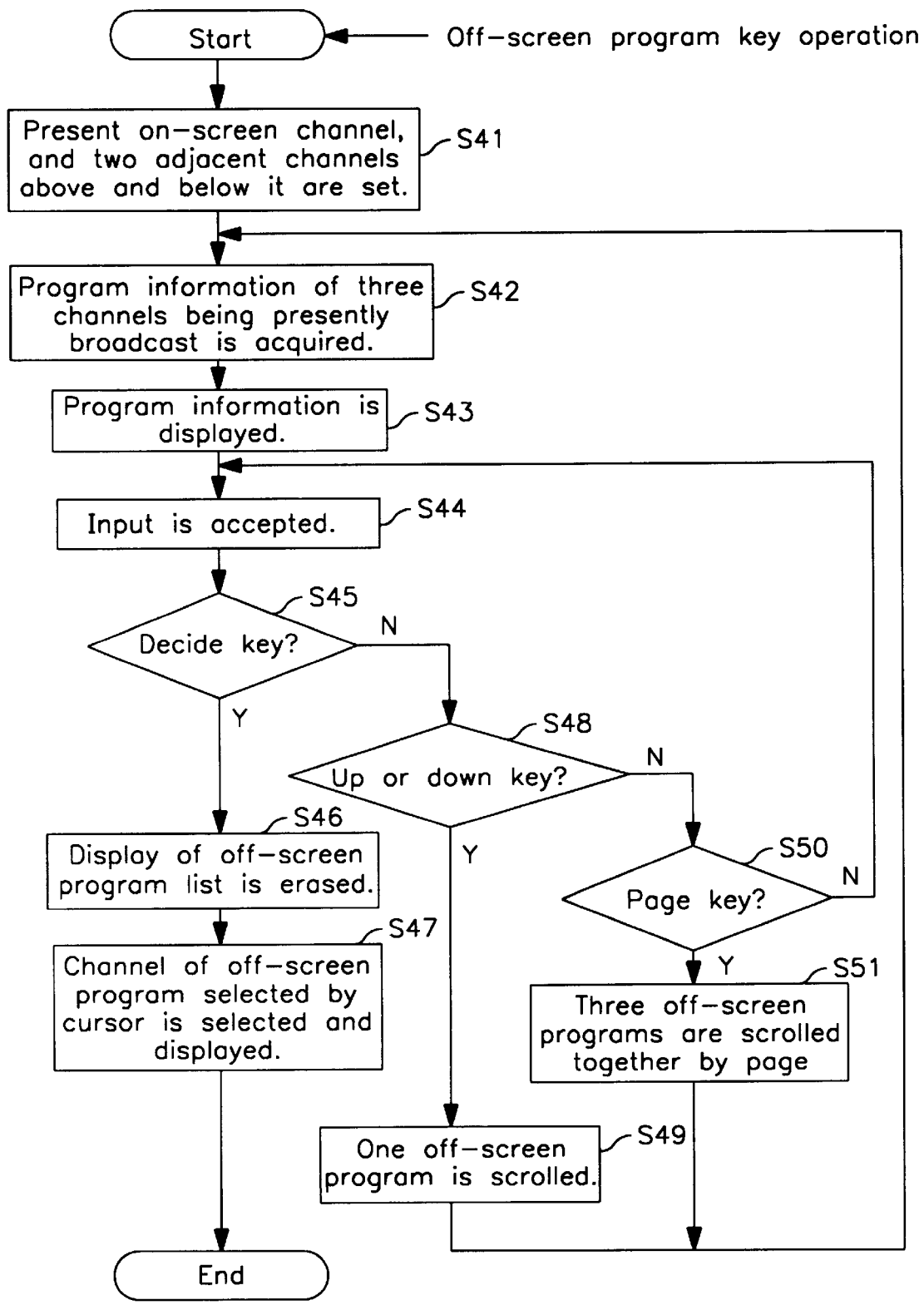
FIG. 19 is a flowchart for explaining the operation of embodiment 4.

This operation is described below while referring to the flowchart in FIG. 19. By manipulation of the off-screen program key, the off-screen program list display mode is set up, the presently viewed channel and channels of two off-screen channels above and beneath it are set (step S41), and about these three set channels, the information is acquired including the program names of the programs being broadcast at the present (step S42), and the program information of these three channels is displayed (step S43). In succession, accepting the input (step S44), it is judged if the input key is the Decide key or not (step S45), the Up or Down key of cursor move keys or not (step S48), or the page key or not (step S50). If it is the Up or Down key, the content of only one off-screen program to be displayed in the off-screen display column 103 is scrolled in the upper direction or lower direction together with the channel (step S49), and the process returns to step S42. In the case of the page key, the content of three off-screen programs to be displayed in the off-screen program display column 97 is scrolled together as a page (step S51), and the process returns to step S42. When the Decide key is pressed, the off-screen program list display 101 is erased from the screen (step S46), and the channel of the off-screen program selected by the cursor is selected and displayed (step S47), and the operation is over.

Thus, while displaying the program being viewed, the off-screen program list is displayed in characters, and the off-screen program display is scrolled, so that reliable information about multiple off-screen programs can be presents, which cannot be obtained in moving pictures, and a program can be selected directly in the state of display of off-screen programs, so that the controllability of station selection may be enhanced. In short, the invention facilitates the user's manipulation for interactive operation through the screen, in particular, manipulation for various settings and confirmation of situation.

7th EMBODIMENT

A broadcast receiving apparatus of the invention comprises means for displaying an official program name display column, aside from a program list display column, when displaying the program list display picture by changing over to the program list display mode, in a predetermined same position, means for displaying the official name of the program in the official program name display column when the cursor is pointed to a desired program in the program list display column, means for holding the display state of the official program name display column when changed from the program list display mode to the program content briefing display mode after selecting a certain program by the cursor, and means for displaying the content briefing picture for display the detailed content about the selected program in the nearly entire area of the program list display state in a state of over-write.

The program list display column displays a list of programs. For the purpose of list display, it is preferred to display as many channels as possible for as long time zone as possible. However, such display is excessive in information quantity and is annoying for the user, or the information is simplified, and the individual information may be limited. In the latter case, the display area of one program is very narrow. As a result, only limited information such as program name can be displayed. Or the program name cannot be displayed in full.

The user wishes to know more specific information about a program having an interest in, and when such program is selected to change over to the broadcast content briefing picture, if the entire area of the program list display picture is changed over to the broadcast content briefing picture, while reading the explanation of the content, the user may forget the name of the program. Accordingly, when changed from the program list display mode to the broadcast content briefing display mode, aside from the program list display column, the official program name display column is displayed in a predetermined same position, and while maintaining this state, the content briefing picture for displaying the detailed content of the selected program is displayed nearly in the whole area of the program list display column in a state of over-write. Therefore, the name of the program being briefed at the present can be always checked, so that the controllability and sense of manipulation may be favorable.

Figure 25:
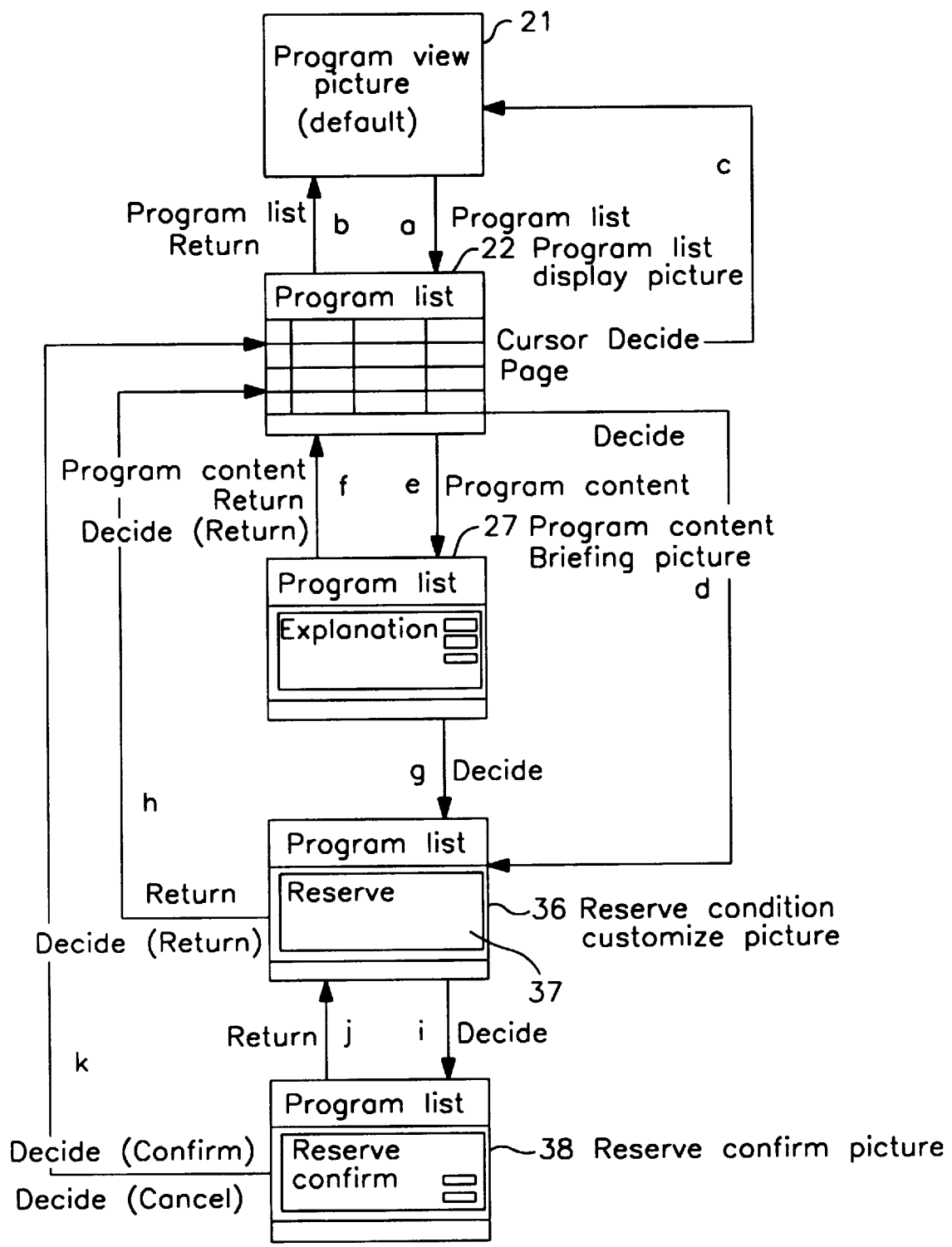
FIG. 25 is a schematic explanatory diagram of program list manipulation procedure in embodiment 7.

The program list display operation is described. The following display operation is executed through the remote controller 6, remote control receiver 7, control means 4, memory means 5, and image generating means 8 in FIG. 1. FIG. 25 is a schematic explanatory diagram of program list operating procedure. In FIG. 25, reference numeral 21 is a program view picture (default picture) which is a display picture of a program being viewed at the present. When the program list key is manipulated (arrow a in FIG. 25) in the remote controller 6, it is changed over to a program list display picture 22. In the display state of this program list display picture 22, when the Return key of the remote controller 6 is manipulated or the program list key is manipulated again (arrow b), it returns to the initial program view picture 21. The detail of the program list display picture 22 is shown in FIG. 26. In the broadcast data display column 23 in the highest line, the title display of "Program list" is displayed together with this day, month, day of the week, and the present time. The program list display column 24 of the widest area includes the time display column 24a, channel display column 24b, and day/night display column 24c for distinguishing day and night. The time is displayed, for example, in five divisions. The channel is displayed, for example, in three divisions. In the program list display picture 22, aside from the broadcast date display column 23 and program list display column 24, there is also the official program name display column 26 for displaying the program in its full name in a predetermined specific position in the lowest line.

This program list display shows which program is broadcast in which channel from when to when. For example, in channel 111, "Local news" is broadcast from 4:00 p.m. to 5:00 p.m.; in channel 124, "Music station" is broadcast from 7:00 p.m. to 8:00 p.m., and in channel 128, "Start of Tuesday" is broadcast from 7:30 p.m. to 8:00 p.m., as known at a glance. of the program list display column 24 displayed when the program list key is manipulated on the remote controller 6, the time zone closest to the present time is displayed in relation to the display of the day/night display column 24c in the highest line, and the presently viewed channel is displayed in the center of the channel display column 24b. That is, channel 124 in the center of the channel display column 24b is the channel of the program being viewed at the present. The highest line of the time display column 24a is 4:00 at the beginning of the time zone including the present time of 4:17 PM. The day/night display column 24c shows "Evening".

A rectangular display region for one program enclosed by vertical lines and lateral lines i s called the cell, and this cell is generally very narrow, and the full name of the program cannot be displayed if the program name is long or the display region is narrow. Incidentally, the $ mark 45 shows the broadcast is a paid program.

To select any one of the plural programs being displayed, using the cursor move keys of the remote controller 6, the cursor 25 (thick frame) moving on the picture is matched with a desired program shown in the program list display column 24. Then, in the official program name display column 26 in the lowest line of the program list display picture 22, detailed information of the program designated by the cursor 25 is displayed. That is, the official name of the selected program is displayed, and, in the case of a paid program, the charge amount is displayed. Also, the broadcast time zone and broadcast channel of the program are also displayed (these are only some examples). Moving the cursor 25 on the picture, when the desired program is changed over by the cursor 25, the display information in the official program display column 26 in the lowest line also varies accordingly. By manipulating the page key in the remote controller 6, the display time zone of the time display column 24a is changed in 5-hour unit (or 1-hour unit). That is, from 9:00 p.m. to 1:00 a.m. is displayed. Accordingly, the display programs are changed. By manipulating the Right or Left key, the display channel of the channel display column 24b is changed in the unit of one channel or three channels.

In the program list display picture 22 in FIG. 26, when a desired program is determined, the cursor 25 is adjusted to the program, and the Decide key of the remote controller 6 is manipulated, and the result is divided into two cases depending on the condition. That is, when the selected program is being presently broadcast, the channel of the program is selected by the Decide key manipulation to changed to the program view picture 21 (arrow c in FIG. 25). When the decided program is not broadcast yet, the picture is transferred to the reserve condition customize picture 36 (arrow din FIG. 25).

Figure 27:
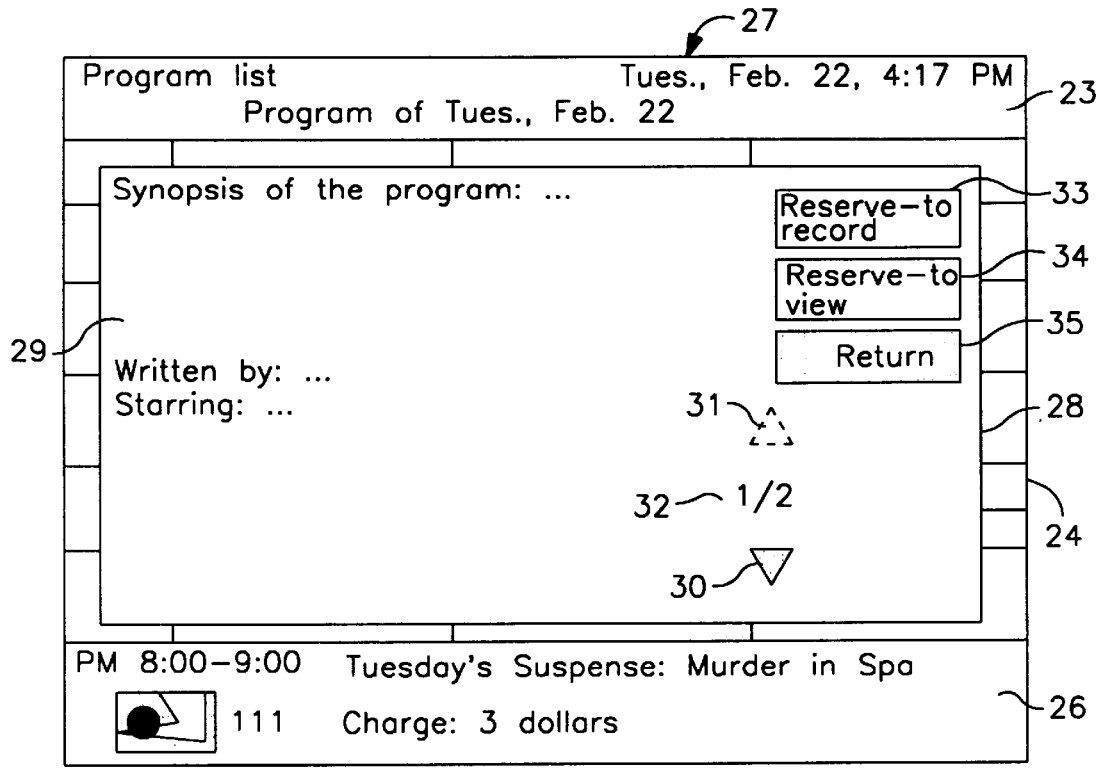
FIG. 27 is a display state diagram of broadcast content briefing picture in embodiment 7.

Incidentally, in the program list display picture 22 in FIG. 26, if wishing to known further detail about a certain program, with the cursor 25 coinciding with the program, the broadcast content key is manipulated in the remote controller 6, and then the picture is changed over to the broadcast content briefing picture 27 (arrow e in FIG. 25). The detail of this program content briefing picture 27 is given in FIG. 27. The display content of the broadcast date display column 23 in the highest line and the display content of the official program name display column 26 in the lowest line are left over in predetermined specific positions same as in the case of the program list display column 22 in FIG. 26, and the content briefing picture 28 in a size nearly concealing the whole area of the program list display column 24 is displayed over the program list display column 24. This content briefing picture 28 shows the synopsis of the program, actors and other information 29, next page button display 30 for feeding page, previous page button display 31, page display 32, reserve-to-record button display 33, reserve-to-view button display 34, and return button display 35.

With the program name and broadcast time zone being displayed in the lowest display line 26, the synopsis, actors and other detail of the program 29 are displayed, so that the detailed content can be known in relation to the program name, which avoids the inconvenience of forgetting the name of the program while checking the detail, and the broadcast date of the program being briefed is left over and shown in the broadcast date display column 23 in the highest line.

Thus, according to this embodiment, aside from the program lit display column, the official program name display column is displayed in a predetermined specific position, and in order to obtain further information about the program the user is interested in among the display of program lit display column, when the program is selected to change over to the broadcast detail briefing picture, the content briefing picture for displaying the detailed information about the selected program is displayed almost in the entire area of the program list display column in a state of over-write, while the display state of the official program name display column is maintained. Therefore, the name of the program being presently briefed in detail can be always known, so that the controllability and sense of manipulation may be favorable.

It is a feature of the broadcast receiving apparatus of the invention that it comprises means for displaying a reserve instruct button in the content briefing picture in the broadcast content briefing display mode, and holding the display state of the official program name display column when changed over to the reserve condition customize picture from the broadcast content briefing picture by manipulating the button, and means for displaying the customize picture for manipulating and setting the reception format of the selected program by over-writing almost on the whole area of the content briefing picture. In the customize setting state, the program name is always displayed in the official program name display column, and it is possible to set customization confidently without hesitation, so that the controllability and sense of manipulation may be excellent.

It further comprises means for holding the display state of the official program name display column when changed over from the reserve condition customize picture to the reserve confirm picture, and means for displaying the confirm picture for confirming reservation by over-writing almost on the whole area of the customize picture. In the state of confirming reservation, the program name is always displayed in the official program name display column, and it is possible to set customization confidently without hesitation, so that the controllability and sense of manipulation may be excellent.

The broadcast receiving apparatus of the invention further comprises means for displaying the broadcast data display column in the same predetermined position together with the official program name display column, aside from the program list display column or content briefing picture, customize picture or confirm picture. In the midst of manipulation sequence, the data of broadcast of the program can be checked immediately on any picture, so that the controllability and sense of manipulation may be further enhanced. In the state of display of the broadcast content briefing picture 27 in FIG. 27, when the broadcast content key or return key of the remote controller 6 is manipulated, the picture returns to the program list display picture 22 in FIG. 26 (see arrow f in FIG. 25). Adjusting the cursor to the return button display 35 in the picture, when the Decide key of the remote controller 6 is manipulated, too, the screen returns to the program list display picture 22 in FIG. 26.

On the other hand, matching the cursor with the reserve-to-record button display 33 or reserve-to-view button display 34, when the Decide key of the remote controller 6 is manipulated (see arrow g in FIG. 25), the screen is changed to the reserve condition customize picture 36 shown in FIG. 25. In this reserve condition customize picture 36, too, the display content of the broadcast date display column 23 of the highest line and the display content of the official program name display column 26 in the lowest line are left over same as in the case of program list display picture 22 in FIG. 26, and in the customize picture 37 of a size nearly concealing the whole area of the program list display column 24, it is customized to specify the picture as either main picture or sub-picture and the sound as either main sound or sub-sound. In the display state of the reserve condition customize picture 36, when the Return key of the remote controller 6 is manipulated, or the Decide key of the remote controller 6 is manipulated by adjusting the cursor to the return button display (not shown) on the customize picture 37, the picture return to the program list display picture 22 shown in FIG. 26(arrow h in FIG. 25).

Figure 28:
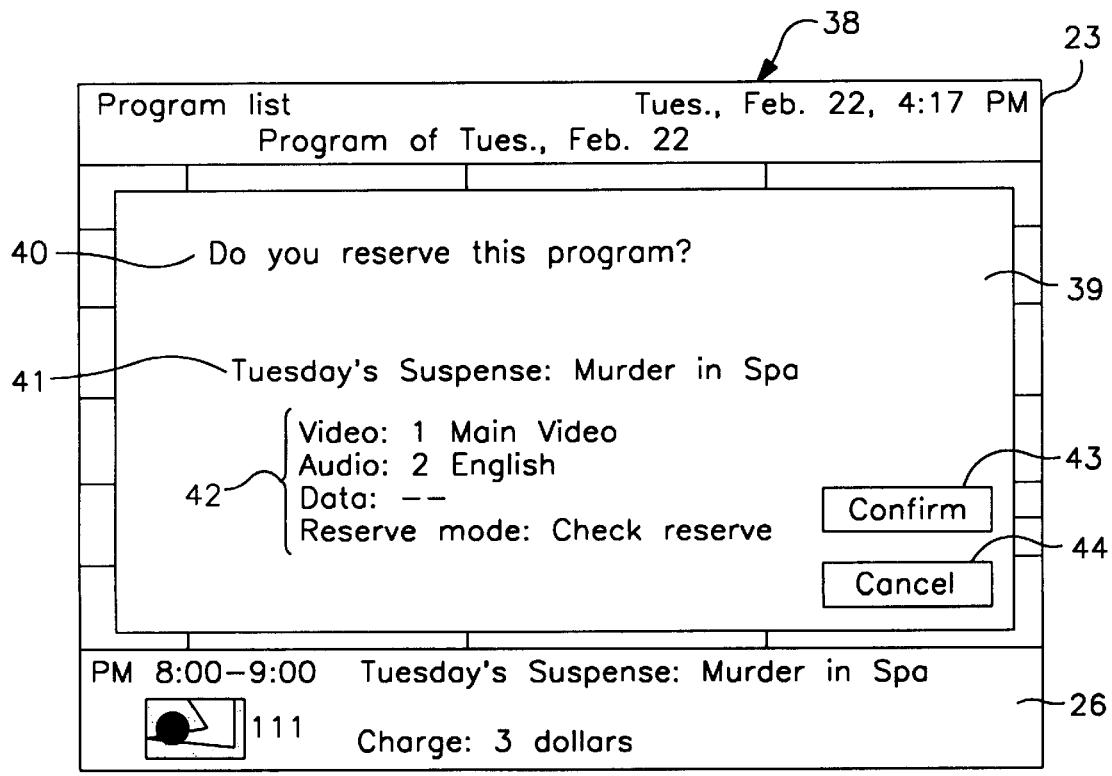
FIG. 28 is a display state diagram of reserve confirm screen in embodiment 7.

On the other hand, after customizing, when the Decide key of the remote controller 6 is manipulated by adjusting the cursor to the completion button display on the customize picture 37, the screen is changed over to the reserve confirm picture 38 (arrow i in FIG. 25). The detail of the reserve confirm picture 38 is shown in FIG. 28. The display content of the broadcast date display column 23 of the highest line and the display content of the official program name display column 26 in the lowest line same as in the case of program list display picture 22 in FIG. 26 are left over in the predetermined specific positions, and a confirm picture 39 in a size concealing almost the whole area of the program list display column 24 is displayed over the program list display column 24. This confirm picture 39 displays a reserve confirm message display 40 for confirming the user to reserve, a program name display 41, a customized status display 42, a confirm button display 43, and a cancel button display 44.

With the program name and its broadcast time zone being displayed in the official program name display column 26 in the lowest line, since the reserve information about the program is displayed, the name of the program of the present manipulation for reservation can be confirmed. The data of broadcast of the program relating to the detailed display can left over and displayed in the broadcast date display column 23 in the highest line.

While displaying the reserve confirm picture 38 in FIG. 28, when the Return key of the remote controller 6 is manipulated (arrow J in FIG. 25), the screen returns to the reserve condition customize picture 36. In the confirm picture 39, moreover, when the Decide key of the remote controller 6 is manipulated (see arrow k in FIG. 25) by moving the cursor to the confirm button display 43 or cancel button display 44, the screen returns to the program list display picture 22 in FIG. 26. When the Decide key is manipulated with the cursor matched with the confirm button display 43, the reservation of the program is registered in the memory means 5. When the Decide key is manipulated by setting the cursor on the cancel button display 44, the manipulation is performed again. That is, after returning to the program list display picture 22 in FIG. 26, the detailed content of the program is confirmed same as above, and the manipulation for reserving may be repeated, or by manipulating the program table key or Return key, the screen may be returned to the program view picture 21.

Thus, in any one of the program list display picture 22, broadcast content briefing picture 27, reserve condition customize picture 36, and reserve confirm picture 38, since the broadcast date display column 23 of the highest line and the official program name display column 26 of the lowest line are always displayed in the predetermined specific positions, if the screen is changed over variously, the detail of the program of the present manipulation (the program name, broadcast date, broadcast time, channel, paid or not, etc.) can be always checked during manipulation, so that the controllability and sense of manipulation may be favorable.

Thus, if changed over from the broadcast content briefing picture to the reserve condition customize picture, it is constituted to maintain the display state of the official program name display column, and therefore, in the customize setting state, the name of the program under manipulation can be always checked by the display of the official program name display column, and hence the customization can be set confidently without hesitation, so that the controllability and sense of manipulation may be favorable.

Similarly, when changed over from the reserve condition customize picture to the reserve confirm picture, it is constituted to maintain the display state of the official program name display column, and therefore, while confirming the reservation, the name of the program under manipulation can be always checked by the display of the official program name display column, and hence the reservation can be confirmed confidently without hesitation, so that the controllability and sense of manipulation may be favorable.

Besides, together with the official program name display column, the broadcast date display column is displayed in a predetermined specific position, and therefore the date of broadcast of the program can be checked immediately on any picture during manipulation sequence, so that the controllability and sense of manipulation may be further enhanced.

8th EMBODIMENT

A broadcast receiving apparatus of the invention comprises means for displaying an official program name of a program corresponding to a cell specified by the cursor in a program list display column in the official program name display column, by disposing the official program name display column at a predetermined same position, together with a program list display column, in program list or program list display mode, means for changing the display format of the cell specified by the cursor different from the display format when not specified, and means for changing the display format of the official program name display column so as to be same or similar as the cell specified by the cursor. While as many cells or program names as possible are displayed in a display screen of limited area, the official program name can be displayed in full name in the official program name display column provided particularly as for the program of the cell specified by the cursor. Yet, the display of the other programs is kept the same. Besides, the cell specified by the cursor and the official program name display column are similar in the display format, such as deep color of the same hue so as to be related with each other by identical or similar indicated, so that the correspondence of the two can be emphasized visually.

The broadcast receiving apparatus of the invention is characterized by comprising means for displaying the attribute by an icon in the program corresponding to a cell in the program list display column when the program is assigned with attribute such as charge and age limit for viewer, and means for displaying the explanatory statement corresponding to the icon in the official program name display column when the cell is specified by the cursor. If the individual cells are narrow, the attribute (charge, age limit, etc.) of the program in the cell can be specifically displayed in the official program name display column.

As shown in FIG. 26, in the program list display picture 22, a program list display column 24 of a relatively large display region showing program names in multiple rectangular cells divided by the time axis and channel axis, a broadcast date display column 23 in its highest line, and an official program name display column 26 in its lowest line are provided, and when the cursor move key of the remote controller 6 is manipulated to adjust the cursor 25 to the cell of a desired program on the screen, the full name of the program is displayed in the official program name display column 26, which is already explained in embodiment 7.

In this embodiment 8, the individual programs are displayed by specifying colors, such as green, blue, red, orange, yellow and white, according to the category (news, drama, movie, animation, music, foreign language conversation, etc.), and the color coded programs are displayed in the cells in the program list display column 24. As for the category data, the category code is assigned in each program stored in the memory means 5. It is judged by the image generating means 8, and is displayed in color coding. Further, in embodiment 8, the cell pointed by the cursor 25 is displayed in a deeper color of the same hue corresponding to the category of the program in the cell, and the official program name display column 26 for displaying the full name of the program in the cell pointed by the cursor 25 is also displayed in a corresponding darker color of the same hue.

For example, the category of the Tuesday Suspense Murder in Spa, the program on channel 111 starting from 8:00 p.m. is a drama, and, for example, a blue color is assigned to the drama. While the cursor 25 is away from this cell, the cell is displayed in a pale blue color. When the cursor 25 comes on the cell of Tuesday Suspense Murder in Spa, the display of the cell is changed from the pale blue color to a dark blue color. In the official program name display column 26, the full name of Tuesday Suspense Murder in Spa is displayed, and this official program name display color 26 is also changed to the dark blue color at the same time. Similarly, the category of Music Station, a program on channel 124 starting from 7:00 p.m. is music, and, for example, a yellow color is assigned to the music. While the cursor 25 is away from this cell, the cell is displayed in a pale yellow color. When the cursor 25 comes onto the cell of Music Station, the display of the cell is changed from the pale yellow color to a dark yellow color. In the official program name display column 26, the full name of the program "Music Station" (this is not changed because the name is short) is displayed, and this official program name display column 26 is also displayed in the dark yellow color at the same time.

In this way, the color display state of the cell selected by the cursor 25 in the program list display column 24 and the color display state in the official program name display column 26 are closely related, so that the visual correspondence of the two is emphasized.

Figures 29, 30:
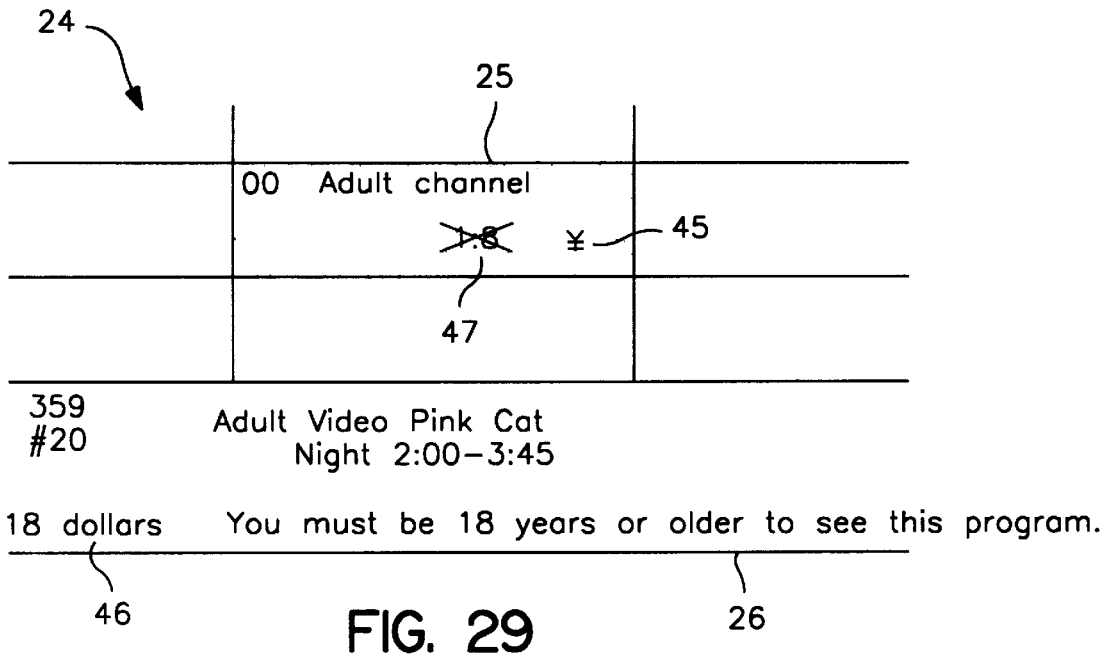
FIG. 29 is a partial diagram showing other example of icon display in embodiment 7.
FIG. 30 is a display state diagram of program list display screen in other format in embodiment 7.

In the cells of Tuesday Suspense Murder in Spa and Music Station in the program list display column 24, the $ mark icon 45 is provided to show they are paid programs, and when the cursor 25 is moved onto these cells, in the official program name display column 26, the specific charge amount 46 (for example, charge: 3 dollars) is indicated, and more specific information about the program is presented. As the icon display in the cell, for example, as shown in FIG. 29, to indicate an adult program, an icon 47 showing an x-mark on 18 (18 years of age) to warn the age limit is shown in the cell of the program list display column 24. In this case, in the official program name display column 26, for example, it is displayed "You must be 18 years or older to see this program."

In a list of programs as shown in FIG. 30, the broadcast date display column 23, program list display column 24, and official program name display column 26 are provided, and the display color of the cell indicated by the cursor 25 in the program list display column 24 and the display color in the official program name display color 26 are related with each other.

9th EMBODIMENT

A broadcast receiving apparatus of the invention comprises means for displaying an attribute of a program in a cell of a program list display column by using an icon when the program is provided with an attribute such as charge and age limit, and means for displaying an explanatory statement corresponding to the icon in the official program name display column when the cell is indicated by the cursor. If the individual cells are narrow, the attribute of the program (charge, age limit, etc.) in the cell can be specifically displayed in the official program name display column.

The broadcast receiving apparatus of the invention further comprises means for displaying program names in one line each by a specific number, for example, two from the longest broadcasting time if multiple programs are contained per hour in the program list display column, means for displaying the other programs in a narrow gap enclosed by upper and lower separation lines, and means for showing a corresponding program name when the cursor is adjusted to the narrow gap by pop-up display. When there are more program than the number of programs displayed per hour, a gap is shown by upper and lower separation lines to indicate always that there are other programs, and when the gap is pointed by the cursor, the program name is shown by pop-up display. That is, many programs can be substantially displayed in a narrow region.

It is a feature of the broadcast receiving apparatus of the invention that the detailed information about the program of pop-up display is displayed in the official program name display column. Not merely the pop-up display, the specific information can be also confirmed, and the controllability and sense of manipulation are enhanced.

As described above, in order to display as many program as possible in a limited display area, two lines are provided for program names per hour. Therefore, two program can be displayed per hour. Actually, there may be three or more program in an hour. In such a case, for example, as shown in the 5:00 p.m. time zone on channel 111 in FIG. 26, between the program Practical English and the program Mom and . . . , suppose there is a short program. For example, the program name is Spanish in a Nutshell. Suppose Practical English runs for 20 minutes, Spanish in a Nutshell for 10 minutes, and Mom and . . . for 30 minutes. Of these three programs, two longer programs, Practical English and Mom and . . . , are displayed by priority in the cell for an hour, and two separation lines 48 indicating presence of other program between the two programs are shown, and a gap 49 between the two separation lines 48 indicates the presence of other program.

When the cell of Practical English is pointed by the cursor 25, the specific information about Practical English is displayed in the official program name display column 26. Next, as shown in FIG. 31, when the cell of the gap 49 enclosed by the upper and lower separation lines 48 is pointed by the cursor 25, the program name to be displayed in the cell appears as "Spanish in a Nut" by pop-up display 50, and its full name "Spanish in a Nutshell" and other specific information are displayed in the official program name display column 26. It is known that the broadcasting time zone of this concealed program is from 5:20 to 5:30 p.m., and that it is free of charge.

When the cursor 25 is moved to the cell of "Mom and . . . ," the pop-up display 50 disappears, and the full name of the program "Mom and Me Together" is displayed in the official program name display column 26.

As other example, supposing there are four program in an hour, it is explained in FIGS. 32(*a*)–32(*c*). There are program 1 to program 4, and program 1 and program 3 are the longer ones. In the ordinary program name display, as shown in FIG. 32(*a*), names of program 1 and program 3 are displayed, and names of program 2 and program 4 are not displayed, and only separation lines 48*a* and separation lines 48*b* are displayed, and program 2 and program 4 are concealed in the cells in the gaps 49*a*, 49*b*.

As shown in FIG. 32(*b*), when the cursor 25 is moved to the cell of the narrow gap 49*a* enclosed by the upper and lower separation lines 48*a*, the name of program 2 is shown by pop-up display 50*a*, and, as shown in FIG. 32(*c*), when the cursor 25 is moved to the cell of the narrow gap 49*b* enclosed by the upper and lower separation lines 48*b*, the name of program 4 is shown by pop-up display 50*b*. In both FIG. 32(*b*) and (*c*), the detailed information of the programs by pop-up displays 50*a*, 50*b* is shown in the official program name display column 26 (see FIG. 31).

In embodiment 9, the number of display lines or the number of display programs per hour is two, but the same display method can be applied if the number if one, or three or more.

Also in embodiment 9, two programs of longer broadcasting time are displayed, and others are concealed and shown by pop-up display, but in other mode, it is also possible to display by scroll in a specific hour frame. This is explained by reference to FIGS. 36(*a*)–36(*c*).

Figure 36A:
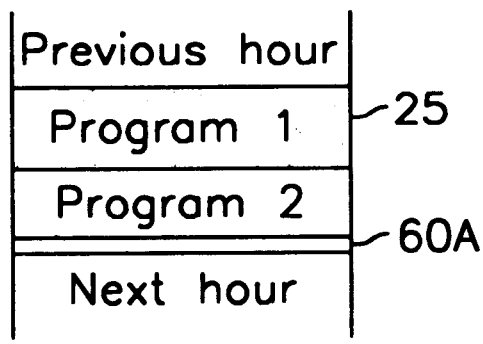
FIGS. 36(a)–36(c) are program name display state diagrams in a modified form of embodiment 9.
Figure 36B:
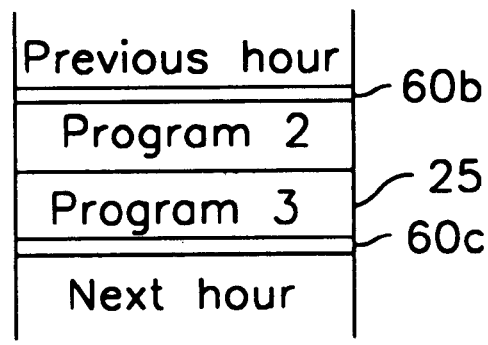
Figure 36C:
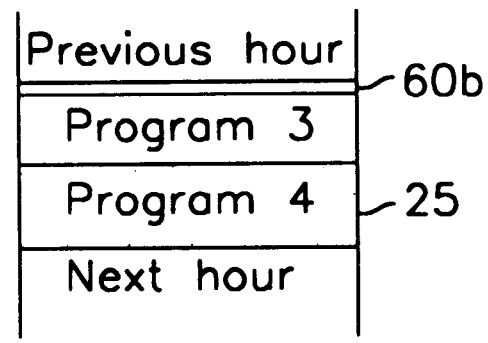

As shown in FIG. 36(*a*), in the initial state, first two programs in the hour range (program 1 and program 2) are displayed, and a narrow gap 60*a* means there is a concealed program between program 2 and next hour. In this state, the cursor 25 is located at program 1.

When the cursor 25 is moved down, the cursor 25 is moved to program 2 in the same display.

When the cursor 25 is further moved down, as shown in FIG. 36 (*b*), the display range is moved down, and program 2 and program 3 are shown, and a gap 60*b* shows there is a concealed program between program 2 and previous hour, and gap 60*c* shows there is a concealed program between program 3 and next hour. At this time, the cursor is located at program 3.

When the cursor 25 is moved down still more, as shown in FIG. 36 (*c*), the display range is moved down, and program 3 and program 4 are displayed, and the gap 60*b* indicates there is a concealed program between program 3 and previous hour. At this time, the cursor 25 is located at program 4.

In such scroll display method, without using pop-up display, all programs can be displayed by moving the cursor.

Incidentally, when the number of programs contained per hour is multiple, a specific number of programs of longer broadcasting time, for example, only two program names are displayed by one line each, and when the cursor is moved to the narrow gap, the corresponding program name is shown by pop-up display, and therefore two program names of longer broadcasting time are always displayed, and as for the program concealed in the gap, the program name is shown specifically by pop-up display by pointing by the cursor, so that many programs can be substantially displayed in a narrow region.

Moreover, when the program is assigned with an attribute such as charge and age limit, the attribute is indicated by a corresponding icon in the cell of the program list display column, and when the cell is pointed by the cursor, the explanatory statement corresponding to the icon is displayed in the official program name display column, and therefore, if the individual cells are narrow, the attribute of the program in the cell (charge, age limit, etc.) can be specifically described in the official program name display column.

Besides, as for the program shown by pop-up display, the detailed information is displayed in the official program name display column, so that the controllability and sense of manipulation may be further enhanced.

10th EMBODIMENT

A broadcast receiving apparatus of the invention comprises means for displaying by color coded division depending on the time zone when displaying the time in the time display column in the program list display column in plural stages. If the time zone displayed in the program list display is short, by color coded display, the division of a.m. and p.m., or morning, afternoon, evening, and night can be intuitively known.

In the program list display, the display time zone is short, for example, 4 to 8 hours, and if it is divided into a.m. and p.m., the displayed range is short and it is hard to understand intuitively. For example, if displayed as 12 a.m., it is hard to know intuitively whether it is noon or midnight. Besides, the 24-hour system is not commonly accepted.

As for the time display, as already explained in FIG. 26, the time zone closest to the present time when the Program list key is manipulated in the remote controller 6 is shown in the highest line of the time display column 24a in the program list display column 24, and in relation thereto, the day or night is displayed in the day/night display column 24c. In the case of FIG. 26, as shown in the broadcast date display column 23, the present time is 4:17 PM, and Night is displayed in the day/night display column 24c, and 4:00 is displayed in the highest line of the time display column 24a. Since the time display column 24a consists of five lines, the display time zones are 4:00 to 8:00, but by the time zone scroll by the remote controller 6, the time zones displayed next are 9:00 to 1:00. Further, 2:00 to 6:00 are displayed.

In embodiment 10, as shown in FIG. 33, a time control table 51 is provided in the memory means 5. From the time zone of 5:00 a.m. to the time zone of 11:00 a.m., it is treated as the morning, and the time coding color of, for example, white is set in these time zones (total of 7 hours). From the time zone of 12:00 a.m. to the time zone of 4:00 p.m., it is the afternoon, and, for example, yellow is set as the time coding color in these time zones (total of 5 hours). From the time zone of 5:00 p.m. to the time zone of 11:00 p.m., it is the evening, and, for example, gray is set at the time coding color in these time zones (total of 7 hours). From the time zone of 12:00 p.m. to the time zone of 4:00 a.m., it is the night, and, for example, black is set at the time coding color in these time zones (total of 5 hours). These four divisions are, however, mere examples.

Figure 34:
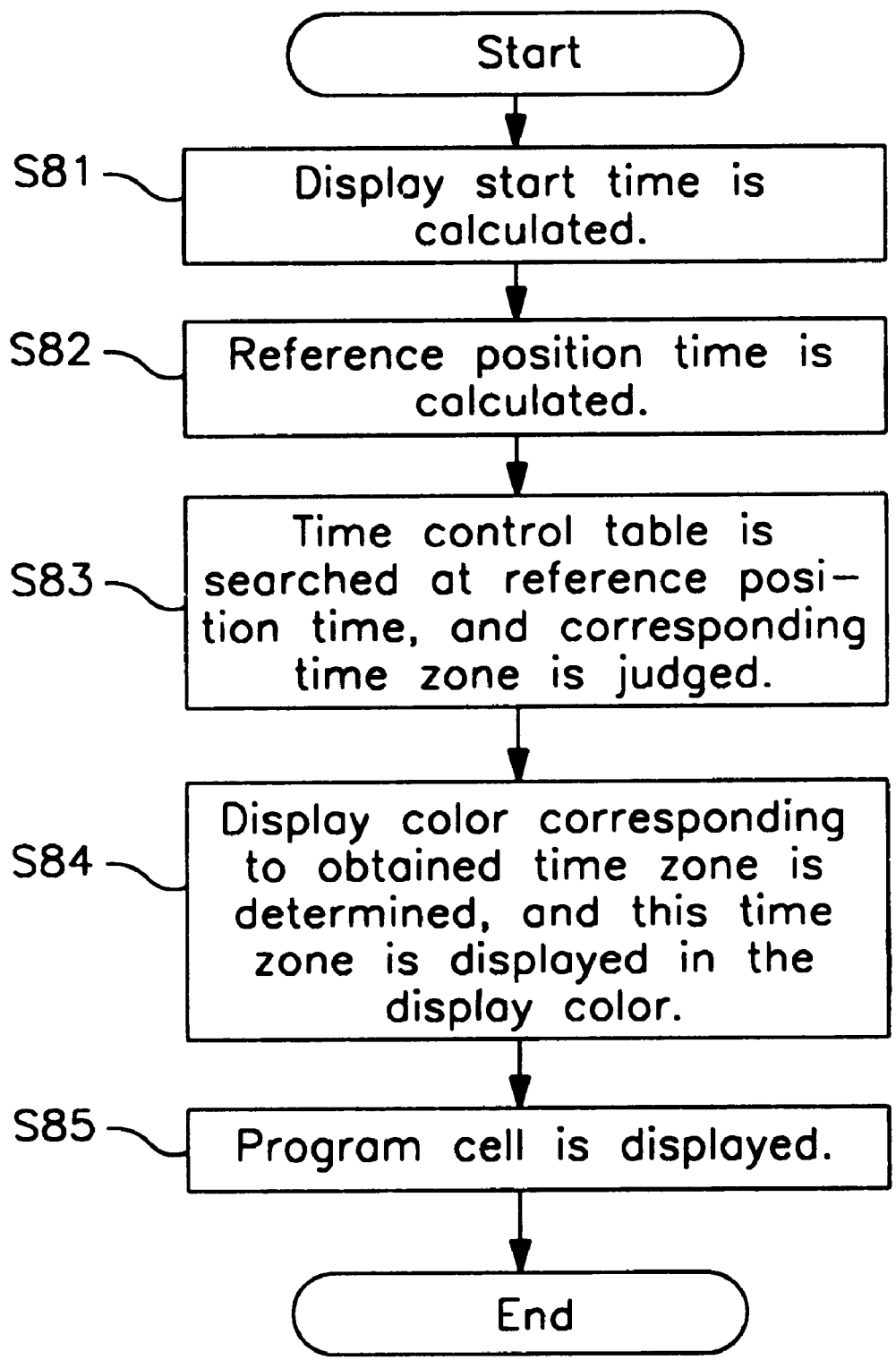
FIG. 34 is a flow chart for explaining the operation of embodiment 10.

The operation is described below while referring to the flowchart in FIG. 34. By manipulating the Program list key of the remote controller 6, the display start time is calculated (step S81). This display start time is the present time or the beginning time as a result of time zone scroll.

Next, the reference position time is calculated (step S82). The reference position time is either the time to be displayed in the highest line in the time display column 24a (4:00 in the case of FIG. 26), or the time to be displayed in the central position of the time display column (6:00 in FIG. 26).

In this case, by adding 2 hours to the display start time (4:00 p.m.), the reference position time (6:00 p.m.) is obtained. The time control table 51 is searched by the reference position time, consequently, the corresponding time zone is judged (step S83). Supposing 6:00 p.m. to be the reference position time, it is in evening time zone in the time control table 51, and the time coding-color is gray. Next, on the basis of the obtained result, the time is displayed in the specified color in the time display column 24a, and it is also displayed in the day/night display column 24c (step S84). In this example, Night is displayed in the day/night display column 24c, and 4:00 to 8:00 are displayed in the time display column 24a, and the display color is gray. It is hence possible to recognize intuitively that the time zone of the program list being displayed at the present is from 4:00 p.m. to 8:00 p.m. In succession, the program cell is displayed in the program list display column 24 (step S85). Incidentally, the program cell may be displayed also before step S81.

Figure 35A:
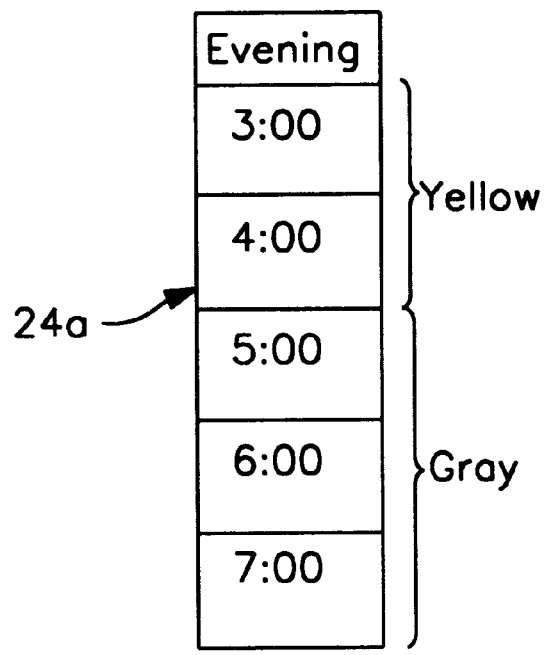
FIGS. 35(a) and 35(b) are explanatory diagrams of time zone color coding in other state in embodiment 10.
Figure 35B:
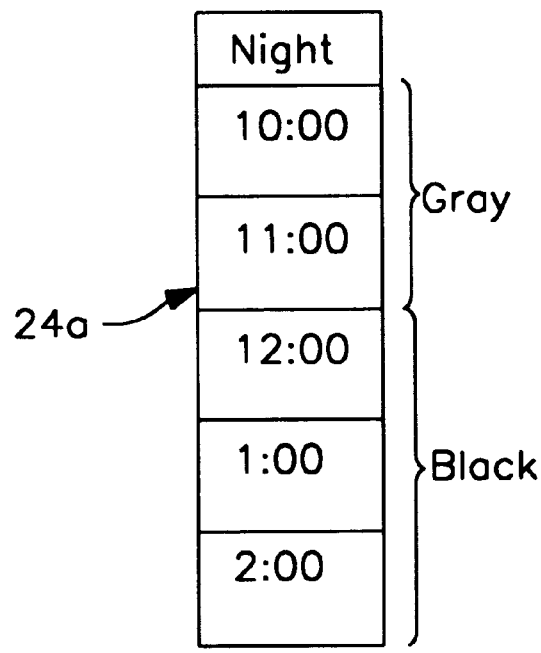

As shown in FIG. 35 (a), when the display time zones is from 3:00 p.m. to 7:00 p.m., the time zones from 3:00 p.m. to 4:00 p.m. are displayed in yellow, and the time zones from 5:00 p.m. to 7:00 p.m. are displayed in gray. As shown in FIG. 35 (b), when the display time zones is from 10:00 p.m. to 2:00 a.m., the time zones from 10:00 p.m. to 11:00 p.m. are displayed in gray, and the time zones from 12:00 p.m. to 2:00 a.m. are displayed in black.

By color coding of time zones as in FIG. 10, meanwhile, it is also possible to divide into a.m. and p.m., and a.m. zones may be indicated in white, and p.m. zones in black. At this time, the 24-hour system may be employed. Instead of color coding of time zones, the time zones may be indicated by gradation of a same color (gradual changes of density).

Since color coding for time zones is employed for dividing the time in the time display column in the program list display column into plural stages, if the time zones displayed in the program list display are short, the distinction of a.m. and p.m., or morning, afternoon, evening, and night can be easily understood intuitively.

Thus, the official program name display column is disposed at a predetermined specific position together with the program list display column, and the official program name of the program corresponding to the cell specified by the cursor in the program list display column is displayed in the official program name display column, and therefore many cells, that is, programs can be displayed in a display screen of a limited area, and the full name of the program corresponding to the cell specified by the cursor is displayed in the official program name display column, while the display of other programs is maintained. At the same time, the display formats of the cell specified by the cursor and the official program name display column are identical or similar to as to be closely related to each other, and the visual correspondence of the two is emphasized, so that the controllability and sense of manipulation may be enhanced.

11th EMBODIMENT

A broadcast receiving apparatus of the invention includes a record reserve mode and view reserve mode, and comprises means for locking the setting of various manipulations and selections and the OSD (that is, setting in non-display state) in the record reserve mode, means for execute the record reserve action when reaching the reserve start time if the power source of the display means is OFF (hereinafter called power OFF state), means for executing the view reserve action without locking the setting of various operations and selections and the OSD in the view reserve mode and when the power source of the display means is ON (power ON state) when reaching the reserve start time, and means for not executing the view reserve action in the power OFF state. As for a program desired to be viewed, the program is reserved to view, and when reaching the reserve start time, it can be viewed timely in power ON state, and it is not viewed in power OFF state, which eliminates the inconvenience of being charged without viewing, and as for a program not to miss, by record reservation by locking the setting of various manipulations and selections and the OSD, unexpected change of channel is avoided, and the reserved program can be viewed securely (although after finishing the record action), so that reserve record may be realized.

The broadcast receiving apparatus of the invention is described specifically below.

Figure 37:
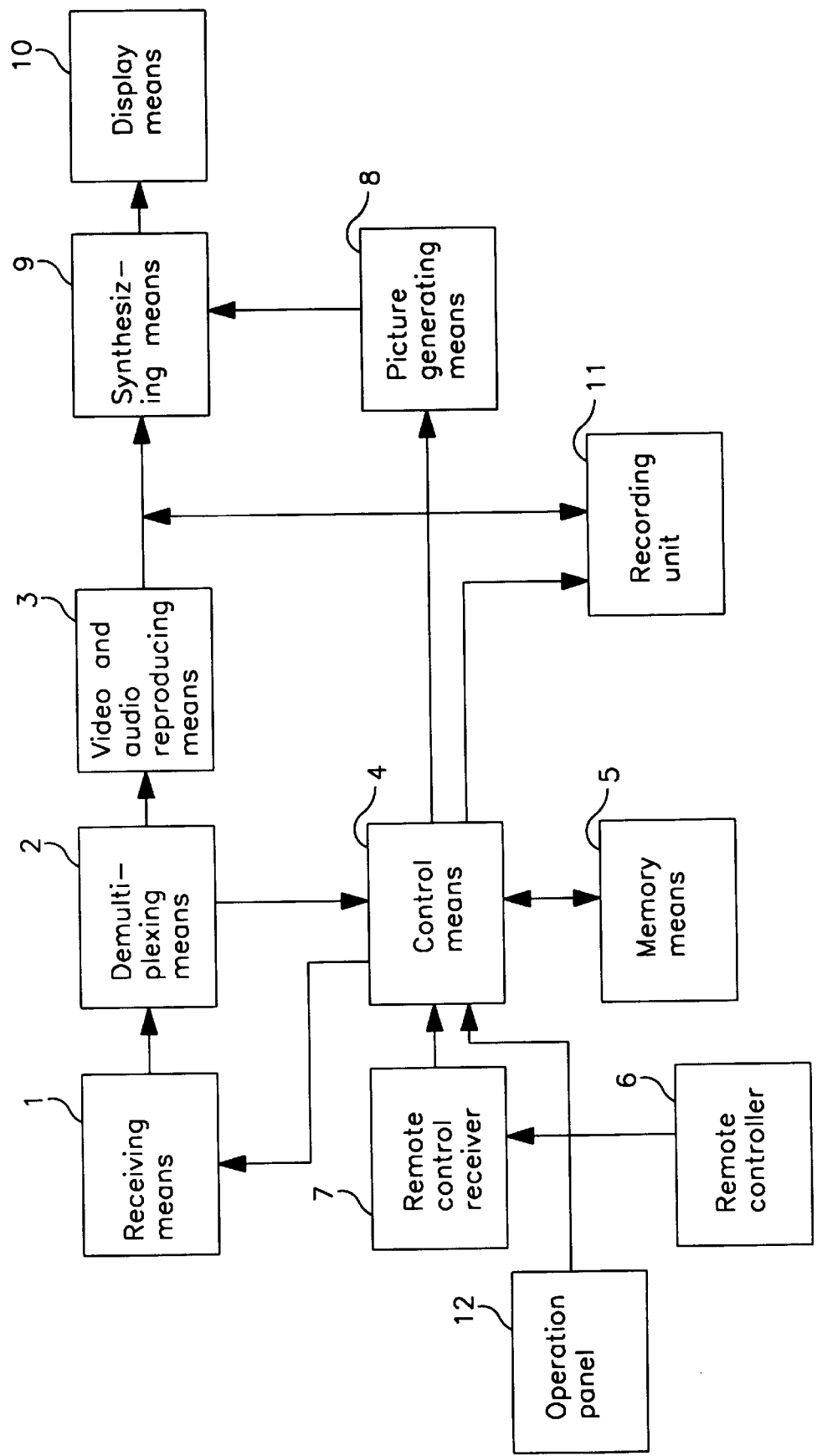
FIG. 37 is a block diagram showing a schematic constitution of a broadcast receiving apparatus in embodiment 11.

FIG. 37 is a block diagram showing a schematic diagram of broadcast receiving apparatus of digital system according to this embodiment. In FIG. 37, reference numeral 1 denotes receiving means including a tuner for receiving broadcast and tuning and demodulating means, 2 is demultiplexing means for extracting video signal, audio signal and program information from received broadcast signal, 3 is video and audio reproducing means for decoding the video signal and audio signal, 4 is control means for controlling the parts of the apparatus for processing information, and having a function for assisting the user to select a program or channel, 5 is memory means for temporarily storing information, 6 is an operation input unit for controlling the control unit by a remote controller, 7 is a remote control receiver for receiving a remote control signal and decoding and sending to the control means 4, 8 is image generating means for generating an on-screen display (OSD), 9 is synthesizing means for overlaying the on-screen display on the video signal, 10 is display means for issuing the video signal to the display device such as display and TV receiver, 11 is a recorder for recording the video signal and audio signal in record mode, and 12 is an operation input unit for controlling the control unit on an operation panel directly without using the remote controller.

In the explanation to follow, the broadcast receiving apparatus does not include display device such as display and TV receiver, but the operation is the same if the display means includes display device such as display and TV receiver. It must be hence noted that the invention also includes a case in which the display means includes a display device.

The control signal for manipulating broadcast receiving apparatus is fed from the remote controller, but if the operation control signal is entered from the operation panel 12 of the broadcast receiving apparatus, the broadcast receiving apparatus operates similarly.

Only the display of picture is explained herein, but the sound accompanying the picture behaves similarly. To avoid complication, description about sound is omitted herein. It must be, however, noted that the invention is also applied to the sound accompanying the picture.

The program information is the data including the content about the program to be broadcast and attached information such as broadcasting time. This program information is multiplexed on the broadcast signal, and is received, separated, and stored in the memory means 5. As for the program information, however, it is possible to process similarly even in the case of information given from other broadcast than the broadcast of the program, communication or accumulation media.

According to this embodiment, in the record reserve mode, the manipulation and OSD (on-screen display) are locked, and the record action of the broadcast receiving apparatus is executed even in the power OFF state, and in the view reserve mode, the manipulation and OSD are not locked, and the view action of this broadcast receiving action is not executed in the power OFF state.

Table 1 summarizes the active states of the embodiment.

TABLE 1

| | Operation, OSD | In power OFF state | User manipulation during execution |
| --- | --- | --- | --- |
| Record reserve | Locked | Record action is executed | Invalid (warning display) |
| View reserve | Not locked | Display action is banned | Valid |

OSD: On-screen display

As shown in Table 1, in the record reserve mode, since the manipulation and OSD (on-screen display) are locked, if the user manipulates the remote controller or operation panel 12, such manipulation is valid, and the display action on the display means is banned. Moreover, in the record reserve mode, even in the power OFF state, when reaching the reserve start time, the reserve action of the program of the reserved channel, that is, the reserve record is executed. During execution of the reserve record, the remote control manipulation and panel manipulation are ignored, and the LED showing the invalid state flickers to warn the user. Therefore, recording is done securely in the condition of the record reservation (channel, program, video mode, audio mode, etc.).

In particular, however, a specific key manipulation, for example, the power key of the operation panel 12 may be used for reserve cancel operation, and only this reserve cancel manipulation may be designed to be valid.

On the other hand, in the case of view reserve mode, the manipulation and OSD are not locked, and therefore a program can be viewed by the display action of the display means 10 by remote control manipulation or panel manipulation, and also the picture display state can be manipulated. Further, in the view reserve mode, if the power source is in OFF state when reaching the reserve start time, view reserve action is not executed. It hence avoids the inconvenience of being charged without viewing the reserved program.

In the power ON state, when reaching the reserve start time, the view reserve action is put in effect. In this case, when viewing program or other channel than the reserved channel, it is automatically changed over to the reserved channel.

Or, immediately before the reserve start time, by prior notice display announcing the start of action of view reserve (for example, displaying "Channel X is being served on Y hours Z minutes"), the user may be urged to change over the channel.

Instead of automatic changeover from the viewed program to the reserved channel, if the user manipulates to change over the channel within a specific time, the view reserve action may be canceled.

Or, by prior notice display, if the user manipulates to cancel within a specific time, the view reserve action may be canceled, and unless canceled, the channel may be automatically changed to the view reserve channel.

Next, referring to the flowchart in FIG. 38 and FIG. 39, the action of record reserve/view reserve is described below. It is supposed herein that either the record reserve or the view reserve has been already set (one program can be set in either mode only), and that setting of record reserve or view reserve of each program has been already stored in reserve list in the memory means 5. First, at specific time intervals (for example, every minute), the clock is updated (step S91), and it is judged whether the reserve action is being executed at the present or not (step S92), and in ordinary state not being executed, the present time and the reserve start time of each program on the reserve list are compared (step S93), and it is judged if there is a corresponding reserve program (step S94),and if none, the process return to the initial step of the routine, and if found, it is judged if the program is reserved for record or reserved for view (step S95).

If record reserve is judged at step S95, the manipulation and OSD (on-screen display) are locked (step S96), and the channel of the reserved program is selected, and the video signal and audio signal are issued, and the reserve record action is started in the record unit 11 (step S97). Until the reserve record action is over (step S102), in order to record the reserved program securely, to avoid unexpected changeover of the selected channel, the remote control manipulation or panel manipulation by the user is not accepted except for specific reserve cancel operation.

In the judgement whether the reservation is record reserve or view reserve at step S95, in the case of view reserve, it is judged if the power source is in ON state and if the display means 10 is in display state or not (step S98), and in the case of power OFF state, the process returns to the initial step of the routine without doing anything, and on the other hand when the power source is in ON state and some program is being viewed at the present, the channel of the reserved program is selected, and the video signal and audio signal are issued to start the reserved viewing action (step S99).

In the judgement whether the present reserve action (either reserve record or reserve view) is being executed or not at step S92, if in the process of execution, the present time and the reserve end time of execution are compared (step S100), and the matching of time is judged (step S101), and when not matched, the process returns to the initial step of the routine, but when matched in time, the reserved action is terminated (step S102), and if this reservation is record reserve, the lock of manipulation and OSD is cleared (step S103), and the process is over In this way, a program desired to be viewed can be reserved (view reserve) like a memory for storing the program, and when the power source is turned on, it can be viewed timely, and when the power source is turned off, it is not viewed, which eliminates the inconvenience of being charged for a program not viewed.

On the other hand, as for a program not to miss, by record reserve accompanied by locking of manipulation and OSD, unexpected change of channel (change of program) can be avoided, and the reserved program can be recorded securely.

In the judgement whether record reserve or view reserve at step S95, meanwhile, if plural programs are reserved at the same reserve start time in record reserved in one and view reserve in others, the priority is given to the record reserve.

Incidentally, as for parental processing (input of password for a program with age limit) or processing for purchase confirmation of program to be viewed or recorded, it is generally done beforehand in the stage of reserve setting, but it may be also done in the action flow of record reserve or record view. That is, checking whether both flag F1 showing parental setting and flag F2 for purchase confirmation of the program are set at "1" or not is done between step S95 and step S96, and between step S95 and step S98, and when both flags are set, the process advances to next step, but if at least either flag is not set, a screen for its confirmation is displayed to urge parental processing or purchase confirmation. In particular, purchase confirmation at the reserve start time is advantageous for the user as compared with the prior purchase confirmation when setting the reservation because the timing for actually purchasing the program or not can be delayed. That is, it avoids the trouble of being charged without viewing the reserved program when other program is actually viewed instead of the reserved program. In this case, after unlocking at step S103, each flag is reset.

Figure 38:
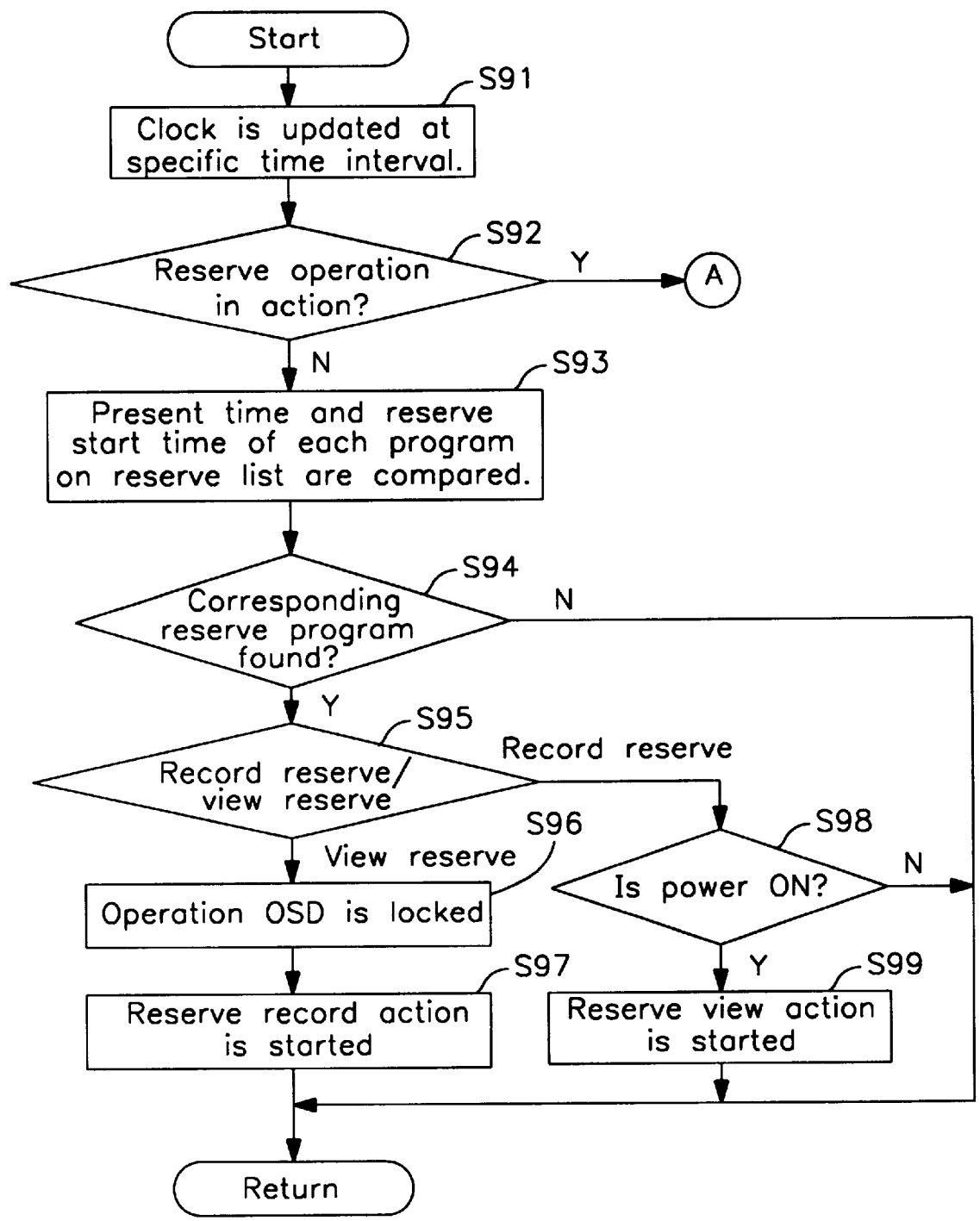
FIG. 38 is flowchart for explaining the operation of the broadcast receiving apparatus in embodiment 11.
Figure 39:
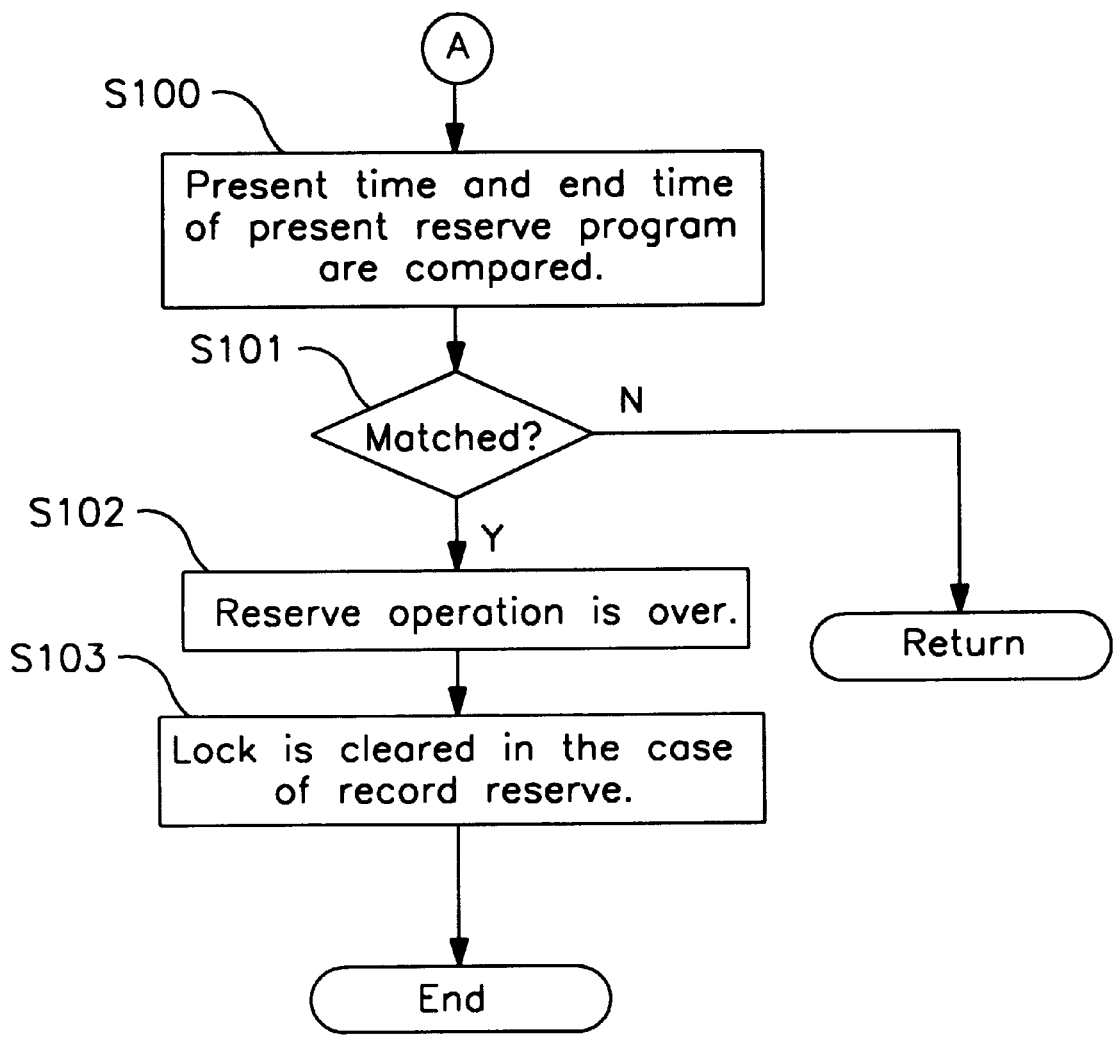
FIG. 39 is a flowchart (continued from FIG. 38) for explaining the operation of the broadcast receiving apparatus in embodiment 11.

Or, if the program desired to be recorded is, for example, a newly released movie and is copy-protected so as not to be recorded unless an extra charge is paid, the copy-protect on/off judgement for purchasing this program for recording or not may be interlocked with the flow in FIG. 38 and FIG. 39.

In the case of record reserve, meanwhile, it may be also composed to make valid the control output to the VTR.

12th EMBODIMENT

A broadcast receiving apparatus of the invention is composed to be accessible to the telephone circuit through a modem, and comprises an indicator operating by interlock with the access of the modem to the broadcast receiving unit. While the modem is accessing the telephone circuit, the indicator operates, and the user is warned that the telephone, facsimile apparatus, personal computer, or other terminal device cannot be used at the present. When the modem access is over, the indicator stops, and the user knows that the terminal device can be now used. By this indicator, the convenience of use of the terminal device is enhanced.

Figure 40:
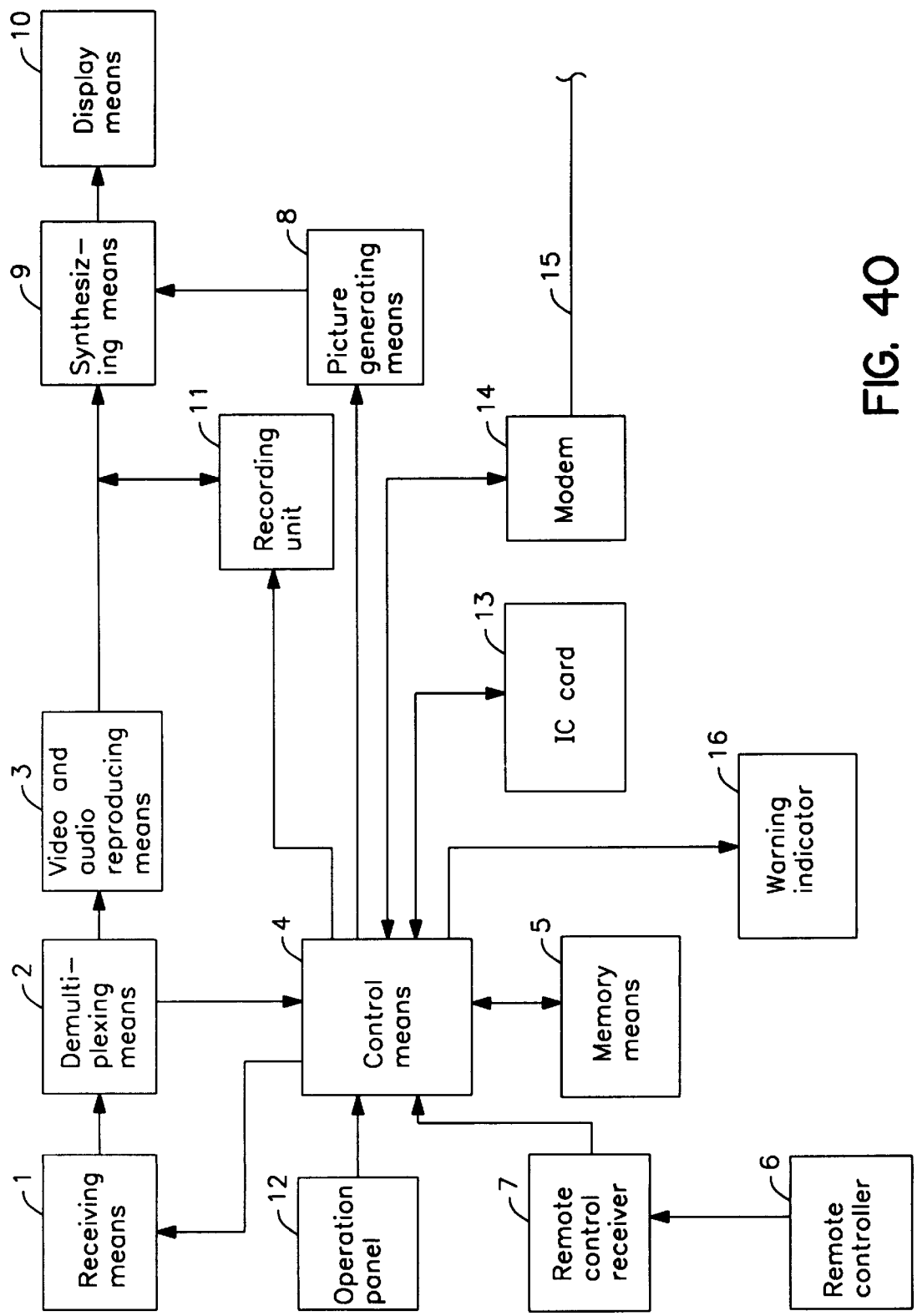
FIG. 40 is a block diagram showing a schematic constitution of broadcast receiving apparatus in embodiment 12 to embodiment 14.

FIG. 40 is a block diagram showing a schematic constitution of a broadcast receiving apparatus of digital system according to embodiment 12. In FIG. 40, reference numeral 1 denotes receiving means including a tuner for receiving broadcast and tuning and demodulating means, 2 is demultiplexing means for extracting video signal, audio signal and program information from received broadcast signal, 3 is video and audio reproducing means for decoding the video signal and audio signal, 4 is control means for controlling the parts of the apparatus for processing information, and having a function for assisting the user to select a program or channel, 5 is memory means for temporarily storing information, 6 is a remote controller, 7 is a remote control receiver for receiving a remote control signal and decoding and sending to the control means 4, 8 is image generating means for generating an on-screen display (OSD), 9 is synthesizing means for overlaying the on-screen display on the video signal, 10 is display means for issuing the video signal to the display device such as display and TV receiver, 11 is a recorder for recording the video signal and audio signal in record mode, 12 is an operation input unit attached to a broadcast receiving unit, 13 is an IC card for reception control, charge processing, and charge control, 14 is a modem connected to a connection cable 15, and 16 is a warning indicator.

In the explanation to follow, the broadcast receiving apparatus does not include display device such as display and TV receiver, but the operation is the same if the display means includes display device such as display and TV receiver. It must be hence noted that the invention also includes a case in which the display means includes a display device.

The control signal for manipulating broadcast receiving apparatus is fed from the remote controller, but if the operation control signal is entered from the operation panel 12 of the broadcast receiving apparatus, the broadcast receiving apparatus operates similarly.

Only the display of picture is explained herein, but the sound accompanying the picture behaves similarly. To avoid complication, description about sound is omitted herein. It must be, however, noted that the invention is also applied to the sound accompanying the picture.

Figure 41:
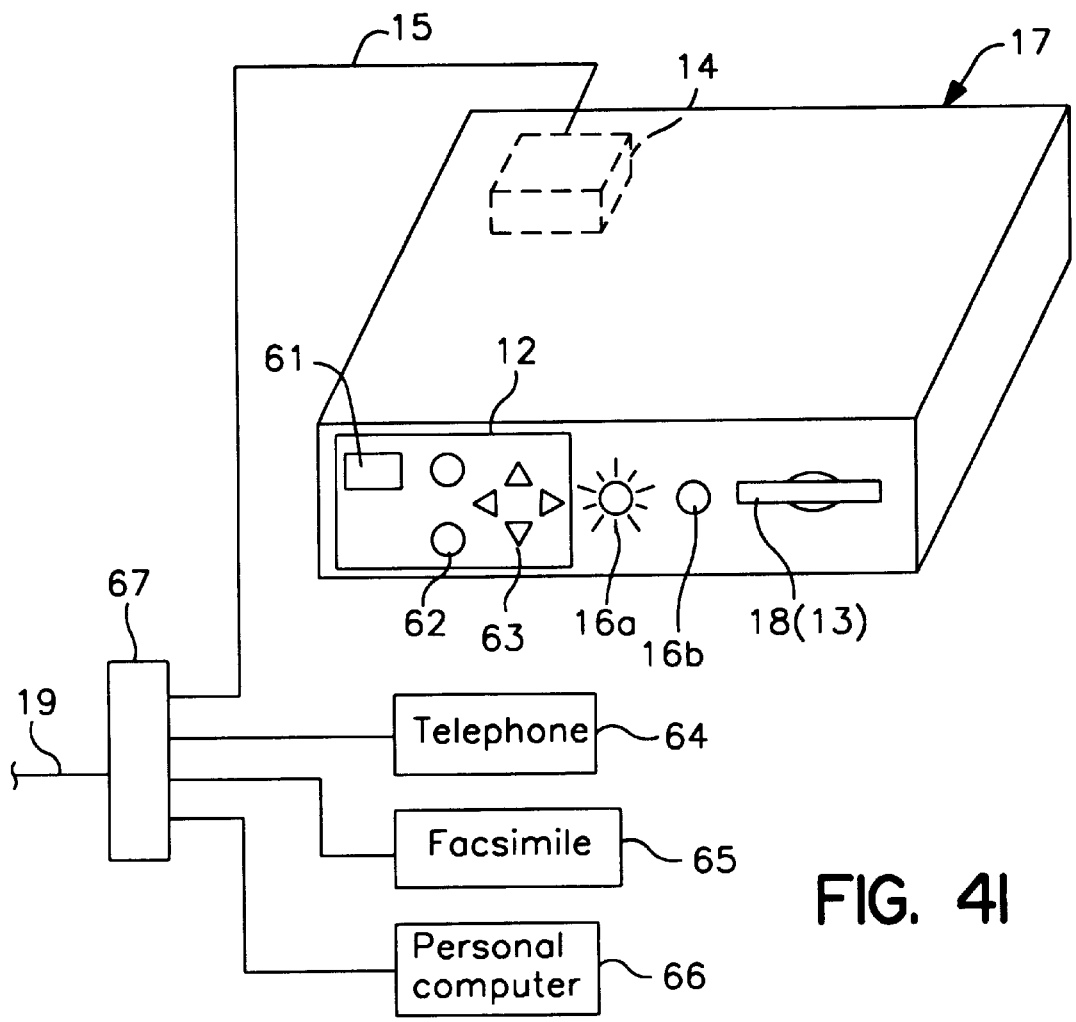
FIG. 41 is a perspective view schematically showing the appearance of broadcast receiving unit in embodiment 12.

FIG. 41 is a perspective view schematically showing the appearance of a broadcast receiving unit 17. In FIG. 41, reference numeral 61 is a power switch provided on the front panel of the broadcast receiving unit, 62, 63 are operation buttons, 18 is an IC card slot for loading the IC card 13, 16*a* is an access indicator for modem, and 16*b* is an access indicator for IC card. The power switch 61, and operation buttons 62, 63 are contained in the panel operation unit 12 in FIG. 40. The two access indicators 16*a*, 16*b* are contained in the warning indicator 16. The access indicators 16*a*, 16*b* are composed of LEDs (light emitting diodes), but may be also composed of other display means such as liquid crystal display devices. Moreover, in FIG. 41, reference numeral 64 is a telephone set, 65 is a facsimile apparatus, 66 is a personal computer, 67 is a connection terminal for parallel connection of the modem 14 of the broadcast receiving unit 17, telephone 64, facsimile apparatus 65, and personal computer 66, and 19 is a public telephone circuit.

The control means 4, when the modem 14 is in access state, operates the modem access indicator 16*a* in cooperation, and when the IC card 13 is in access state, it operates the IC card access indicator 16*b* in cooperation. The operation of the access indicators 16*a*, 16*b* may be either flickering or lighting, but flicking is preferred for the warning function.

While the modem 14 of the broadcast receiving unit 17 is accessing the telephone circuit 19, the telephone 64, facsimile apparatus 65, and the personal computer 66 communicating through the telephone circuit 19 cannot be used. Conventionally, such state was not known to the user, and the user often felt inconvenience, but according to embodiment 12, while the modem 14 is accessing the telephone circuit 19, the modem access indicator 16*a* is flickering, and the user visually and clearly recognizes that the telephone circuit 19 cannot be used at the present. When the access of the modem 14 is over, the indicator 16*a* goes out, and the user can now use the telephone 64 or others.

When the control means 4 is transmitting the data to the IC card 13, or the IC card 13 itself is processing internally, that is, while the IC card 13 is in access state, the control means 4 flickers the IC card access indicator 16*b* in cooperation. Therefore, seeing the flickering of the indicator 16*b*, the user knows that the IC card 13 is in access state at the present, and is warned not to remove the IC card 13 from the IC card slot 18 by mistake. It also prevents removal by the child out of mischief. The IC card 13 is not pulled out, and the protection is enhanced. When the access of the IC card 13 is over, the indicator 16*b* goes out. At this time, if the IC card 13 is removed, no particular problem occurs.

Incidentally, the access state of the modem 14 or IC card 13 may be displayed on the CRT screen which displays by receiving the output of the display means 10, but in this case, if the power source of the display means is turned off, no display is made, and warning function is not exhibited. To exhibit the warning function, the power source must be always in ON state. By contrast, in the case of embodiment 12, since the access indicators 16*a*, 16*b* are incorporated in the broadcast receiving unit 17, the warning function can be exhibited whether the power source is ON or OFF.

It is a feature of the invention that the IC card responsible for program purchase procedure, reception control, charge processing, and charge control is detachably loaded, and that the broadcast receiving unit incorporates indicator collaborating with the access of the IC card. Since the indicator works during access of the IC card, it is warned to the user, especially the child, not to pull out the IC card at the present. If it is necessary to pull out the IC card, it may be removed after confirming that the indicator is stopped. Hence, the protection of the IC card may be enhanced.

As further features of the invention, it is designed to be accessible to the telephone circuit through the modem, the IC card for program purchase procedure, reception control, charge processing, and charge control is detachably loaded, the modem access indicator for working in cooperation with the access of the modem is provided in the broadcast receiving unit, and also the IC card access indicator for working in cooperation with the access of the IC card is provided in the broadcast receiving unit.

According to the broadcast receiving apparatus of the invention, the indicator works while the modem is accessing the telephone circuit, so that the user is warned not to use terminal device such as telephone, and the indicator works while accessing to the IC card for program purchase procedure, reception control, charge processing, and charge control, and it is warned not to pull out the IC card, so that the protection of the card may be enhanced.

13th EMBODIMENT

A broadcast receiving apparatus of the invention comprises means for acquiring program information including an approximate charge amount of a program, means for acquiring an approximate charge amount of purchased program from the program information acquiring means when manipulated to purchase a program, means for adding the approximate charge amount of the purchased program to the hitherto cumulative total of charge amounts and storing the result as the latest cumulative total of charge amounts, and means for displaying the cumulative total of charge amounts according to display request operation of purchase record. The added charge amount is an approximate value, and hence the cumulative total of charge amounts is also an approximate value. However, since the cumulative total of charge amounts is calculated and displayed, it is helpful for judging if the cumulative total of charge amounts is in a reasonable range or excessive. It is also possible to check if the cumulative total of charge amounts is abnormally large due to purchase of many programs by the child without permission.

The broadcast receiving apparatus of embodiment 13 is described below. The basic constitution is same as the constitution of the block diagram in FIG. 40 relating to embodiment 12.

The program information handled herein is the data containing additional information about the content of the program to be broadcast (program name, category, starting time, duration), and attribute information such as charge amount of paid program. This program information is multiplexed on the broadcast, and received and separated by the program information acquiring means, and is stored in the memory means 5 if necessary.

However, the program information may be also given through other broadcast than the broadcast of the program itself, or communication or accumulation media.

Figure 42:
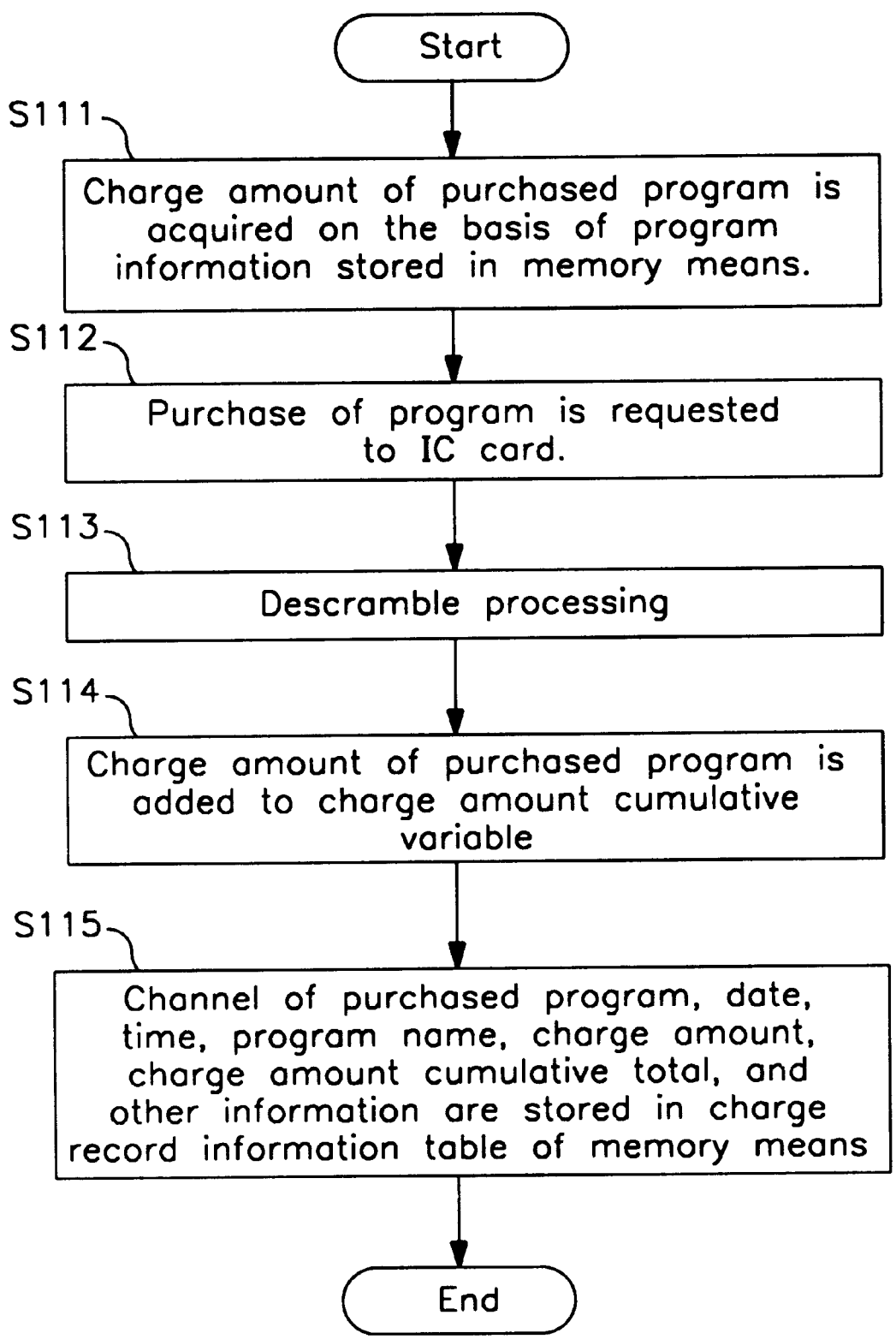
FIG. 42 is a flowchart showing the operation of program purchase processing in embodiment 13.

The operation of program purchase procedure by the control means 4 built in the broadcast receiving unit 17 is explained below according to the flowchart in FIG. 42. In the case of this embodiment 13, the control means 4 calculates the cumulative total of charge amounts of purchased programs by making use of the incorporated memory means 5. First, when processing to purchase a program, the control means 4 acquires the charge amount of the program according to the program information of the purchased program stored in the memory means 5 sent in multiplex on the broadcast signal (step S111). What must be noted here is that the charge amount is an approximate value. That is, it is a standard price not considering a set discount or additional stream fee, and it is not the actual purchase amount precisely.

Next, purchase of the program is requested to the IC card 13 (step S112). By this request, the IC card 13 accumulates the information of purchase of the program in its inside, and the total is calculated in the charge amounts of the official amounts, not approximate amounts, stored inside (for example, 5 dollars and 13 cents, 9 dollars and 87 cents), and it is stored as the charge amount total. However, the charge amount and charge amount total of the official amounts inside the IC card 13 are not employed in the processing in this embodiment 13. It is employed in next embodiment 14.

Next, descrambling is processed (step S113). In this process, the key to clear the scrambling applied on the broadcast program is created by the IC card 13, and this key is transferred to the control means 4. By having this key, descrambling (not shown) is effected to clear the scrambling, so that the broadcast program can be viewed.

Moreover, the control means 4 adds the charge amount (approximate value) of the purchased program acquired from the memory means 5 at step S111 to the charge amount cumulative variable (step S114). Next, in the charge record information table in the memory means 5, the channel of the purchased program, date, time, program name, charge amount (approximate), charge amount cumulative total (approximate) and other information are stored (step S115). In this charge record information table, the above information about the purchased programs of a proper number (several to scores of programs) is stored in time series. As the new information is stored, the old information is deleted sequentially.

When the user wishes to know the program purchase record up to the present, the remote controller 6 is manipulated to set in the display mode of purchase record. As a result, the control means 4 reads out the program purchase history record from the charge record information table of the memory means 5, and displays the purchase record 20 as shown in FIG. 43 on the CRT screen for displaying by receiving the output of the display means 10. This purchase record 20 displays, concerning each one of the plural programs viewed recently, the channel number (for example, 123), purchase date (for example, ½), viewing time (for example, 10:00 to 11:00), program name (for example, Music Stadium), and approximate charge amount (for example, about 4 dollars), and also approximate charge amount cumulative total (cumulative amount) (for example, 42 dollars), and the starting date of totaling (for example, from October 23). Reference numeral 68 is a title display of the display item, 69 is the present date, 70 is the present time, 71 is a reset button display, and 72 is a return button display.

By seeing the display of this purchase record 20, the user knows the viewing history of paid programs and the cumulative charge amount (about 42 dollars) from a certain date (October 23) until the present (January 20). It is hence helpful for judging if the cumulative charge amount is reasonable or excessive. It is possible to check if an enormous cumulative charge amount is accounted due to purchase of programs by the child without permission, which gives a feeling of relief if not, or if so, the purchase record may be shown to the child while warning. It is the same when adult programs with age limits are viewed secretly.

When the Up or Down key of the cursor move keys of the remote controller 6 is manipulated, a cursor 73 moves up or down on the screen, so that an item column of a desired program can be specified. Accordingly, by manipulating the Decide key of the remote controller 6 to specify a certain program item (for example, Godfather Complete), moving the cursor 73 onto the reset button display 71 and manipulating the Decide key, the specified program item is erased from the charge record information table of the memory means 5. Or, all program items can be reset simultaneously.

14th EMBODIMENT

A broadcast receiving apparatus of the invention comprises means for acquiring the charge amount total of official amounts stored in the IC card before program purchase request, means for acquiring the charge amount total after request of program purchase request calculated by the IC card according to the purchase request, means for calculating the difference between the charge amount total after the purchase request and the charge amount total before the purchase request, means for adding the charge amount of a certain purchase program as the above difference to the charge amount cumulative total to the present, and storing as a new charge amount cumulative total, and means for displaying the charge amount cumulative total according to the display request operation of purchase record. The charge amount total calculated and stored in the IC card is the official amount, not an approximate value. Therefore, the difference between the charge amount total after the purchase request and the charge amount total before the purchase request is also the charge amount of official amounts of purchased programs, and the charge amount cumulative total is also the official amount, so that the charge amount cumulative total can be known quite accurately by its display.

This broadcast receiving apparatus further comprises means for storing the purchase program information including the program name and charge amount of the purchase program upon every purchase of program, and means for displaying a list of purchase program information together with the charge amount cumulative total depending on the display request operation of the purchase record. The tendency of program purchase and inclination of purchased programs can be known at a glance. It is also possible to check viewing of programs with age limits by the child. These can be also executed in embodiment 13.

The broadcast receiving apparatus of embodiment 14 is described below. The basic constitution is same as the constitution of the block diagram in FIG. 40 relating to embodiment 12.

First, the function of the IC card 13 is described. In the IC card 13, program purchase data Entitlement Control Message (ECM) transmitted separately from a satellite etc. is stored. This program purchase data ECM contains the charge amount of official amount about the programs that can be viewed according to the contract agreed between the broadcast provider and the user. The IC card 13, when program purchase is requested from the control means 4, adds the charge amount of official amount of the purchased program to the data of the total amount of the charge amounts of the programs purchased so far, and stores as the charge amount total. The broadcast provider periodically accesses the IC card 13 through the telephone circuit 19, and requests to send the data of the charge amount total. When transmission of the data is complete, the charge amount total is reset.

Figure 44:
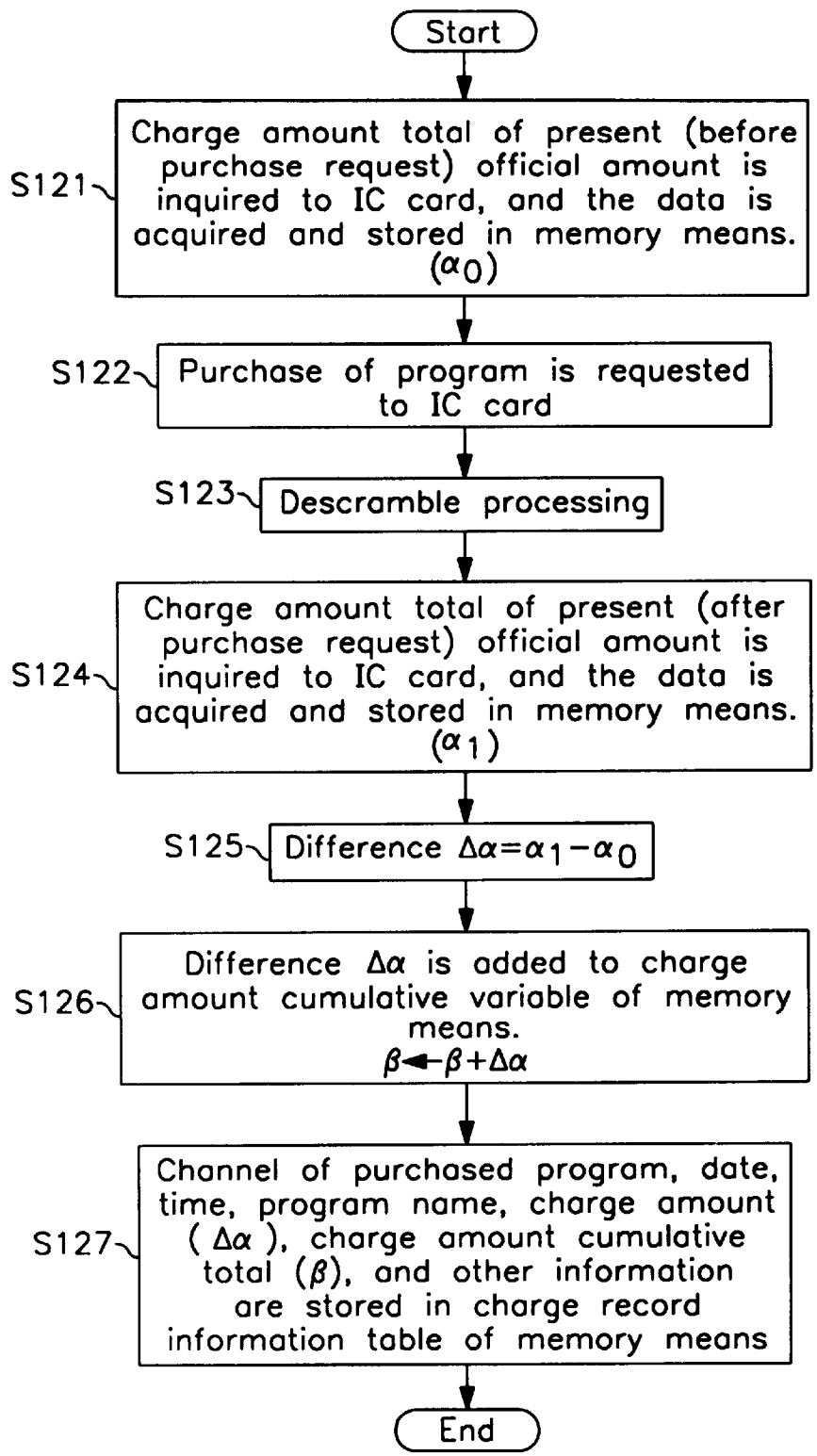
FIG. 44 is a flowchart showing the operation of program purchase processing in embodiment 14.
Figure 45A:
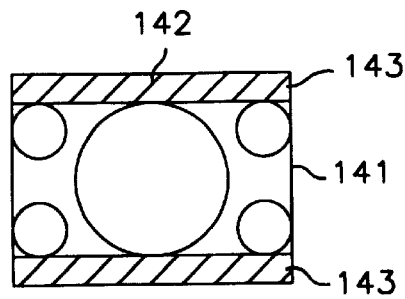
FIGS. 45(a) and 45(b) are explanatory diagrams of partial on-screen display processing in wide broadcast in prior art.
Figure 45B:
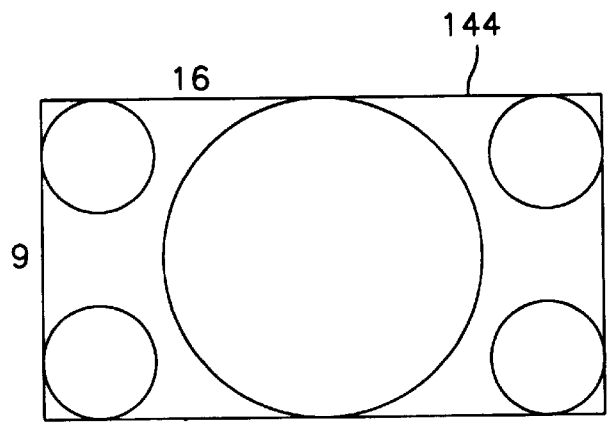
Figure 46:
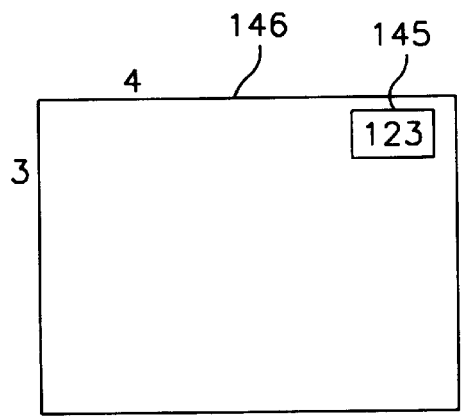
FIG. 46 is an explanatory diagram of display sate of partial on-screen display in ordinary picture with aspect ratio 4:3.
Figure 47A:
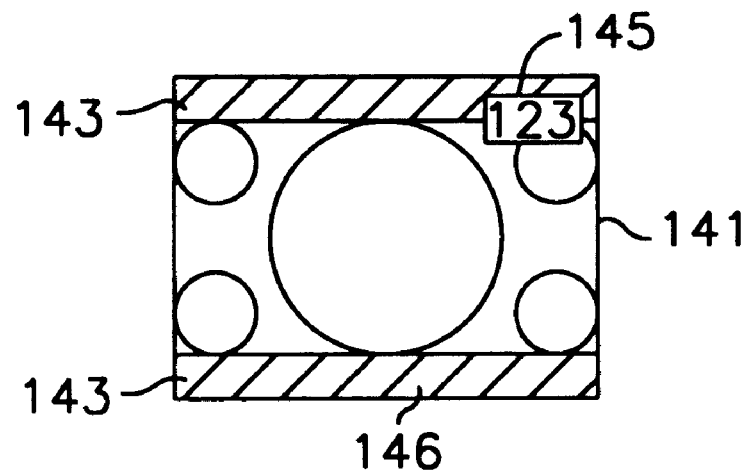
FIGS. 47(a) and 47(b) are explanatory diagrams of auto wide function misoperation occurring in partial on-screen display processing in wide screen in prior art.
Figure 47B:
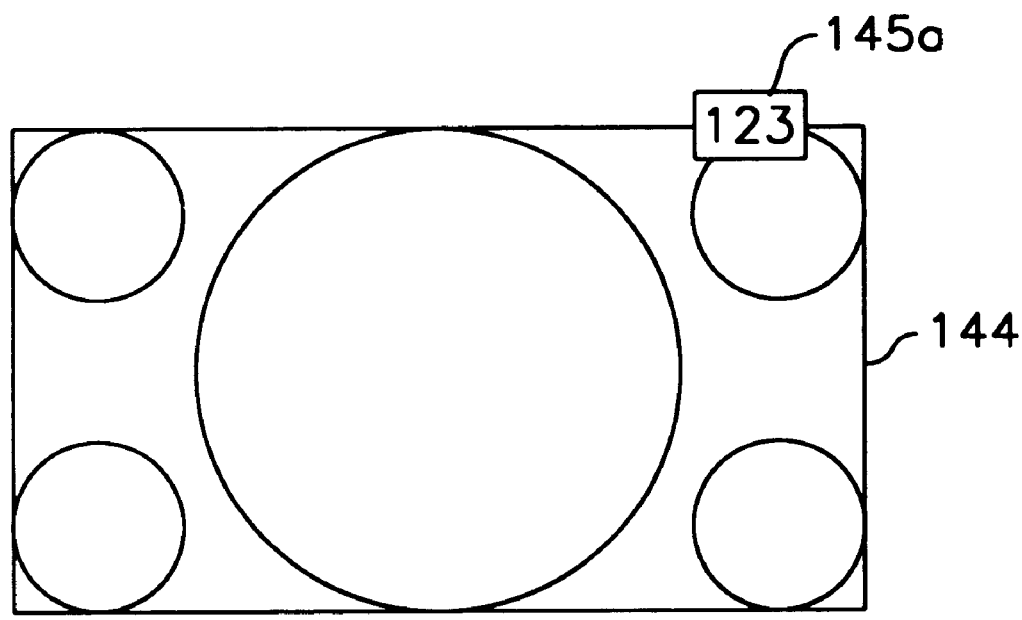

The operation of program purchase procedure by the control means 4 built in the broadcast receiving unit 17 is explained according to the flowchart in FIG. 44. In the case of this embodiment 14, by making use of the charge amount total of official amounts stored in the IC card 13, the cumulative total of the charge amounts of purchased programs is calculated. First, when processing to purchase a program, the control means 4 inquires the charge amount total of official amounts at the present (before the purchase request) to the IC card 13, and acquires the data and stores in the memory means 5 (step S121). Suppose the charge amount total before purchase request to be α0.

Next, a program purchase is requested to this IC card (step S122). By this request, the IC card 13 accumulates the information of purchase of the program in its inside, and calculates the total in the charge amounts of official amounts, not approximate amounts stored inside (for example, 5 dollars and 13 cents, or 9 dollars and 87 cents), and stores it as the charge amount total. Suppose the charge amount total after purchase request to be α1.

Next, descrambling is processed (step S123). In this process, a key for clearing the scrambling applied in the broadcast program is created in the IC card 13, and this key is transferred to the control means 4. By having this key, descrambling (not shown) is effected to cancel the scramble, so that the broadcast program can be viewed.

Further, the control means 4 inquires the IC card 13 again about the charge amount total of official amounts at the present (after purchase request), and acquires the data and stores in the memory means 5 (step S124). The charge amount total at this time is α1 after purchase request.

Then, the control means 4 calculates the difference Δα=α1−α0 between the charge amount total α1 after purchase request acquired at step S124 and the charge amount total α0 before purchase request acquired at step S121 (Step S125). This difference Δα is the charge amount of the purchased program. Both α1 and α0 are official values, not approximate values, and hence the charge amount or difference Δα is also the official amount, not approximate value. This is one of the features of this embodiment 14.

Still more, the control means 4 adds the charge amount of official amount that is the difference Δα calculated at step S125 to the charge amount cumulative variable in the memory means 5 (step S126). This charge amount cumulative value is supposed to be β.

In succession, in the charge record information table in the memory means 5, the channel of the purchased program, date, time, program name, charge amount (Δα), charge amount cumulative value (β) and other information are stored (step S127). In this charge record information table, the above information is stored in time series about the latest purchased programs of a proper number (several to scores). As the new information is stored, the former information is erased sequentially.

The user, when wishing to know the program purchase record up to the present, manipulates the remote controller 6, and sets the display mode of the purchase record. As a result, the control means 4 reads out the program purchase history information from the charge record information table in the memory means 5, and displays the purchase record 20 same as in FIG. 43 on the CRT screen for displaying by receiving the output of the display means 10. In this embodiment 14, both the charge amount of individual programs displayed and the charge amount cumulative value (cumulative total) are official values, not approximate values, so that precise amounts are known.

Since the charge amount cumulative value of purchased programs is displayed, it is helpful for judging if the charge amount cumulative value is in an appropriate range or not, and it is possible to check if the charge amount cumulative value is enormous due to purchase of many programs by the child without permission. Moreover, since the program names of every purchased program and the purchased program information including the charge amount are displayed in a list, the tendency of program purchase and inclination of purchased programs can be known at a glance, and it is also possible to check viewing of programs with age limits by the child.

What is claimed is:

1. A broadcast receiving apparatus for use with a display and, having a plurality of programs in a predetermined time period in a program list column, comprising:

means for displaying a program description in a specified region of the display for a specific number of programs selected therefrom according to at least one of program rating and program category, means for displaying other programs by separation lines between program displays, means for displaying a corresponding program description by a further display when a cursor is moved to the separation lines, means for displaying i) an official program name column which includes detailed information of one of said programs, and ii) a program list column which includes a time column and a channel column, when the program list is displayed by entering a program list display mode, means for displaying the detailed information of said program in the official program name column when the cursor is moved to said program in the program list column, means for maintaining a display state of the official program name column when a mode of the apparatus is changed from the program list display mode to a broadcast content briefing mode by selecting said program with the cursor of a controller, and means for displaying content briefing display for displaying a detailed content about the selected program.

2. A broadcast receiving apparatus of claim 1, further comprising:

means for maintaining the display state of the official program name column, and means for displaying a customized display selecting a reception format of the selected program in substantially an entire area of the content briefing display, when a reserve instruction button appears in the content briefing display in the broadcast content briefing mode, wherein the reserve instruction button is activated to change from the broadcast content briefing display to a reserve condition customize display.

3. A broadcast receiving apparatus of claim 2, further comprising:

means for displaying a confirmation display for confirming a program reservation in substantially an entire area of a customize display, when the display is changed from the customize display to the confirmation display.

4. A broadcast receiving apparatus of claim 1, further comprising:

means for displaying i) a broadcast data column in a predetermined position on the display, ii) the official program name column, and iii) at least one of the program list column, content briefing display, customize display and confirm display.

5. A broadcast receiving apparatus according to claim 1 means for displaying said official program name column displays said official program name has been added of said program corresponding to a cell specified by a cursor in the program list column, means for varying a display format of the cell specified by the cursor different from the display format when not specified, and means for varying the display format of the official program name column to be substantially similar to the cell specified by the cursor.

6. A broadcast receiving apparatus of claim 5, further comprising:

means for displaying an attribute of the program corresponding to a cell in the program list column by a corresponding icon when the program is assigned with at least one of a charge attribute and an age limit attribute, and means for displaying an explanatory statement corresponding to the icon in the official program name column when the cell is specified by the cursor.

7. A broadcast receiving apparatus of claim 2, further comprising:

means for displaying i) a broadcast data column in a predetermined position on the display, ii) the official program name column, and at least one of i) the program list column, content briefing display, iii) customize display and iv) confirm display.

8. A broadcast receiving apparatus of claim 3, further comprising:

means for displaying i) a broadcast data column in a predetermined position on the display, ii) the official program name column, and at least one of i) the program list column, ii) content briefing display, iii) customize display and iv) confirm display.

9. A broadcast receiving apparatus for use with a display and, having a plurality of programs in a predetermined time period in a program list column, comprising:

means for displaying a program description in a specified region of the display for a specific number of programs selected therefrom according to at least one of program rating and program category, means for displaying other programs by separation lines between program displays, means for displaying a corresponding program description by a further display when a cursor is moved to the separation lines, wherein program selection by the at least one of the program rating and the program category is determined by a duration of broadcasting time of the program.

10. A broadcast receiving apparatus for use with a display and, having a plurality of programs in a predetermined time period in a program list column, comprising:

means for displaying a program description in a specified region of the display for a specific number of programs selected therefrom according to at least one of program rating and program category, means for displaying other programs by separation lines between program displays, means for displaying a corresponding program description by a further display when a cursor is moved to the separation lines, wherein program selection by the at least one of the program rating and the program category is determined by a predetermined rank of importance.

11. A broadcast receiving apparatus for use with a display and, having a plurality of programs in a predetermined time period in a program list column, comprising:

means for displaying a program description in a specified region of the display for a specific number of programs selected therefrom according to at least one of program rating and program category, means for displaying other programs by separation lines between program displays, means for displaying a corresponding program description by a further display when a cursor is moved to the separation lines, means for displaying the program description by one line each in the means for displaying.

12. A program display method, for use with a display, having a plurality of programs in a predetermined period, and a program description in a program list column, comprising the steps of:

a) displaying the program description in a specified region for a specific number of programs selected therefrom according to at least one of program rating and program category, b) displaying other programs by a plurality of separation lines between the program displays, and c) displaying a corresponding program description by a further display when a cursor is moved to the separation lines wherein detailed information about the program of the further display is displayed in a official program name column.

13. A program display method, for use with a display, having a plurality of programs in a predetermined period, and a program description in a program list column, comprising the steps of:

a) displaying the program description in a specified region for a specific number of programs selected therefrom according to at least one of program rating and program category, b) displaying other programs by a plurality of separation lines between the program displays, and c) displaying a corresponding program description by a further display when a cursor is moved to the separation lines wherein program selection by the at least one of the program rating and the program category is determined by a duration of broadcasting time of the program.

14. A program display method, for use with a display, having a plurality of programs in a predetermined period, and a program description in a program list column, comprising the steps of:

a) displaying the program description in a specified region for a specific number of programs selected therefrom according to at least one of program rating and program category, b) displaying other programs by a plurality of separation lines between the program displays, and c) displaying a corresponding program description by a further display when a cursor is moved to the separation lines wherein program selection by the at least one of the program rating and the program category is determined by a predetermined rank of importance.

15. A program display method, for use with a display, having a plurality of programs in a predetermined period, and a program description in a program list column, comprising the steps of:

a) displaying the program description in a specified region for a specific number of programs selected therefrom according to at least one of program rating and program category, b) displaying other programs by a plurality of separation lines between the program displays, and c) displaying a corresponding program description by a further display when a cursor is moved to the separation lines further comprising the step of:

displaying the program description by one line each at the step displaying the program description.

* * * * *

UNITED STATES PATENT AND TRADEMARK OFFICE
CERTIFICATE OF CORRECTION

PATENT NO.    : 6,166,778
DATED         : December 26, 2000
INVENTOR(S)   : Yamamoto et al.

It is certified that error appears in the above-identified patent and that said Letters Patent is hereby corrected as shown below:

Column 41,
Line 29, delete "has been added".

Signed and Sealed this

Twenty-seventh Day of November, 2001

Attest:

Nicholas P. Godici

NICHOLAS P. GODICI
Acting Director of the United States Patent and Trademark Office

*Attesting Officer*